US011812681B2

(12) United States Patent
Sibley et al.

(10) Patent No.: US 11,812,681 B2
(45) Date of Patent: *Nov. 14, 2023

(54) PRECISION TREATMENT OF AGRICULTURAL OBJECTS ON A MOVING PLATFORM

(71) Applicant: Verdant Robotics, Inc., Hayward, CA (US)

(72) Inventors: Gabriel Thurston Sibley, Menlo Park, CA (US); Curtis Dale Garner, Modesto, CA (US); Andre Robert Daniel Michelin, Topanga, CA (US); Lorenzo Ibarria, Dublin, CA (US); Patrick Christopher Leger, Belmont, CA (US); Benjamin Rewis, Oakland, CA (US); Shi Yan, San Jose, CA (US)

(73) Assignee: Verdant Robotics, Inc., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,676

(22) Filed: Jul. 18, 2022

(65) Prior Publication Data

US 2022/0351508 A1    Nov. 3, 2022

Related U.S. Application Data

(63) Continuation of application No. 17/707,769, filed on Mar. 29, 2022, which is a continuation of application
(Continued)

(51) Int. Cl.
*A01B 69/00* (2006.01)
*A01C 21/00* (2006.01)
(Continued)

(52) U.S. Cl.
CPC .......... *A01B 69/001* (2013.01); *A01B 69/004* (2013.01); *A01C 21/007* (2013.01);
(Continued)

(58) Field of Classification Search
CPC .. A01B 69/001; A01B 69/004; G06V 20/188; G06V 20/38; G06F 18/243;
(Continued)

(56) References Cited

U.S. PATENT DOCUMENTS 3,985,773 A    10/1976    Alt
4,066,435 A    1/1978    Howe
(Continued)

FOREIGN PATENT DOCUMENTS

WO    2016144795 A1    9/2016

OTHER PUBLICATIONS

Abendroth, Lori, "What row spacing is best?," Iowa State University Agronomy Extension Corn Production Management, Dec. 2006, https://crops.extension.iastate.edu/corn/production/management/planting/row.html.
(Continued)

*Primary Examiner* — Manav Seth
(74) *Attorney, Agent, or Firm* — Cognition IP, P.C.; Edward Steakley

(57) ABSTRACT

Various embodiments relate generally to computer vision and automation to autonomously identify and deliver for application a treatment to an object among other objects, data science and data analysis, including machine learning, deep learning, and other disciplines of computer-based artificial intelligence to facilitate identification and treatment of objects, and robotics and mobility technologies to navigate a delivery system, more specifically, to an agricultural delivery system configured to identify and apply, for example, an agricultural treatment to an identified agricul-
(Continued)

tural object. In some examples, a method may include, receiving data representing a policy specifying a type of action for an agricultural object, selecting an emitter with which to perform a type of action for the agricultural object as one of one or more classified subsets, and configuring the agricultural projectile delivery system to activate an emitter to propel an agricultural projectile to intercept the agricultural object.

22 Claims, 33 Drawing Sheets

Related U.S. Application Data

No. 16/724,266, filed on Dec. 21, 2019, now Pat. No. 11,308,323.

(51) Int. Cl.
*G05D 1/02* (2020.01)
*G06V 20/10* (2022.01)
*G06F 18/243* (2023.01)
*G06V 20/00* (2022.01)

(52) U.S. Cl.
CPC ......... *G05D 1/0212* (2013.01); *G05D 1/0246* (2013.01); *G06F 18/243* (2023.01); *G06V 20/188* (2022.01); *G06V 20/38* (2022.01); *G05D 2201/0201* (2013.01)

(58) Field of Classification Search
CPC .. A01C 21/007; G05D 1/0212; G05D 1/0246; G05D 2201/0201; G06K 9/6279
See application file for complete search history.

(56) References Cited

U.S. PATENT DOCUMENTS

| | | | | |
|---|---|---|---|---|
| 5,278,423 | A * | 1/1994 | Wangler | G01S 17/42 47/1.7 |
| 5,987,383 | A | 11/1999 | Keller | |
| 6,501,422 | B1 | 12/2002 | Nichols | |
| 6,671,582 | B1 | 12/2003 | Hanley | |
| 6,702,201 | B2 | 3/2004 | Guesdon | |
| 6,789,746 | B2 | 9/2004 | Guesdon | |
| 7,398,946 | B1 | 7/2008 | Marshall | |
| 7,854,108 | B2 | 12/2010 | Koselka | |
| 8,381,501 | B2 | 2/2013 | Koselka | |
| 9,265,187 | B2 * | 2/2016 | Cavender-Bares | G05D 1/0088 |
| 9,382,003 | B2 | 7/2016 | Buerma | |
| 10,070,577 | B2 * | 9/2018 | Cavender-Bares | G05D 1/0274 |
| 10,654,063 | B2 | 5/2020 | Davis | |
| 10,721,859 | B2 * | 7/2020 | Wu | A01C 21/005 |
| 10,887,001 | B2 | 1/2021 | Tofighbakhsh | |
| 11,033,921 | B2 * | 6/2021 | Hendrickson | G05B 15/02 |
| 11,040,773 | B2 | 6/2021 | Furukawa | |
| 11,071,991 | B2 * | 7/2021 | Serrat | G06F 18/213 |
| 11,076,589 | B1 | 8/2021 | Sibley | |
| 11,308,323 | B2 * | 4/2022 | Sibley | G06V 20/38 |
| 11,526,997 | B2 * | 12/2022 | Sibley | G06V 20/188 |
| 2001/0036295 | A1 | 11/2001 | Hendrickson et al. | |
| 2013/0238201 | A1 | 9/2013 | Reden | |
| 2014/0249693 | A1 | 9/2014 | Stark | |
| 2015/0027040 | A1 | 1/2015 | Redden | |
| 2015/0027041 | A1 * | 1/2015 | Redden | A01M 21/04 47/1.3 |
| 2016/0050852 | A1 | 2/2016 | Lee | |
| 2017/0020087 | A1 | 1/2017 | Younis | |
| 2017/0359943 | A1 | 12/2017 | Calleija | |
| 2018/0271082 | A1 | 9/2018 | Kent | |
| 2018/0335372 | A1 | 11/2018 | Oral | |
| 2019/0357520 | A1 | 11/2019 | Redden | |
| 2020/0125122 | A1 | 4/2020 | Chen | |
| 2021/0185886 | A1 | 6/2021 | Sibley | |
| 2021/0185942 | A1 | 6/2021 | Sibley | |

OTHER PUBLICATIONS

Blue River Technology, "See & Spray—Blue River Technology's precision weed control machine," YouTube.com, Aug. 23, 2017, www.youtube.com/watch?v=-YCa8RntsRE.
Chostner, Ben, "See & Spray: The Next Generation of Weed Control," RESOURCE: Engineering and Technology for a Sustainable World, American Society of Agricultural and Biological Engineers ("ASABE"), vol. 24, No. 4, Jul./Aug. 2017, pp. 4-5, http://bt.e-ditionsbyfry.com/publication/?m=23718&i=420023&p=1.
Christen, Oliver, et al., "Target Marker: A Visual Marker for Long Distances and Detection in Realtime on Mobile Devices," Proceedings of the World Congress on Electrical Engineering and Computer Systems and Science (EECSS 2015), Barcelona, Spain, Jul. 13-14, 2015, Paper No. 339, pp. 339-1 to 339-7.
Deere & Company, "John Deere announces performance enhancements to MY20 S700 Series Combines: Updates include more automation, connected service and improved residue management," www.deere.com, May 29, 2019, https://www.deere.com/en/our-company/news-and-an nouncements/news-releases/2019/agriculture/2019may29-deere-enhances-my20-s700-series-combines/.
Gannon, Mary, "Hall-effect transducers ensure correct axle width to match crop row spacing, Mobile Hydraulic Tips: A Fluid Power World Resource," Aug. 8, 2018, https://www.mobilehydraulictips.com/hall-effect-transducers-ensure-correct-axle-width-to-match-crop-row-spacing/.
Kasper, Mike et al. "Light Source Estimation with Analytical Path-tracing." ArXiv abs/1701.04101 (2017): 7 pages.
Lightbody, Peter, et al., "A Versatile High-Performance Visual Fiducial Marker Detection System with Scalable Identity Encoding," SAC '17: Proceedings of the Symposium on Applied Computing, Apr. 2017, pp. 276-282, https://doi.org/10.1145/3019612.3019709.
Marsh, Allison, "Plowing with precision [Past Forward]," IEEE Spectrum, vol. 55, No. 3, pp. 56-56, Mar. 2018.
Mohanty, Sharada Prasanna, et al., "Using Deep Learning for Image-Based Plant Disease Detection," Cornell University, arXiv: Computer Vision and Pattern Recognition, Apr. 11, 2016, www.arxiv.org/abs/1604.03169.
Scolaro, Christina, "This weed-killing AI robot can tell crops apart," CNBC, Jun. 4, 2018, www.cnbc.com/2018/06/04/weed-killing-ai-robot.html.
Simon, Matt, "The Future of Humanity's Food Supply Is in the Hands of AI," Wired, May 25, 2016, www.wired.com/2016/05/future-humanitys-food-supply-hands-ai/.
Thomas, Shane, International Search Report for PCT/US2016/020990, dated May 27, 2016.

* cited by examiner

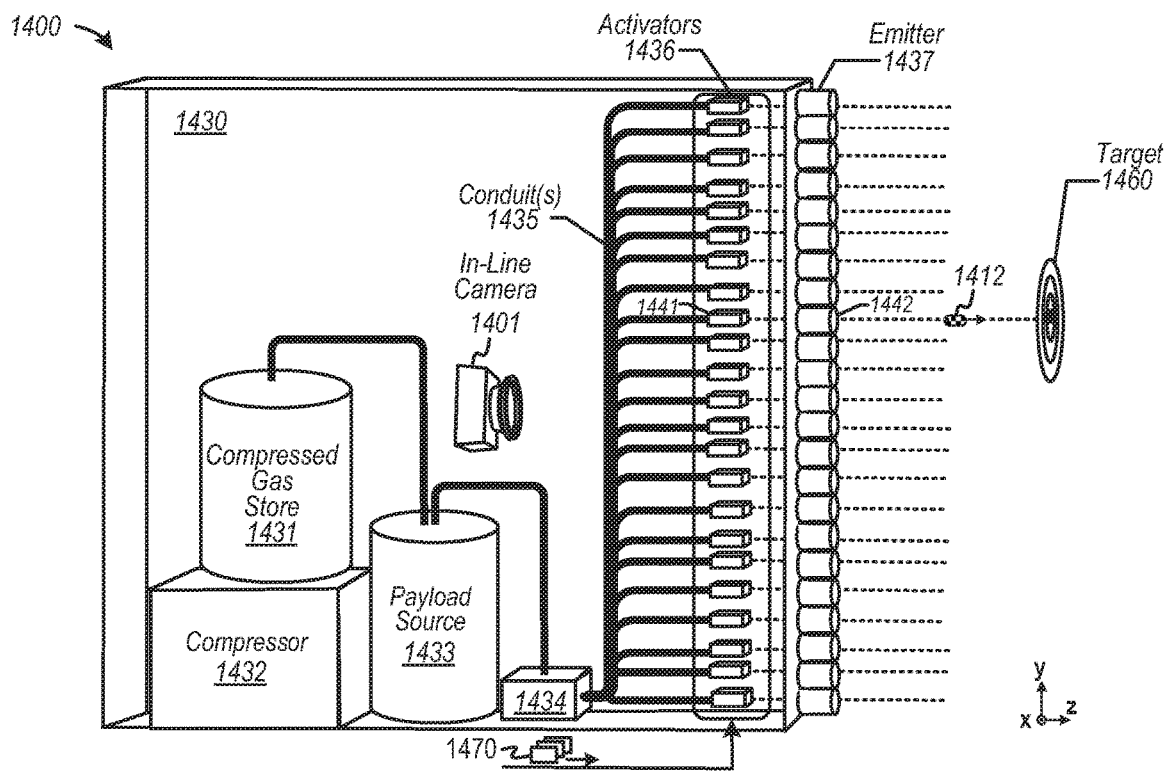
FIG. 14
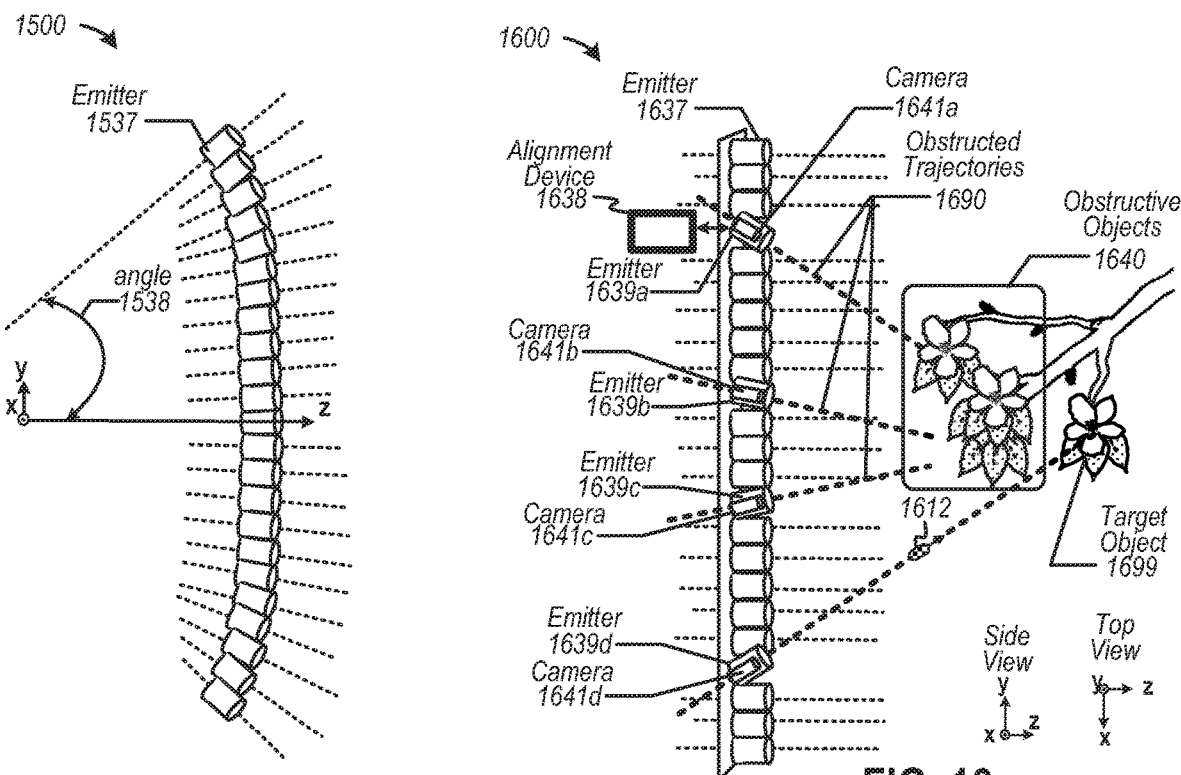
FIG. 15
FIG. 16

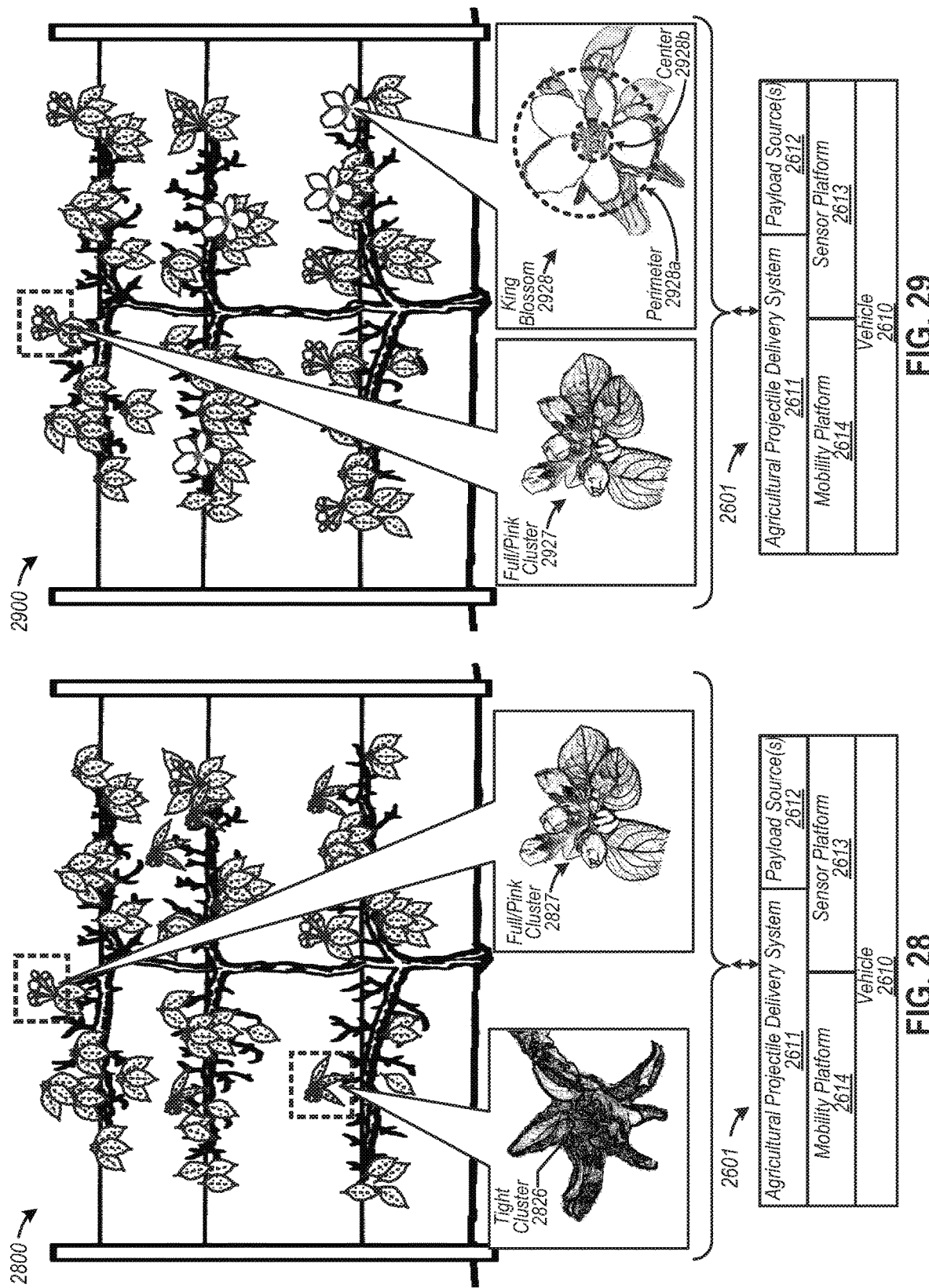

PRECISION TREATMENT OF AGRICULTURAL OBJECTS ON A MOVING PLATFORM

CROSS-REFERENCE TO RELATED APPLICATIONS

This application is a continuation of U.S. application Ser. No. 17/707,769, filed on Mar. 29, 2022, which is a continuation of U.S. application Ser. No. 16/724,266, filed Dec. 21, 2019, now U.S. Pat. No. 11,308,323, which are hereby incorporated by reference in their entirety.

FIELD

Various embodiments relate generally to computer software and systems, computer vision and automation to autonomously identify and deliver for application a specific treatment to an object among other objects, data science and data analysis, including machine learning, deep learning, and other disciplines of computer-based artificial intelligence to facilitate identification and treatment of objects, wired and wireless network communications, and robotics and mobility technologies to navigate a delivery system, as well as vehicles including associated mechanical, electrical and electronic hardware, among objects in a geographic boundary to apply any number of treatments to objects, and, more specifically, to an agricultural delivery system configured to identify and apply, for example, an agricultural treatment to an identified agricultural object.

BACKGROUND

Global human population growth is expanding at a rate projected to reach 10 billion or more persons within the next 40 years, which, in turn, will concomitantly increase demands on producers of food. To support such population growth, food producers, including farmers, need to generate collectively an amount of food that is equivalent to an amount that the entire human race, from the beginning of time, has consumed up to that point in time. Many obstacles and impediments, however, likely need to be overcome or resolved to feed future generations in a sustainable manner. For example, changes to the Earth's climate and unpredictable weather patterns negatively impact maintenance or enhancements in crop yields. Furthermore, limited or shrinking amounts of arable land on which to farm reduces opportunities to grow crops or dedicate land for other food production purposes.

Increased scarcity and costs of resources to produce food affects most farmers in less developed countries, as well as smaller farmers in developed countries. For example, the costs of crops sold ("cost of goods sold," or "COGS") are likely to increase beyond a range 60% to 70% of revenue. Costs of producing food, such as crops, may include costs due to labor, chemicals (e.g., fertilizer, pesticides, etc.), packaging, provenance tracking, and capital equipment (e.g., tractors, combines, and other farm implements), among other activities or resources. Labor costs are expected to rise as the demand for agricultural labor increases while fewer persons enter the agricultural workforce. Some agricultural workers are relocating to urban areas in numbers that increase scarcity of labor, thereby causing an average age of an agricultural worker to rise. Equipment costs, including tractors and sprayers, as well as other farm implements (e.g., combines, plows, spreaders, planters, etc.) may require relatively large expenses to purchase or lease, as well as to maintain, fuel, and operate.

Costs relating to chemical inputs are likely to rise, too. For instance, health-related and environmental concerns may limit amounts and/or types of chemicals, such as certain pesticides, that can be used to produce vegetables, fruits, and other agricultural products. Also, while some advances in chemistries may be beneficial, these advanced chemistries may be unaffordable for most applications by smaller farms, or farms in underdeveloped countries, thereby possibly depriving fanners of optimal means to produce food. Further, applications of some chemistries, such as herbicides, pesticides, and fertilizers, on agricultural crops require sprayers to disperse chemicals in very small liquid droplets (e.g., using boom sprayers, mist sprayers, etc.). Spray nozzles generally have orifices or apertures oriented in a line substantially perpendicular to and facing the ground at a distance above the crops (relative to the soil), with the apertures designed to form overlapping flat fan or cone-shaped patterns of spray. Such conventional approaches to applying chemistries, however, usually results in amounts of spray falling upon non-intended targets, such as on the soil, which is wasteful.

The above-described costs likely contribute to increases in food prices and farm closures, and such costs may further hinder advances to improve crop yields to meet sufficiently the projected increases in human population. While functional, a few approaches to improve crop yields have been developed, and typically have a number of drawbacks. In some traditional approaches, information to assist crop development relies on multi-spectral imagery from satellites, aircraft, and/or drones. Multi-spectral imagery combined with location information, such as provided by Global Positioning Systems ("GPS"), enables coarse analysis of portions of a farm to determine soil characteristics, fertilizer deficiencies, topological variations, drainage issues, vegetation levels (e.g., chlorophyll content, absorption, reflection, etc.), and the like. Thus, multi-spectral may be used to identify various spectral, spatial, and temporal features with which to evaluate the status of a group of crops as well as changes over time. There are various drawbacks to rely on this approach. For example, data based on multi-spectral imagery are generally limited to coarse resolutions related to crop-related management. That is, multi-spectral imagery generally provides information related to certain areas or region including multiple rows of crops or specific acreage portions. Further, multi-spectral imagery is not well-suited for monitoring or analyzing botanical items granularly over multiple seasons. In particular, such imagery may be limited to detectable foliage, for example, midway through a crop season. Otherwise, multi-spectral imagery may be limited, at least in some cases, to a set of abiotic factors, such as the environmental factors in which a crop is grown, and, thus, may be insufficient to identify a specific prescriptive action (e.g., applying fertilizer, a herbicide, etc.) for one or more individual plants that may not be detectable using multi-spectral imagery techniques. As such, multi-spectral imagery may not be well-suited to analyze biotic factors, among other things.

In another traditional approach, known computer vision techniques have been applied to monitor agricultural issues at plant-level (e.g., as a whole plant, imaged from a top view generally). While functional, there are a number of drawbacks to such an approach. For instance, some computer-based analyses have been adapted to perform agricultural assessments with reliance on incumbent or legacy machinery and hardware, such as conventional tractors. The conventional tractors and other known implements are not well-suited to integrate with recent autonomous technologies to sufficiently navigate among crops to perform functions or tasks less coarsely, or to identify and perform less coarse tasks or treatments. For example, some conventional applications may vary rates of dispensing fertilizer based on specific prescriptive maps that rely on resolutions provided by GPS and multi-spectral imagery (e.g., satellite imagery). Hence, some conventional rates of applying fertilizer are generally at coarse resolutions in terms of square meters (i.e., over multiple plants).

In some traditional approaches, known computer vision techniques are typically implemented to identify whether vegetation is either an individual crop or a non-crop vegetation (i.e., a weed). Further, these traditional approaches spray a chemical to generally treat a plant holistically, such as applying an herbicide to a weed or fertilizer to a crop. However, there is a variety of drawbacks to these traditional approaches. These approaches are typically directed to annual, row-based crops, such as lettuce, cotton, soybeans, cabbage, or other annual vegetation, which generally grow shorter than other vegetation. Row-based crops, also known as "row crops," typically are crops tilled and harvested in row sizes relative to agricultural machinery, whereby row crops naturally are rotated annually to replace entire vegetative entities (e.g., removal of corn stalks, etc.). Also, row-based crops are typically planted in row widths of, for example, 15, 20, or 30 inch row widths, with conventional aims to drive row widths narrower to reduce weed competition and increase shading of the soil, among other things.

In some traditional approaches, known computer vision techniques applied to row crops rely on capturing imagery of vegetation at a distance above the ground and oriented generally parallel to a direction of gravity (e.g., top-down). As such, the background of imagery is typically soil, which may simplify processes of detecting vegetation relative to non-vegetation (e.g., the ground). Further, images captured by a camera may have relatively minimal a depth of view, such as a distance from the soil (e.g., as a farthest element) to the top of an individual crop, which may be a row crop. Row crops have relatively shorter depth of view than other vegetation, including trees or the like, or other configurations. Known computer vision techniques have also been used, in some cases, to apply a fertilizer responsive to identifying an individual plant. In these cases, fertilizer has been applied as a liquid, whereby the liquid is typically applied using streams or trickles of liquid fertilizer. Further, the application of liquid fertilizer generally relies on a gravitational force to direct a stream of fertilizer to the individual crop.

Thus, what is needed is a solution for facilitating application of a treatment to an identified agricultural object, without the limitations of conventional techniques.

BRIEF DESCRIPTION OF THE DRAWINGS

Various embodiments or examples ("examples") of the invention are disclosed in the following detailed description and the accompanying drawings:

FIG. 14 is a diagram depicting an example of components of an agricultural projectile delivery system that may constitute a portion of an emitter propulsion subsystem, according to some examples;

FIG. 15 is a diagram depicting an example of an arrangement of emitters oriented in one or more directions in space, according to some examples;

FIG. 16 is a diagram depicting an example of another arrangement of emitters configured to be oriented in one or more directions in space, according to some examples;

FIGS. 26 to 31 are diagrams depicting components of an agricultural treatment delivery vehicle configured to sense, monitor, analyze, and treat one or more agricultural objects of a fruit tree through one or more stages of growth, according to some examples;

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1A:
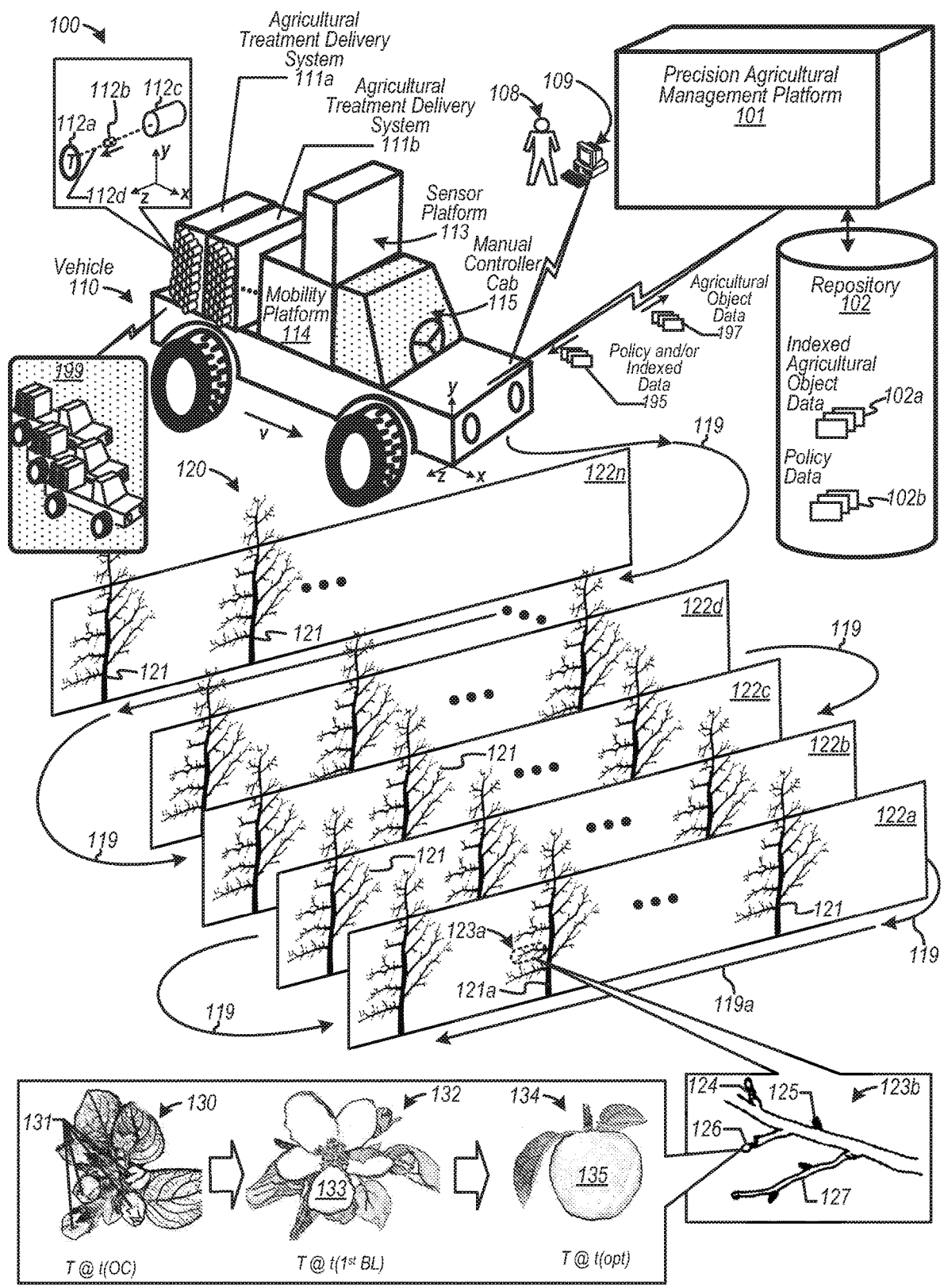
FIG. 1A is a diagram depicting an example of an agricultural treatment delivery system, according to some embodiments.

FIG. 1A is a diagram depicting an example of an agricultural treatment delivery system, according to some embodiments. Diagram 100 depicts an agricultural treatment delivery system configured to identify an agricultural object to apply an agricultural treatment. Examples of an agricultural treatment delivery system includes agricultural treatment delivery system 111a and agricultural treatment delivery system 111b, whereby agricultural treatment delivery systems 111a and 111b may be configured to deliver same or different treatments into an environment in which agricultural objects may be present. Agricultural treatment delivery system 111a may include one or more emitters, such as emitter 112c. Emitter 112c may be configured emit a treatment 112b, for example, via a trajectory 112d in any direction to intercept a target ("T") 112a as vehicle 110 traverses path portions 119 at a velocity, v. In some cases, vehicle 110 may be in a static position. A direction of trajectory 112d may be within a two- or three-dimensional space described relative to an XYZ coordinate system or the like. Examples of target 112a may include a bud, blossom, or any other botanical or agricultural object likely to be sensed in an environment within a geographic boundary 120, which may include at least a portion of a farm, an orchard, or the like.

Agricultural treatment delivery system 111a may be disposed in a vehicle, such as vehicle 110, to facilitate mobility to any number of targets 112a within a geographic boundary 120 to apply a corresponding treatment 112b. In some examples, vehicle 110 may include functionalities and/or structures of any motorized vehicle, including those powered by electric motors or internal combustion engines. For example, vehicle 110 may include functionalities and/or structures of a truck, such as a pick-up truck (or any other truck), an all-terrain vehicle ("ATV"), a utility task vehicle ("UTV"), or any multipurpose off-highway vehicle, including any agricultural vehicle, including tractors or the like. Also, agricultural treatment delivery systems 111a and 112b, as well as other agricultural treatment delivery systems (not shown), may be implemented in a trailer (or other mobile platform) that may be powered or pulled separately by a vehicle, which may navigate path portions 119 manually or autonomously. As shown, vehicle 110 may include a manual controller or control module ("cab") 115, which may accommodate a human driver and include any mechanical control system, such as a steering wheel and associated linkages to steerable wheels, as well as manually controlled braking and accelerator subsystems, among other subsystems.

In some examples, vehicle 110 may include a mobility platform 114 that may provide logic (e.g., software or hardware, or both), and functionality and/or structure (e.g., electrical, mechanical, chemical, etc.) to enable vehicle 110 to navigate autonomously over one or more paths 119, based on, for example, one or more treatments to be applied to one or more agricultural objects. Any of agricultural treatment delivery systems 111a or 111b may be configured to detect, identify, and treat agricultural objects autonomously (e.g., without manual intervention) independent of whether vehicle 110 is configured to navigate and traverse path portions 119 either manually or autonomously.

In the example shown, agricultural treatment delivery system 111 may be configured to traverse path portions 119 adjacent to agricultural objects, such as trees, disposed in arrangements 122a, 122b, 122c, 122d, and 122n, or any other agricultural objects associated therewith. In some cases, arrangements 122a, 122b, 122c, 122d, and 122n may be any trellis-based structure, such as any espalier-supported pattern or any trellis configuration (e.g., substantially perpendicular configurations, an example of which is shown in diagram 100, or "V-shaped" trellises, or any other structure). Note that agricultural treatment delivery system 111 need not be limited to trellis-based structures, but rather may be used with any plant or vegetative structure.

Any of agricultural treatment delivery systems 111a or 111b may be configured to operate, for example, in a sensor mode during which a sensor platform 113 may be configured to receive, generate, and/or derive sensor data from any number of sensors as vehicle 110 traverses various path portions 119. For example, sensor platform 113 may include one or more image capture devices to identify and/or characterize an agricultural object, thereby generating. Examples of image capture devices include cameras (e.g., at any spectrum, including infrared), Lidar sensors, and the like. Image-based sensor data may include any include any data associated with an agricultural object, such as images and predicted images, that may describe, identify, or characterize physical attributes. Sensor platform 113 may also include one or more location or position sensors, such as one or more global positioning system ("GPS") sensors and one or more inertial measurement units ("IMU"), as well as one or more radar devices, one or more sonar devices, one or more ultrasonic sensors, one or more gyroscopes, one or more accelerometers, one or more odometry sensors (e.g., wheel encoder or direction sensors, wheel speed sensors, etc.), and the like. Position-based sensors may provide any data configured to determine locations of an agricultural object relative to a reference coordinate system, to vehicle 110, to emitter 112c, or to any other object based, for example, GPS data, inertial measurement data, and odometry data, among data generated by other position and/or location-related sensors.

Note that any sensor or subset of sensors in sensor platform 113 may be configured to provide sensor data for any purpose. For example, any image capture device may be configured to detect a visual fiducial marker or any other optically-configured item (e.g., a QS code, barcode, or the like) that may convey information, such as position or location information, or other information. As agricultural treatment delivery system 111 and/or sensory platform 113 traverses path portions 119, image capture devices may detect fiducial markers, reflective surfaces, or the like, so that logic within sensory platform 113 or vehicle 110 (e.g., one or more processors and one or more applications including executable instructions) may be configured to detect or confirm a position of vehicle 110 or emitter 112c, or both, as a position within geographic boundary 120 or relative to an agricultural object.

In some implementations, one or more sensors in sensor platform 113 may be distributed among any portion of vehicle in any combination. For example, sensors in sensor platform 113 may be disposed in any of agricultural treatment delivery systems 111a or 111b. As such, any of agricultural treatment delivery systems 111a or 111b may each be configured to localize or determine a position of emitter 112c relative to an agricultural object independently. That is, agricultural treatment delivery systems 111a or 111b may include sensors and logic to determine the position of an emitter 112c in association with, or relative to, an agricultural object, and may be configured to identify an agricultural object autonomously, orient or otherwise target that agricultural object for action autonomously, and/or perform an action or apply a treatment autonomously regardless of whether vehicle 110 is navigating manually or autonomously.

One or more of agricultural treatment delivery systems 111a and 111b may be implemented as a modular structure that may be loaded into a bed of a pickup truck or an ATV/UTV, or any other vehicle that may be configured to manually navigate agricultural treatment delivery system 111 along path portions 119 to sense an agricultural object and to perform an action therewith. In some implementations, one or more sensors in sensor platform 113 may be distributed among any portion of vehicle, for example, including mobility platform 114, to facilitate autonomous navigation, agricultural object identification, and perform an action (e.g., apply a treatment). Hence, agricultural treatment delivery system 111 may implement sensors or sensor data (e.g., individually or collectively), or may share or use sensors and sensor data used in association with mobility platform 114 to facilitate autonomous navigation of vehicle 110. In one example, sensor platform 113 may be disposed in mobility platform 114, or in or among any other portion. Mobility platform 114 may include hardware or software, or any combination thereof, to enable vehicle 110 to operate autonomously.

Sensor platform 113 may be configured to sense, detect, analyze, store, and/or communicate data associated with one or more agricultural objects. For example, sensor platform 113 may be configured to at least detect or sense a subset 123b of one or more agricultural objects associated with tree 121a positioned adjacent path portion 119a. Sensor platform 113 also may be configured to detect subset 123b of agricultural objects as, for example, a limb, a branch, or any portion of agricultural object ("tree") 121a, and may further detect other sub-classes of agricultural objects of subset 123b. Sub-classes of agricultural objects of subset 123b may include buds, such as growth buds 125 (e.g., a bud from which a leaf or shoot may develop) and fruit buds 124 and 126, each of which may be an agricultural object. Branch 123a may also include a limb 127 as an agricultural object, and may include other agricultural objects, such as a spur (e.g., a shoot that may develop fruit), a water sprout (e.g., a young shoot growing within tree 121a), and the like.

In some embodiments, agricultural treatment delivery system 111 may be configured to communicate agricultural object data 197 via any communication media, such as wireless radio transmissions, to a precision agricultural management platform 101. Precision agricultural management platform 101 may include hardware (e.g., processors, memory devices, etc.) or software (e.g., applications or other executable instructions to facilitate machine learning, deep learning, computer vision techniques, statistical computations, and other algorithms), or any combination thereof. Precision agricultural management platform 101 (or portions thereof) may reside at any geographic location, whether at or external to geographic location 120. In one or more examples, logic associated with either precision agricultural management platform 101 or agricultural treatment delivery system 111, or both, may be configured to implement or facilitate implementation of simultaneous localization and mapping ("SLAM") to support autonomous navigation of vehicle 110, as well as autonomous operation of agricultural treatment delivery systems 111a and 111b. Hence, agricultural treatment delivery systems 111a and 111b may implement SLAM, or any other technique, to apply a treatment to an agricultural object autonomously.

Precision agricultural management platform 101 may be configured to, index and assign a uniquely identifier to each agricultural object in transmitted data 197 (e.g., as a function of a type of agricultural object, such as a blossom, a location of the agricultural object, etc.). Precision agricultural management platform 101 also may operate to store and manage each agricultural object (in agricultural object data 197) as indexed agricultural object data 102a, whereby each data arrangement representing each indexed agricultural object may be accessed using an identifier.

In some cases, either precision agricultural management platform 101 or agricultural treatment delivery system 111, or both, may be configured to implement computer vision and machine learning algorithms to construct and maintain a spatial semantic model (e.g., at resolutions of sub-centimeter, or less) and/or a time-series model of plant physiology and state-of-growth. Data representing any of these models may be disposed in data representing indexed agricultural object data 102a. For example, agricultural treatment delivery system 111 may be configured to navigate path portions 119 at any time in autumn, winter, spring, and summer to monitor a status of tree 121a and associated subsets of agricultural objects. For example, sensor platform 113 and/or agricultural treatment delivery system 111 may capture sensor data associated with fruit bud 126, which may develop over time through progressive stages of growth. At stage 130, fruit bud 126 is shown in an "open cluster" stage with flower buds 131 being, for example, pink in color and prior to blossom. The open cluster stage is indicated at time, T, equivalent to t(OC), with "OC" referring to "open cluster." At stage 132, the open cluster may transition over time (and through other intermediate stages, which are not shown) into a "blossom" stage in which a first (e.g., King) blossom 133 opens. The blossom stage is indicated at time, T, equivalent to t($1^{st}$ BL), with "BL" referring to "blossom." At stage 133, the blossom stage may transition over time (and through other intermediate stages, which are not shown) into a "fruit" stage in which a first blossom ripens into a fruit 135. The fruit stage is indicated at time, T, equivalent to t(opt), with "opt" referring to an optimal time at which fruit 135 may be optimally ripened for harvest.

Continuing with the example of detecting various stages in the growth of a crop, sensor platform 113 may transmit sensor data as agricultural object data 197 to precision agricultural management platform 101, which may analyze sensor data representing one of stages 130, 132, and 134 to determine an action to be performed for a corresponding stage. For example, at stage 132, logic in precision agricultural management platform 101 may be configured to identify at least one action to be performed in association with blossom 133. An action may include applying a treatment to blossom 133, such as causing emitter 112c to apply treatment 112b to blossom 133 as target 112a. The treatment may include applying pollen to, for example, a stigma of blossom 133 to effect germination. In various examples, precision agricultural management platform 101 may be configured to generate and store policy data 102b in repository 102, and be further configured to transmit policy and/or index data 195 to agricultural treatment delivery system 111a.

Any of agricultural treatment delivery systems 111a or 111b may be configured to operate, for example, in an action mode during which a sensor platform 113 may be configured to receive policy data 195 associated with blossom 133, which may be uniquely identifiable as an indexed agricultural object. Policy data may specify that blossom 133 is to be pollinated. Sensor platform 113 may be configured further to receive and/or generate sensor data from any number of sensors as vehicle 110 traverses various path portions 119, the sensor data being configured to identify an image of blossom 133 as vehicle traverses path portion 119a. When sensor platform 113 detects blossom 133, agricultural treatment delivery system 111a may be configured to trigger emission of treatment 112b autonomously. Note that agricultural treatment delivery systems 111a or 111b each may operate in sensor and action modes, individually or simultaneously, and may operate in any number of modes. Each mode may be implemented individually or collectively with any other mode of operation.

In some examples, agricultural treatment delivery systems 111 and vehicle 110 may operate to provide "robotics-as-a-service," and in particular, "robotics-as-an-agricultural-service" to enhance automation of crop load management and yield enhancement at least an agricultural object basis (or at finer resolution). For example, an apple crop may be monitored (e.g., during each pass of vehicle 110) and treated with micro-precision, such as on a per-cluster basis or a per-blossom basis. Vehicle 110 and other equivalent vehicles 199 may constitute a fleet of autonomous agricultural vehicles 110, each of which may identify agricultural objects and apply corresponding treatments autonomously. In at least one example, vehicle 110 may be configured to traverse, for example, 50 acres (or more) at least two times each day to generate and monitor sensor data, as well as to apply various treatments. In some cases, a computing device 109 may be configured to receive sensor data (e.g., image data) and to transmit executable instructions to perform a remote operation (e.g., a teleoperation) under guidance of user 108, who may be an agronomist or any other user including data analysts, engineers, farmers, and the like. Computing device 109 may provide remote operation to either navigate vehicle 110 or apply a treatment 112b via emitter 112c, or both.

Figure 1B:
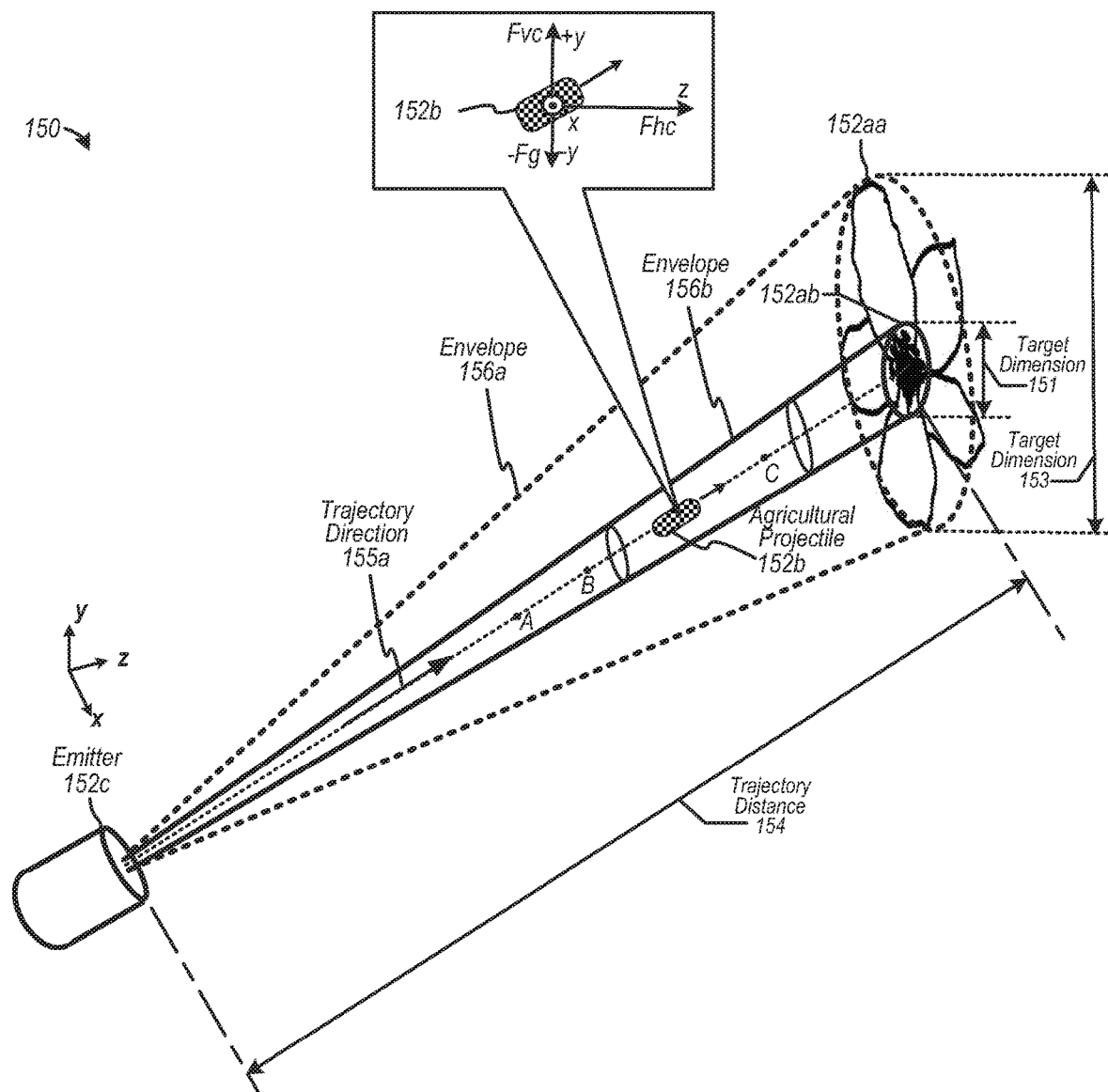
FIG. 1B is a diagram depicting an example of an emitter configured to apply a treatment, according to some examples.

FIG. 1B is a diagram depicting an example of an emitter configured to apply a treatment, according to some examples. Diagram 150 includes an emitter 152c that may be configured to apply treatments to agricultural objects, such as one or more portions of agricultural object depicted as a blossom. An agricultural treatment delivery system may be configured to apply units (e.g., distinct units) of treatment that may include, for example, packetized portions of a fertilizer, a thinning chemical, an herbicide, a pesticide, or any other applicable agricultural material or substance. As shown, emitter 152c may be configured to apply a treatment with micro-precision by emitting an agricultural projectile 152b to intercept a target 152ab at or within a target dimension 151. For example, target dimension 151 may have a dimension (e.g., a diameter) of 1 centimeter ("cm") or less. Hence, emitter 152c may deliver a treatment with a micro-precision of, for example, 1 cm or less, at any trajectory angle.

Agricultural projectile 152b may be configured as a liquid-based projectile propelled from emitter 152c for a programmable interval of time to form the projectile having, for example, an envelope 156b, at least in one example. Emitter 152c may be configured to emit agricultural projectile 152b along a trajectory direction 155a, which may be any direction in two or three-dimensional space. In at least one example, emitter 152c may be configured to propel agricultural projectile 152b in trajectory direction 155a with a force having a vertical component ("Fvc") and a horizontal component ("Fhc"). As shown, the vertical component of the propulsion force may be in a direction opposite than the force of gravity ("Fg"). Note, however, any of vertical component ("Fvc") and a horizontal component ("Fhc") may be negligible or zero, at least in one implementation. Note, too, that horizontal component ("Fhc") may have a magnitude sufficient to propel agricultural projectile 152b over a trajectory distance 154. In treatments applied to, for example, trellis or orchard crops, trajectory distance 154 may be 3 meters or less. In treatments applied to, for example, row crops, trajectory distance 154 may be 1 meter or less. In at least one example, trajectory distance 154 may be any distance within a geographic boundary.

In at least one other example, emitter 152c may be configured to emit agricultural projectile 152b along trajectory direction 155a in an envelope 156a to intercept a target 152aa having a target dimension 153. As an example, target dimension 153 may have a dimension (e.g., a diameter) equivalent to a size of an apple (or a size equivalent to any other agricultural object). Thus, emitter 152c may be configured to modify a rate of dispersal with which portions of agricultural projectile 152b disperses at or about a range relative to an agricultural object as a target, or relative to a waypoint (e.g., a fiducial marker affixed adjacent a path). According to some examples, motion estimator/localizer 219 may generate or update position data in real-time or near real-time.

Agricultural treatment delivery vehicle 210 may include a mobility controller 214 configured to perform one or more operations to facilitate autonomous navigation of agricultural treatment delivery vehicle 210. For example, mobility controller 214 may include hardware, software, or any combination thereof, to implement a perception engine (not shown) to facilitate classification of objects in accordance with a type of classification, which may be associated with semantic information, including a label. A perception engine may classify objects for purposes of navigation (e.g., identifying a path, other vehicles, trellis structures, etc.), as well as for purposes of identifying agricultural objects to which a treatment may be applied. For example, a perception engine may classify an agricultural object as a bud, a blossom, a branch, a spur, a tree, a cluster, a fruit, etc. Mobility controller 214 may include hardware, software, or any combination thereof, to implement a planner (not shown) to facilitate generation and evaluation of a subset of vehicle trajectories based on at least a location of agricultural treatment delivery vehicle 210 against relative locations of external dynamic and static objects. The planner may select an optimal trajectory based on a variety of criteria over which to direct agricultural treatment delivery vehicle 210 in way that provides for collision-free travel or to optimize delivery of an agricultural projectile to a target. In some examples, a planner may be configured to calculate the trajectories as probabilistically-determined trajectories. Mobility controller 214 may include hardware, software, or any combination thereof, to implement a motion controller (not shown) to facilitate conversion any of the commands (e.g., generated by the planner), such as a steering command, a throttle or propulsion command, and a braking command, into control signals (e.g., for application to actuators, linkages, or other mechanical interfaces 217) to implement changes in steering or wheel angles and/or velocity autonomously.

In some examples, agricultural treatment delivery system 211, sensor platform 213 (including any sensor), and motion estimator/localizer 219 may be implemented as a modular agricultural treatment delivery system 221, which can be configured to autonomously identify agricultural objects and apply a treatment to each agricultural object in accordance with a policy (e.g., application of a certain treatment responsive to stage of growth, and environmental condition, biotic data, abiotic data, etc.). Therefore, modular agricultural treatment delivery system 221 may be disposed in a truck, ATV, tractor, etc., any of which may be navigated manually (e.g., by a human driver) using manual control order 215. In some example, agricultural treatment delivery system 211 may have logic, similar or equivalent to that in mobility controller 214. For instance, agricultural treatment delivery system 211 may be configured to implement one or more of a perception engine to detect and classify agricultural objects, a planner to determine actions (e.g., one or more trajectories over which to propel an agricultural projectile), and a motion controller to control, for example, position or orientation of emitter 212. In other examples, agricultural treatment delivery system 211, sensor platform 213 (including any sensor), and motion estimator/localizer 219 each may integrated into a modular agricultural treatment delivery system 221, which, in turn, may be integrated into agricultural treatment delivery vehicle 210, along with mobility controller 214, to facilitate autonomous navigation of vehicle 210 and autonomous operation of agricultural treatment delivery system 211.

While agricultural treatment delivery vehicle 210 is described for applications in agriculture, delivery vehicle 210 need not be so limiting and may be implemented in any other type of vehicle, whether on land, in air, or at sea. Further, any agricultural projectile described herein, need not be limited to liquid-based projectiles, and may include solid and gas-based emissions or projectiles. Moreover, agricultural treatment delivery vehicle 210 need not be limited to agriculture, but may be adapted for any of a number of non-agricultural applications. Also, agricultural treatment delivery vehicle 210 may be configured to communicate with a fleet 299 of equivalent delivery vehicles to coordinate performance of one or more policies for any geographic boundary.

Figure 2A:
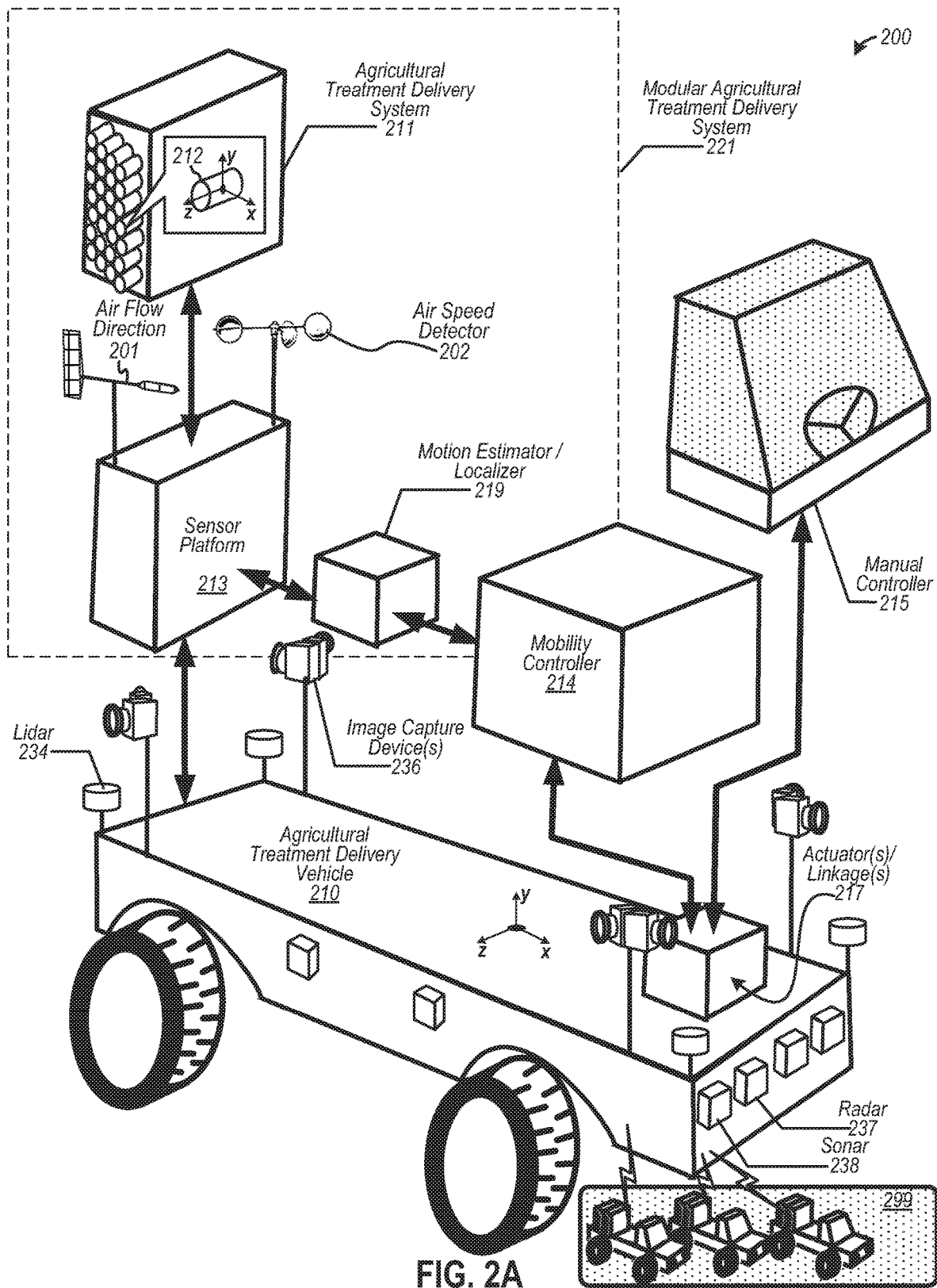
FIG. 2A is a diagram depicting examples of sensors and components of an agricultural treatment delivery vehicle, according to some examples.
Figure 2B:
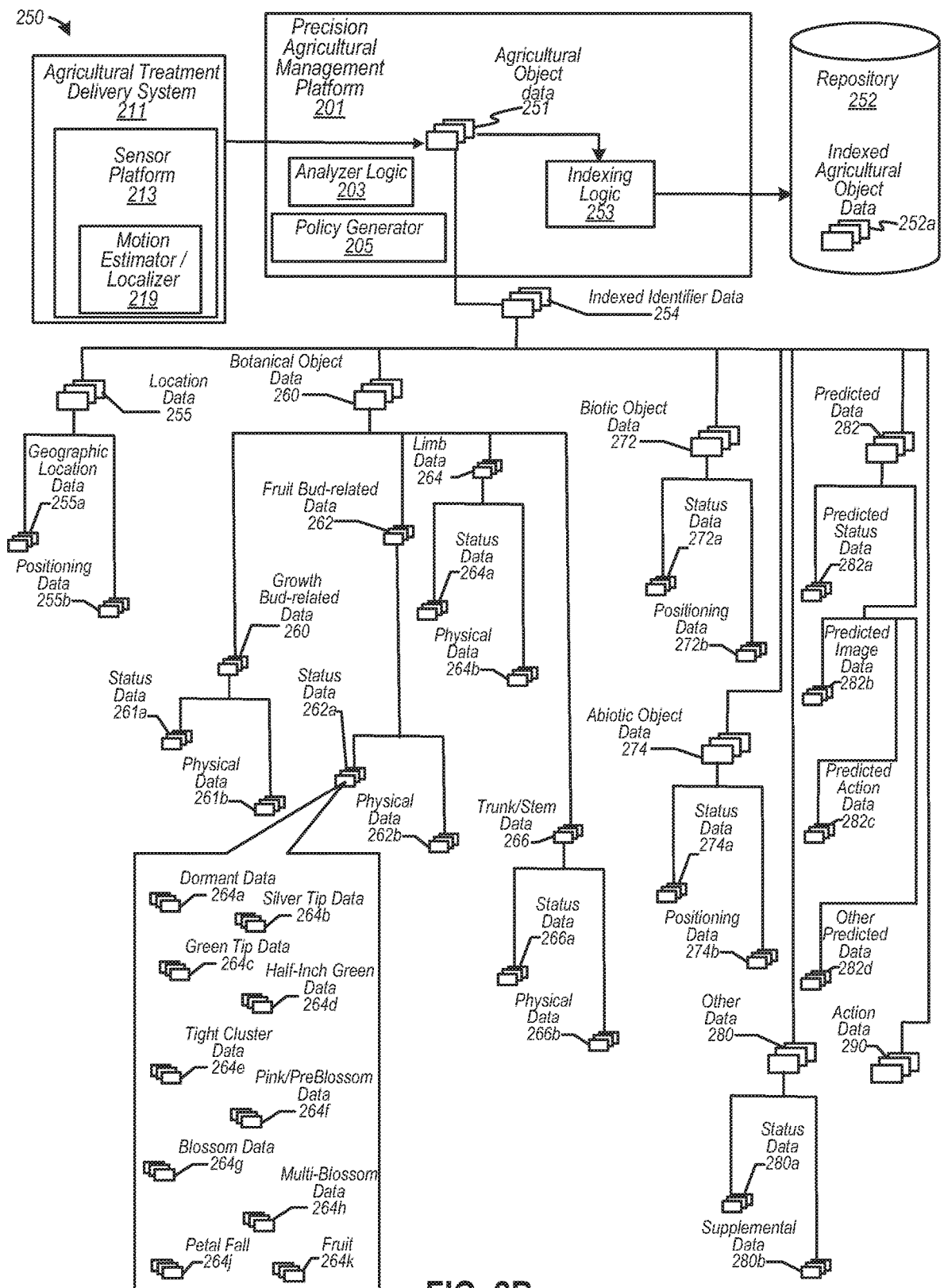
FIG. 2B depicts generation of indexed agricultural object data, according to some embodiments.

FIG. 2B depicts generation of indexed agricultural object data, according to some embodiments. Diagram 250 depicts an agricultural treatment delivery system 211, which, in turn, may optionally include a sensor platform 213 and a motion estimator/localizer 219, according to some examples. While sensor platform 213 is shown to include motion estimator/localizer 219, each may be separate or distributed over any number of structures (as well as constituent components thereof). Diagram 250 also depicts a precision agricultural management platform 201 configured to receive agricultural object data 251 from agricultural treatment delivery system 211, and further configured to generate indexed agricultural object data 252a, which may be stored in a data repository 252. Note that elements depicted in diagram 250 of FIG. 2B may include structures and/or functions as similarly-named elements described in connection to one or more other drawings.

Agricultural object data 251 may include data associated with a non-indexed agricultural object, an updated agricultural object, or any other information about an agricultural object. In some instances, a non-indexed agricultural object may be an agricultural object detected at sensor platform 213, and may yet to be identified in, or indexed into, a database of indexed agricultural object data 252a. Precision agricultural management platform 201 may be configured to identify agricultural object data 251 as "non-indexed," and may activate executable instructions to invoke indexing logic 253 to generate indexed agricultural object data 252a based on agricultural object data 251, whereby indexed identifier data 254 (e.g., a unique identifier) may be associated with agricultural object data 251. Also, agricultural object data 251 may include data associated with an updated agricultural object, such as when an agricultural object identified as being in a bud state at one point in time transitions to a blossom state (or any other intermediate states) at another point in time. In this case, agricultural object data 251 may also include image data (e.g., data representing a blossom) as well as any other sensor-based or derived data associated therewith, including an identifier (e.g., previously determined).

In various examples, precision agricultural management platform 201 may be configured to determine for agricultural object data 251 any other associated data provided or derived by, for example, sensors in sensor platform 213 and motion estimator/localizer 219. For example, precision agricultural management platform 201 may be configured to generate one or more of location data 255, botanical object data 260 (e.g., crop-centric data), biotic object data 272, abiotic object data 274, predicted data 282, action data 290, as well as any other data associated with agricultural object data 251, including agricultural object characteristics, attributes, anomalies, associated activities, environmental factors, ecosystem-related items and issues, conditions, etc. Any one or more of location data 255, botanical object data 260 (e.g., crop-centric data), biotic object data 272, abiotic object data 274, predicted data 282, and action data 290 may be included or omitted, in any combination.

Precision agricultural management platform 201 may be configured to identify a location (e.g., a spatial location relative to a two-dimensional or three-dimensional coordinate system) of an agricultural object associated with agricultural object data 251, the location being represented by geographic location data 255a. In some cases, geographic location data 255a may include a geographic coordinate relative to a geographic boundary, such as a boundary of an orchard or farm. Geographic location data 255a may include GPS data representing a geographic location, or any other location-related data (e.g., derived from position-related data associated with a sensor, vehicle, or agricultural treatment delivery system). Location data 255 may also include positioning data 255b that may include one or more subsets of data that may be used to determine or approximate a spatial location of the agricultural object associated with agricultural object data 251. For example, position data for one or more optical markers (e.g., reflective tape, visual fiduciary markers, etc.) may be included in positioning data 255b to locate or validate a spatial location for agricultural object data 251.

Botanical object data 260 may include any data associated with a plant, such as a crop (e.g., a specifically cultivated plant). For example, botanical object data 260 may include growth bud-related data 260, fruit bud-related data set 262, limb data 264, and trunk/stem data 266, and include other sub-classification of agricultural objects. Growth bud-related data 260 may include status data 261a that may identify a bud as being in a "bud state" at one point in time, which may be determined (at another point in time) to be in another state when the bud develops into either one or more leaves or a shoot. Physical data 261b may describe any attribute or characteristic of an agricultural object originating as a bud and that develops into one or more leaves or a shoot. For example, physical data 261b may include a shape, color, orientation, anomaly, or the like, including image data, or any characteristic that may be associated with a leaf as an agricultural object.

Fruit bud-related data set 262 may include status data 262a that may identify a fruit bud as being in a "fruit bud state" at one point in time, which may be determined (at another point in time) to be in another state when the bud develops into, for example, one or more blossoms as well as one or more fruit, such as one or more apples. For example, status data 262a may include a subset of data 264a to 264k to describe a status or a state of growth associated with a fruit bud. The following description of sets of data 264a to 264k are illustrative regarding stages of growth of apples, and is not intended to be limiting and can be modified for any fruit crop, vegetable crop, or any plant-related stages of growth, including ornamental plants, such as flowers (e.g., roses), and the like.

Dormant data 264a may include data associated with an identified dormant fruit bud, including image data acquired or otherwise sensed at one or more points in time as physical data 262b. Silver tip data 264b may include data associated with a stage of growth relative to a fruit bud transitioning to a "silver tip" stage of growth, including one or more images thereof as physical data 262b. In this stage, image data depicting a fruit bud may include digitized images of scales that may be separated at the tip of the bud, thereby exposing light gray or silver tissue. Green tip data 264c may include data associated with a stage of growth relative to a fruit bud transitioning to a "green tip" stage of growth, including one or more images thereof as physical data 262b. In this stage, a fruit bud may have developed to include image data depicting a broken tip at which green tissue may be visible. Half-inch green data 264d may include data associated with a stage of growth relative to a fruit bud transitioning to a "half-inch" stage of growth, including one or more images thereof as physical data 262b. At this stage, a fruit bud may have developed to include image data depicting a broken tip at which approximately one-half inch of green tissue may be detectable in an image. Tight cluster data 264e may include data associated with a stage of growth relative to a fruit bud transitioning to a "tight cluster" stage of growth, including one or more images thereof as physical data 262b. At this stage, a fruit bud may have developed to include image data depicting a subset of blossom buds at various levels of visibility that may be detectable in an image, the blossom buds being tightly grouped.

Pink/pre-blossom data 264f may include data associated with a stage of growth relative to an initial fruit bud transitioning to a "pink" stage of growth (also known as "first pink," "pre-pink," or "full pink" stages) as well as (or up to) an "open cluster" stage, and one or more images thereof may be included in physical data 262b. At this stage, image data may depict a subset of blossom buds at various levels of pink colors that may be detectable in an image prior to blossom. Blossom data 264g may include data associated with a stage of growth relative to an initial fruit bud that may transition to a "blossom" stage of growth (also known as a "king bloom" or "king blossom" stage), and one or more images thereof may be included in physical data 262b. At this stage, image data may depict a subset of pink blossom buds that include at least one blossom, such as a "king blossom," in an image.

Multi-blossom data 264h may include data associated with a stage of growth relative to a "multi-blossom" stage of growth (also known as a "full bloom" stage). One or more images of an agricultural object in a "multi-blossom" stage of growth may be included in associated physical data 262b. At this stage, image data may depict a number of blossoms (e.g., after pink blossom buds bloom). Petal fall data 264j may include data based on a transition from a "multi-blossom" stage to a "petal fall" stage of growth. One or more images of an agricultural object in a "petal fall" stage of growth may be included in associated physical data 262b. At this stage, image data may depict a cluster of blossoms that have a threshold amount of lost petals (e.g., 60% to 80% fallen) that have detached from a central structure in an image. Fruit 264k may include data based on transitioning from a "petal fall" stage to a "fruit" stage of growth (also known as a "fruit set" stage). One or more images of an agricultural object in a "fruit" stage of growth may be included in associated physical data 262b. At this stage, image data may depict a number of fruit (e.g., one or more apples relative to a cluster).

Limb data 264 may include status data 264a that may identify or classify a limb (e.g., a branch, a shoot, etc.) as being in a particular state at one point in time, which may be determined (at another point in time) to be in another state when the limb develops and grows. For example, limb data 264 can include data specifying a limb as being in a "non-supportive" state (i.e., the limb size and structure may be identified as being less likely to support growth of one or more apples to harvest). In this state, an agricultural treatment delivery system may be configured to apply a treatment, such as a growth hormone, to promote growth of the limb into, for example, a "supportive" state to facilitate growth of apples. Physical data 264b may describe any attribute or characteristic of an agricultural object identified as a limb. For example, physical data 264b may include a shape, size, color, orientation, anomaly, or the like, including image data, or any characteristic that may be associated with a limb as an agricultural object. Similarly, trunk/stem data 266 may include status data 266a that may identify or classify a truck or a stem (or a portion thereof) as being in a particular state at a point in time, whereas physical data 266b may describe any attribute or characteristic of an agricultural object identified as a trunk or stem (or a portion thereof). For example, physical data 266b may include a shape, size, dimensions, color, orientation, anomaly, or the like, including image data, or any characteristic that may be associated with a trunk or a stem as an agricultural object.

Biotic object data 272 may describe a living organism present in an ecosystem or a location in a geographic boundary. For example, biotic object data 272 may include status data 272a that may identify a type of bacteria, a type of fungi (e.g., apple scab fungus), a plant (e.g., a non-crop plant, such as a weed), and an animal (e.g., an insect, a rodent, a bird, etc.), and other biotic factors that may influence or affect growth and harvest of a crop. Status data 272a may also identify describe any attribute or characteristic of a biotic object. Positioning data 272b may include data describing whether a biotic object is positioned relative to, or independent from, another agricultural object (e.g., apple scab fungus may be identified as being positioned on an apple, which is another agricultural object). Positioning data 272b may be configured to locate or validate a spatial location of a biotic object as agricultural object data 251.

Abiotic object data 274 may describe a non-living element (e.g., a condition, an environmental factor, a physical element, a chemical element, etc.) associated with an ecosystem or a location in a geographic boundary that may influence or affect growth and harvest of a crop. For example, abiotic object data 274 may include status data 274a that may identify soil constituents (e.g., pH levels, elements, and chemicals), a time of day when abiotic data is sensed, amounts, intensities, directions of light, types of light (e.g., visible, ultraviolet, and infrared light, etc.), temperature, humidity levels, atmospheric pressure levels, wind speeds and direction, amounts of water or precipitation, etc. Positioning data 272b may include data describing whether an abiotic object is associated with another agricultural object, or any other data configured to locate or validate a spatial location of an abiotic object, such as portion of soil that may be acidic. Further, agricultural object data 251 may include any other data 280, which may include any other status data 280a and/or any other supplemental data 280b.

Further to FIG. 2B, precision agricultural management platform 201 may include analyzer logic 203 and a policy generator 205. Analyzer logic 203 may be configured to implement computer vision algorithms and machine learning algorithms (or any other artificial intelligence-related techniques), as well as statistical techniques, to construct and maintain a spatial semantic model as well as a time-series model of physiology and/or physical characteristics of a crop (or any other agricultural object, such as a limb or branch) relative to a stage-of-growth. Analyzer logic 203 may be further configured to predict a next state or stage of growth and an associated timing (e.g., a point in time or a range of time) at which a transition may be predicted. Hence, analyzer logic 203 may be configured to generate predicted data 282 that may include predicted status data 282a to describe a predicted status of an agricultural object associated with indexed identifier data 254. For example, a predicted status of a cluster of blossoms, as an agricultural object, may specify a predicted transition from a single opened blossom (e.g., a king blossom as an agricultural object) to one or more lateral blossoms opening (e.g., as corresponding agricultural objects), as well as a predicted range of time during which the predicted state transition may (likely) occur. Predicted data 282 may include predicted image data 282b that may be provided or transmitted to agricultural treatment delivery system 211 to facilitate detecting and identifying an agricultural object. Predicted image data 282b may be used to determine whether it may have transitioned from one state to the next (e.g., since previously being sensed or monitored). Further, predicted data 282 may include predicted action data 282c and any other predicted data 282d, which may facilitate navigation and positioning of an emitter to apply a treatment optimally (e.g., emitting an agricultural projectile within a range of accuracy and/or a range of precision), for example, as a function of context (e.g., season, stage of growth, associated biotic and abiotic conditions, time of day, amount of sunlight, etc.).

In some examples, policy generator 205 may be configured to analyze a status (e.g., a current or last sensed status) of an agricultural object and a predicted status, and may be further configured to derive one or more actions as action data 290 as a policy. Action data 290 may be implemented as policy data that is configured to guide performance of one or more treatments to an agricultural object. For example, action data 290 associated with an agricultural object identified as a king blossom may include data representing a policy (e.g., a definition, rules, or executable instructions) to perform an action (e.g., pollinate a king blossom), whereas action data 290 associated with an agricultural object identified as a lateral blossom (e.g., in association with a cluster including a king blossom) may include policy data to perform a thinning action to terminate growth of the lateral blossom. Action data 290 may also include data representing prior actions performed as well as results based on those prior actions, as well as any other action-related data.

Figure 3:
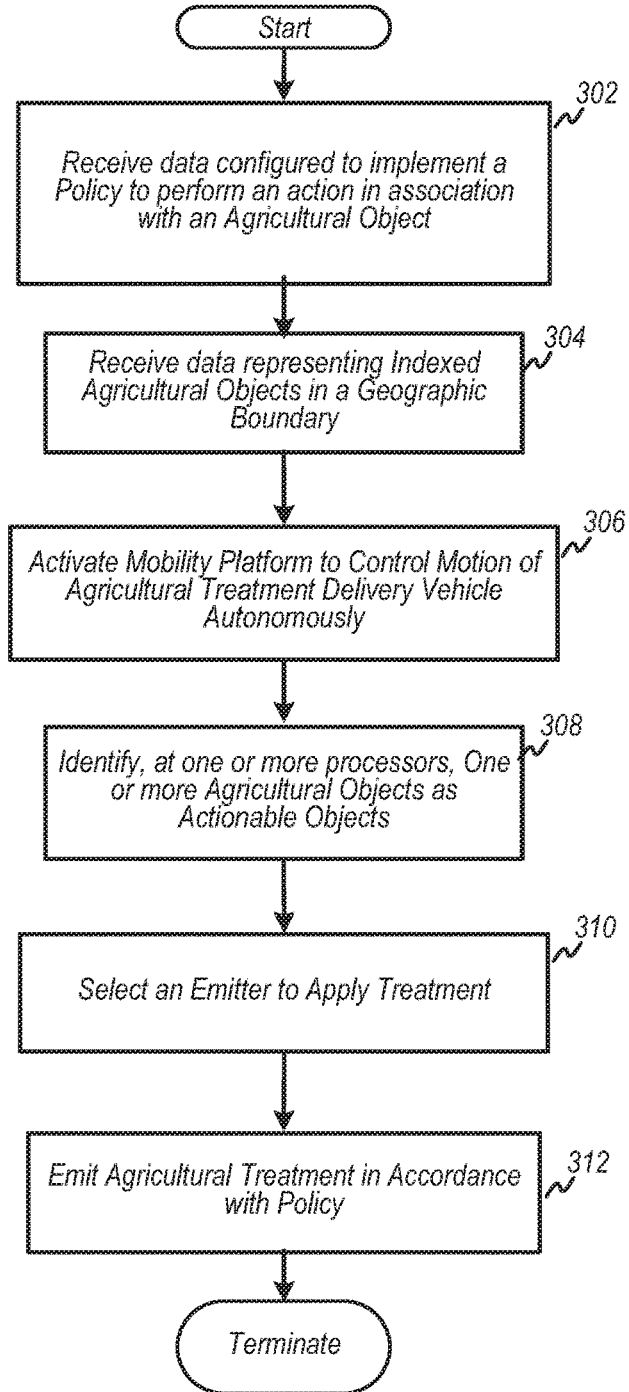
FIG. 3 is an example of a flow diagram to control agricultural treatment delivery system autonomously, according to some embodiments.

FIG. 3 is an example of a flow diagram to control agricultural treatment delivery system autonomously, according to some embodiments. At 302, flow 300 begins to receive data configured to implement a policy to perform an action in association with an agricultural object. In some cases, data representing one or more actions to be performed relative to a subset of agricultural objects may be received at, for example, an agricultural treatment delivery system. Policy data may be configured to implement an action based on a context associated with an agricultural object, such as a stage of growth during which, for example, pests and weeds may be more prominent than in other time intervals.

At 304, data representing a subset of agricultural objects may be received. In some cases, each agricultural object may be associated with data representing an identifier. The data representing each of the agricultural objects may be indexed into a data repository. Further, the data representing each of the agricultural objects may be received from, or otherwise originate at, a precision agricultural management platform, which may include one or more processors configured to analyze sensor data (e.g., image data) captured from one or more sensors at, for example, an agricultural treatment delivery system. The sensor data may be analyzed to validate recently captured sensor data (e.g., for an agricultural object) correlates with at least a subset of indexed agricultural object data (e.g., previously sensed data for a specific agricultural object). Also, the sensor data may be analyzed to determine a stage of growth or any other agriculturally-related condition for which a treatment may be applied or delivered. Further, the image data may be used to form a modified or predicted image of an agricultural object at the precision agricultural management platform.

As an agricultural treatment delivery system traverses adjacent to arrangements of agricultural objects (e.g., fruit trees), sensed image data from one or more cameras may be compared to data representing a predicted image of the agricultural object. The predicted image may be derived at a precision agricultural management platform to predict a change in an image or physical appearance (or any other characteristic) based on predicted growth of an agricultural object. The predicted image then may be used to detect the corresponding agricultural object in a geographic boundary to which a treatment may be applied.

At 306, a mobility platform may be activated to control autonomously motion and/or position of an agricultural treatment delivery vehicle. A mobility platform may be configured to implement a map, which may include data configured to position one or more emitters of an agricultural projectile delivery system adjacent to an agricultural object within a geographic boundary. Hence, a map may include data specifying a location of an indexed agricultural object, and can be used to navigate a vehicle autonomously to align an emitter with an agricultural object to deliver a treatment.

At 308, an agricultural object may be detected based on or in association with one or more sensors (e.g., one or more image capture devices). Image data of an agricultural object may be generated to form an imaged agricultural object. Then, the imaged agricultural object may be correlated to data representing an indexed agricultural object in a subset of agricultural objects. A correlation may validate that the imaged agricultural object is a same object as described in data associated with the indexed agricultural object. Further, a spatial position of an imaged agricultural object may be correlated to a position and/or an orientation of an emitter.

At 310, an emitter from a subset of one or more emitters may be selected to perform an action. Further, a corresponding action to be performed in association with a particular agricultural object may be identified, the agricultural object being an actionable object (e.g., an agricultural object for which an action is perform, whether chemical or mechanical, such as robotic pruners or de-weeding devices). In some cases, an optical sight associated with an emitter may be identified, and a corresponding action may be associated with the optical sight to determine a point in time to activate emission of an agricultural projectile.

At 312, an agricultural treatment may be emitted as a function of a policy. For example, an emitter may be activated to align an emitter to a spatial position (e.g., at which an agricultural object may be disposed). Upon alignment, propulsion of an agricultural projectile may be triggered to intercept an agricultural object.

In an implementation in which a vehicle including an agricultural treatment delivery system is controlled manually, logic in association with an agricultural treatment delivery system may be configured to detect displacement of the vehicle and compute a spatial position of an emitter. Further, an agricultural treatment delivery system may be configured to detect a point or a line (e.g., an optical ray) at which a spatial position of an emitter intersects a path specified by a map. The path may be associated with a subset of agricultural objects for which one or more emitters may be configured to perform a subset of actions. Also, a subset of agricultural objects may be detected in association with one or more sensors. A subset of actions may be identified to be performed in association with a subset of agricultural objects, such as a number of blossoms on one or more trees. One or more emitters may be selected autonomously to perform a subset of actions, whereby one or more emitters may emit a subset of agricultural projectiles to intercept a subset of agricultural objects. In one instance, at least two different agricultural projectiles may be emitted to perform different actions.

In a vehicle that includes an agricultural treatment delivery system, and is controlled autonomously, logic in association with an agricultural treatment delivery system may be configured to generate control signals (e.g., at a mobility platform) to drive the vehicle autonomously, compute a spatial position of the vehicle relative to, for example, an agricultural object, and calculate a vehicular trajectory to intersect a path based on, for example, data representing a map. Further, a spatial position of an emitter may be determined to be adjacent to a path specified by the map, the path also being associated with a subset of agricultural objects for which one or more emitters are configured to perform a subset of actions. In some examples, a rate of displacement of the vehicle may be adjusted autonomously to, for example, enhance accuracy, an amount of dosage, or the like. Upon detect a subset of agricultural objects in association with one or more sensors, one or more emitters may be configured to emit a subset of agricultural projectiles to intercept the subset of agricultural objects at the rate of displacement.

In at least one implementation, control signals to drive the vehicle autonomously may be supplemented by receiving a first subset of data representing a vehicular trajectory, the data being generating at a teleoperator controller. One or more emitters may emit a subset of agricultural projectiles responsive to a second subset of data originating at the teleoperator controller.

Figure 4:
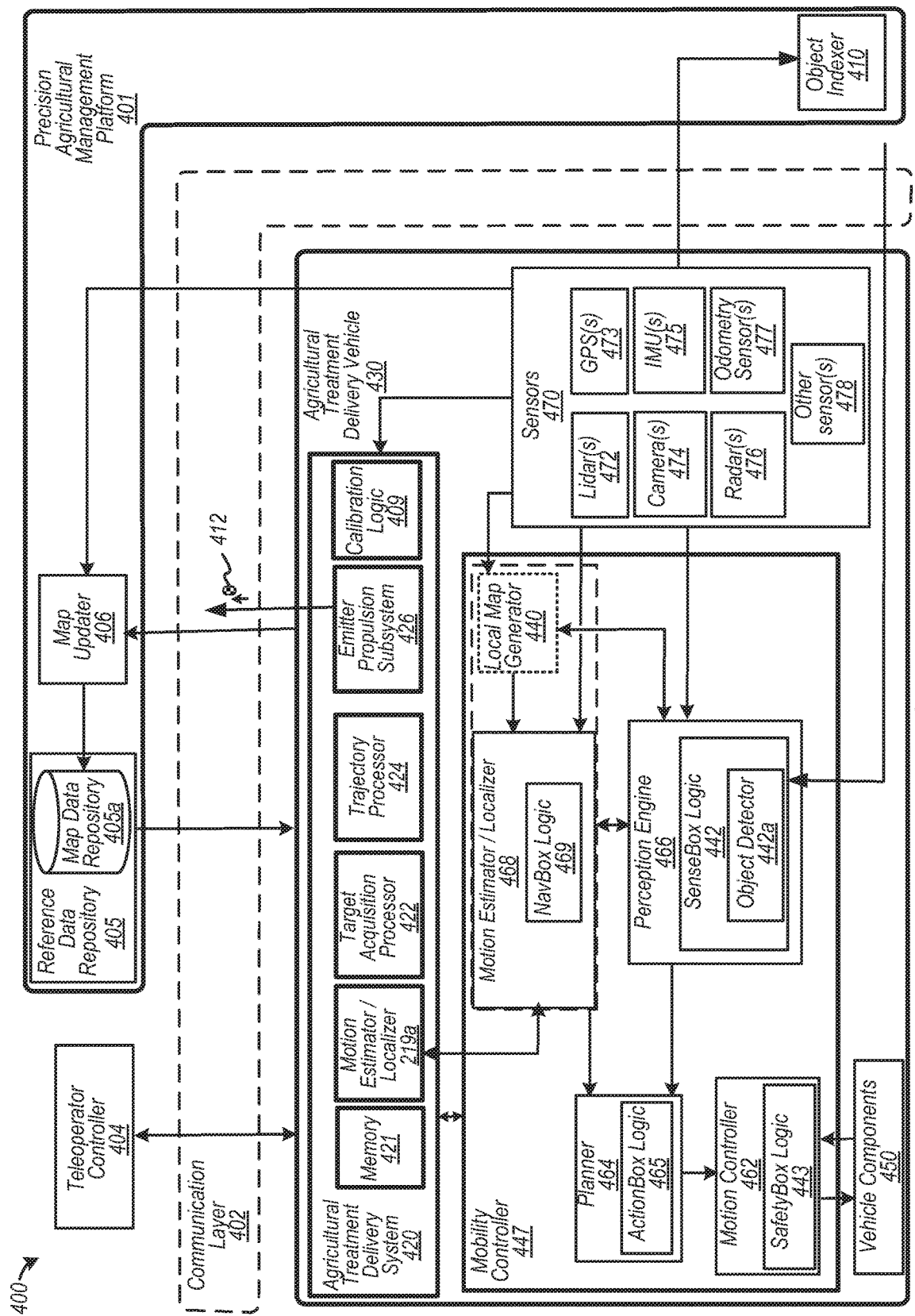
FIG. 4 is a functional block diagram depicting a system including a precision agricultural management platform communicatively coupled via a communication layer to an agricultural treatment delivery vehicle, according to some examples.

FIG. 4 is a functional block diagram depicting a system including a precision agricultural management platform communicatively coupled via a communication layer to an agricultural treatment delivery vehicle, according to some examples. Diagram 400 depicts a mobility controller 447 disposed in an agricultural treatment delivery vehicle 430, which, in turn, may include any number of sensors 470 of any type. One or more sensors 470 may be disposed within, or coupled to, either mobility controller 447 or an agricultural treatment delivery system 420, or both. Sensors 470 may include one or more Lidar devices 472, one or more cameras 474, one or more radars 476, one or more global positioning system ("GPS") data receiver-sensors, one or more inertial measurement units ("IMUs") 475, one or more odometry sensors 477 (e.g., wheel encoder sensors, wheel speed sensors, and the like), and any other suitable sensors 478, such as infrared cameras or sensors, hyperspectral-capable sensors, ultrasonic sensors (or any other acoustic energy-based sensor), radio frequency-based sensors, etc.

Other sensor(s) 478 may include air flow-related sensors to determine magnitudes and directions of ambient airflow relative to agricultural treatment delivery system 420 and one or more emitters configured to emit an agricultural projectile 412. Air flow-related sensors may include an anemometer to detect a wind speed and a wind vane to detect wind direction. Values of wind speed and direction may be determined relative to a direction and velocity of agricultural treatment delivery vehicle 430, and may further be used to adjust a time at which to emit agricultural projectile 412 and/or modify a trajectory as a function of windage (e.g., wind speed and direction). In some cases, wheel angle sensors configured to sense steering angles of wheels may be included as odometry sensors 477 or suitable sensors 478. Sensors 470 may be configured to provide sensor data to components of mobility controller 447 and/or agricultural treatment delivery vehicle 430, as well as to elements of precision agricultural management platform 401. As shown in diagram 400, mobility controller 447 may include a planner 464, a motion controller 462, a motion estimator/localizer 468, a perception engine 466, and a local map generator 440. Note that elements depicted in diagram 400 of FIG. 4 may include structures and/or functions as similarly-named elements described in connection to one or more other drawings.

Motion estimator/localizer 468 may be configured to localize agricultural treatment delivery vehicle 430 (i.e., determine a local pose) relative to reference data, which may include map data, route data, and the like. Route data may be used to determine path planning over one or more paths (e.g., unstructured paths adjacent to one or more plants, crops, etc.), whereby route data may include paths, path intersections, waypoints (e.g., reflective tape or other visual fiducial markers associated with a trellis post), and other data. As such, route data may be formed similar to road network data, such as RNDF-like data, and may be derived and configured to navigate paths in an agricultural environment. In some cases, motion estimator/localizer 468 may be configured to identify, for example, a point in space that may represent a location of agricultural treatment delivery vehicle 430 relative to features or objects within an environment. Motion estimator/localizer 468 may include logic configured to integrate multiple subsets of sensor data (e.g., of different sensor modalities) to reduce uncertainties related to each individual type of sensor. According to some examples, motion estimator/localizer 468 may be configured to fuse sensor data (e.g., Lidar data, camera data, radar data, etc.) to form integrated sensor data values for determining a local pose. According to some examples, motion estimator/localizer 468 may retrieve reference data originating from a reference data repository 405, which may include a map data repository 405*a* for storing 2D map data, 3D map data, 4D map data, and the like. Motion estimator/localizer 468 may be configured to identify at least a subset of features in the environment to match against map data to identify, or otherwise confirm, a position of agricultural treatment delivery vehicle 430. According to some examples, motion estimator/localizer 468 may be configured to identify any amount of features in an environment, such that a set of features can one or more features, or all features. In a specific example, any amount of Lidar data (e.g., most or substantially all Lidar data) may be compared against data representing a map for purposes of localization. In some cases, non-matched objects resulting from a comparison of environment features and map data may be classify an object as a dynamic object. A dynamic object may include a vehicle, a farm laborer, an animal, such as a rodent, a bird, or livestock, etc., or any other mobile object in an agricultural environment. Note that detection of dynamic objects, including obstacles, such as fallen branches in a path, may be performed with or without map data. In particular, dynamic or static objects may be detected and tracked independently of map data (i.e., in the absence of map data). In some instances, 2D map data and 3D map data may be viewed as "global map data" or map data that has been validated at a point in time by precision agricultural management platform 401. As map data in map data repository 405*a* may be updated and/or validated periodically, a deviation may exist between the map data and an actual environment in which agricultural treatment delivery vehicle 430 is positioned. Therefore, motion estimator/localizer 468 may retrieve locally-derived map data generated by local map generator 440 to enhance localization. For example, locally-derived map data may be retrieved to navigate around a large puddle of water on a path, the puddle being omitted from global map data.

Local map generator 440 is configured to generate local map data in real-time or near real-time. Optionally, local map generator 440 may receive static and dynamic object map data to enhance the accuracy of locally-generated maps by, for example, disregarding dynamic objects in localization. According to at least some embodiments, local map generator 440 may be integrated with, or formed as part of, motion estimator/localizer 468. In at least one case, local map generator 440, either individually or in collaboration with motion estimator/localizer 468, may be configured to generate map and/or reference data based on simultaneous localization and mapping ("SLAM") or the like. Note that motion estimator/localizer 468 may implement a "hybrid" approach to using map data, whereby logic in motion estimator/localizer 468 may be configured to select various amounts of map data from either map data repository 405*a* or local map data from local map generator 440, depending on the degrees of reliability of each source of map data. Therefore, motion estimator/localizer 468 may use out-of-date map data in view of locally-generated map data.

In various examples, motion estimator/localizer 468 or any portion thereof may be distributed in or over mobility controller 447 or agricultural treatment delivery system 420 in any combination. In one example, motion estimator/localizer 468 may be disposed as motion estimator/localizer 219*a* in agricultural treatment delivery system 420. Also, agricultural treatment delivery system 420 may also include sensors 470. Therefore, agricultural treatment delivery system 420 may be configured to autonomously apply treatments to agricultural objects independent of mobility controller 447 (i.e., agricultural treatment delivery vehicle 430 may navigate manually). In another example, agricultural treatment delivery vehicle 430 may navigate autonomously. Hence, motion estimator/localizer 468 may be disposed in either mobility controller 447 or agricultural treatment delivery system 420, with its functionalities being shared by mobility controller 447 and agricultural treatment delivery system 420. According to some examples, motion estimator/localizer 468 may include NavBox logic 469 configured to provide functionalities and/or structures as described in U.S. Provisional Patent Application No. 62/860,714 filed on Jun. 12, 2019 and titled "Method for Factoring Safety Components into a Software Architecture and Software and Apparatus Utilizing Same."

Perception engine 466 may be configured to, for example, assist planner 464 in planning routes and generating trajectories by identifying objects of interest (e.g., agricultural objects) in a surrounding environment in which agricultural treatment delivery vehicle 430 is traversing. As shown, perception engine 466 may include an object detector 442*a* configured to detect and classify an agricultural object, which may be static or dynamic. Examples of classifications with which to classify an agricultural object includes a class of leaf, a class of bud (e.g., including leaf buds and fruit buds), a class of blossom, a class of fruit, a class of pest (e.g., insects, rodents, birds, etc.), a class of disease (e.g., a fungus) a class of a limb (e.g., including a spur as an object), a class of obstacles (e.g., trellis poles and wires, etc.), and the like. Object detector 442a may be configured to distinguish objects relative to other features in the environment, and may be configured to further identify features, characteristics, and attributes of an agricultural object to confirm that the agricultural object relates to an indexed agricultural object and/or policy stored in memory 421. Further, perception engine 466 may be configured to assign an identifier to an agricultural object that specifies whether the object is (or has the potential to become) an obstacle that may impact path planning at planner 464. Although not shown in FIG. 4, note that perception engine 466 may also perform other perception-related functions, predicting "freespace" (e.g., an amount of unencumbered space about or adjacent an agricultural object) or whether a subset of agricultural objects (e.g., leaves) may obstruct agricultural projectile trajectories directed to another subset of agricultural objects (e.g., blossoms) to calculate alternative actions or agricultural projectile trajectories. In some examples, object detector 442a may be disposed in SenseBox logic 442, which may be configured to provide functionalities and/or structures as described in U.S. Provisional Patent Application No. 62/860,714 filed on Jun. 12, 2019 and titled "Method for Factoring Safety Components into a Software Architecture and Software and Apparatus Utilizing Same."

Planner 464 may be configured to generate a number of candidate vehicle trajectories for accomplishing a goal of traversing within a geographic boundary via a number of available paths or routes, and planner 464 may further be configured to evaluate candidate vehicle trajectories to identify which subsets of candidate vehicle trajectories may be associated with higher degrees of confidence levels of providing collision-free paths adjacent one or more plants. As such, planner 464 can select an optimal vehicle trajectory based on relevant criteria for causing commands to generate control signals for vehicle components 450 (e.g., actuators or other mechanisms). Note that the relevant criteria may include any number of factors that define optimal vehicle trajectories, the selection of which need not be limited to reducing collisions. In some cases, at least a portion of the relevant criteria can specify which of the other criteria to override or supersede, while maintain optimized, collision-free travel. In some examples, planner 464 may be include ActionBox logic 465, which may be configured to provide functionalities and/or structures as described in U.S. Provisional Patent Application No. 62/860,714 filed on Jun. 12, 2019 and titled "Method for Factoring Safety Components into a Software Architecture and Software and Apparatus Utilizing Same."

In some examples, motion controller 462 may be configured to generate control signals that are configured to cause propulsion and directional changes at the drivetrain and/or wheels of agricultural treatment delivery vehicle 430. In this example, motion controller 462 is configured to transform commands into control signals (e.g., velocity, wheel angles, etc.) for controlling the mobility of agricultural treatment delivery vehicle 430. In the event that planner 464 has insufficient information to ensure a confidence level high enough to provide collision-free, optimized travel, planner 464 can generate a request to teleoperator controller 404 (e.g., a teleoperator computing device), for teleoperator support. In some examples, motion controller 462 may be include SafetyBox logic 443, which may be configured to provide functionalities and/or structures as described in U.S. Provisional Patent Application No. 62/860,714 filed on Jun. 12, 2019 and titled "Method for Factoring Safety Components into a Software Architecture and Software and Apparatus Utilizing Same."

Autonomous vehicle service platform 401 includes reference data repository 405, a map updater 406, and an object indexer 410, among other functional and/or structural elements. Note that each element of autonomous vehicle service platform 401 may be independently located or distributed and in communication with other elements in autonomous vehicle service platform 401. Further, any component of autonomous vehicle service platform 401 may independently communicate with the agricultural treatment delivery vehicle 430 via the communication layer 402. Map updater 406 is configured to receive map data (e.g., from local map generator 440, sensors 460, or any other component of mobility controller 447), and is further configured to detect deviations, for example, of map data in map data repository 405a from a locally-generated map. Map updater 406 may be configured to update reference data within repository 405 including updates to 2D, 3D, and/or 4D map data. Object indexer 410 may be configured to receive data, such as sensor data, from sensors 470 or any other component of mobility controller 447. According to some embodiments, a classification pipeline of object indexer 410 may be configured to annotate agricultural objects (e.g., manually by a human and/or automatically using an offline labeling algorithm), and may further be configured to train a classifier (e.g., on-board agricultural treatment delivery vehicle 430), which can provide real-time classification of agricultural object types during autonomous operation. In some examples, object indexer 410 may be configured to implement computer vision and machine learning algorithms to construct and maintain a spatial semantic model (e.g., at resolutions of sub-centimeter, or less) and/or a time-series model of plant physiology and state-of-growth. Data representing any of these models may be linked to, or disposed in, data representing indexed agricultural object data.

Agricultural treatment delivery system 420 may include hardware or software, or any combination thereof, and may include a memory 421, a motion estimator/localizer 219a, a target acquisition processor 422, a trajectory processor 424, an emitter propulsion subsystem 426, and calibration logic 409. Memory 421 may be configured to store policy data to specify an action or treatment for an associated indexed agricultural object, and may also store indexed agricultural object data (e.g., describing a specific agricultural object of interest, including identifier data and image data, which may be predicted). Motion estimator/localizer 219a may be configured to determine a position of agricultural treatment delivery system 420 or an emitter relative to an agricultural object targeted for treatment. Target acquisition processor 422 may be configured to sense or otherwise detect an agricultural object, such as a blossom, that may be identified in association with indexed agricultural object data. Hence, target acquisition processor 422 may acquire an agricultural object as a target for treatment, whereby an acquired agricultural object may be detected in a subset of pixels in image data. Trajectory processor 424 may be configured to track an acquired agricultural object as a subset of pixels in image data relative to, for example, an optical sight. In event the tracked subset of pixels aligns with the optical sight, trajectory processor 424 may generate a control signal to initiate delivery of a payload (i.e., a treatment) as agricultural projectile 412. Responsive to receiving a control signal, emitter propulsion subsystem 426 may be configured to propel agricultural projectile 412 toward a target. Calibrator 409 may include logic configured to perform calibration of various sensors, such as image sensors, of the same or different types. In some examples, calibrator 409 may be configured to compute a trajectory direction (e.g., in Cartesian space (x, y, z) and/or orientation of an emitter (e.g., roll, pitch and yaw). As such, a position and orientation of an emitter may be calibrated to intercept a target, such as visual fiducial marker or a laser light beam on a surface, whereby a pixel associated with an optical sight may cause an agricultural projectile 412 to be emitted when a subset of pixels of target in an image aligns with a subset of pixels associate with an optical sight. In this example, alignment of an optical sight to a target may be in line with an optical ray extending through the optical sight.

Figure 5:
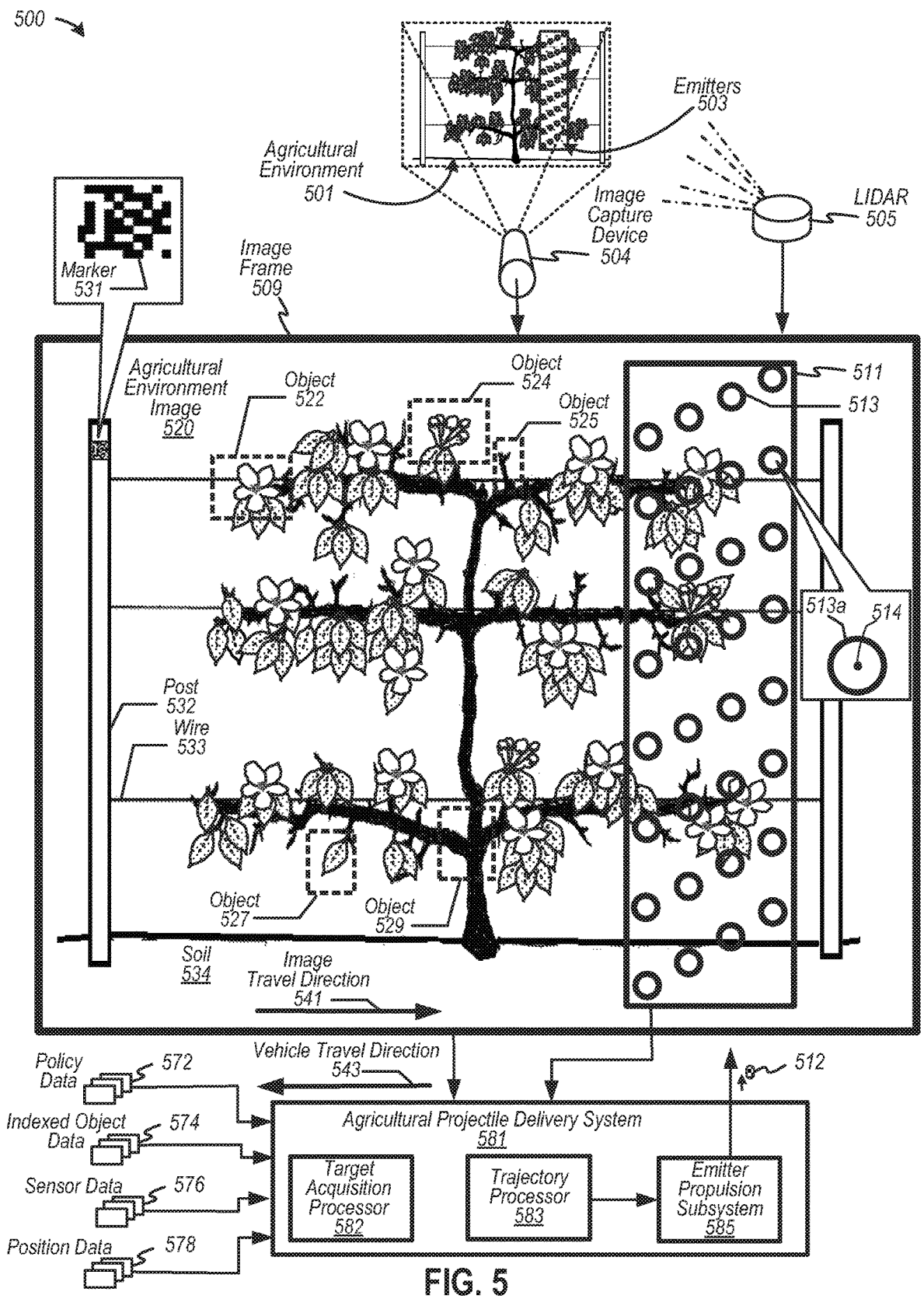
FIG. 5 is a diagram depicting another example of an agricultural treatment delivery system, according some examples.

FIG. 5 is a diagram depicting another example of an agricultural treatment delivery system, according some examples. Diagram 500 depicts an agricultural projectile delivery system 581 implemented as an agricultural treatment delivery system, whereby agricultural projectile delivery system 581 may be configured to detect an agricultural object, identify a course of action (e.g., based on policy data), track an image of the agricultural object, and emit an agricultural projectile 512 to intercept an agricultural object as a target. Agricultural projectile delivery system 581 may include one or more image capture devices, such as a camera 504 and a Lidar 505, the imaged sensor data from each may or may not be integrated or "fused," according to various examples. As shown, one or more image capture devices 504 and 505 may be configured to capture an image of an agricultural environment 501 in a field of view of, for example, image capture device 504, the captured image being received into agricultural projectile delivery system 581 via, for example, sensor data 576, as agricultural environment image 520.

In accordance with some examples, agricultural projectile delivery system 581 includes one or more emitters 503 disposed in a field of view between image capture device 504 and objects of interest, such as agricultural objects disposed in agricultural environment 501. Therefore, emitters 503 may be presented as image data 511 in agricultural environment image 520, the image data 511 of emitters thereby occluding images of one or more agricultural objects in agricultural environment 501. In examples in which image data 511 obscures or occludes a portion of agricultural environment 501, agricultural projectile delivery system 581 may be configured to generate optical sights 513 that, at least in some cases, may be coaxial with an orientation of an aperture of a corresponding emitter. For example, an optical sight 513*a* may be centered coaxially about a line 514 coincident with a trajectory direction of a corresponding aperture. Further, line 514 may be an optical ray extending from at least one pixel in a subset of pixels associated with a center of 513*a* (or any other portion of an optical sight) to a target in agricultural environment 501. In at least one implementation, an emitter may be a nozzle and an aperture may refer to a nozzle opening.

Agricultural environment image 520 includes image data representing one or more agricultural objects, such as objects 522 to 529. Object 522 is a blossom, object 524 is an open cluster, object 525 is a spur, object 527 is a leaf or other foliage, and object 529 is a portion of a trunk or stem. Other objects—as agricultural objects—based on agricultural applications, associations, and implementations, may be depicted in agricultural environment image 520, such as a post 532, a wire 533, soil 534, and a marker 531, among others. Marker 531 may be detected and analyzed to determine positioning information, to facilitate in-situ positioning or calibration, or to perform any other function.

Note that image frame 509 and image data 511 of emitters 503 may be affixed to a frame of reference of, for example, an agricultural treatment delivery vehicle (not shown) as it travels in direction 543, at least in this example. Therefore, objects within image frame 509 including agricultural objects 522 to 529 may traverse agricultural environment image 520 in a direction of image travel 541. Consequently, agricultural objects for which a treatment may be applied may move toward, for example, an array of optical sights 513 (e.g., to the right in diagram 500).

Agricultural projectile delivery system 581 may be configured to receive policy data 572 to specify an action, a treatment, or the like for an agricultural object, as well as indexed object data 574 to provide data (including imagery data for comparison) that specifies any number of characteristics, attributes, actions, locations, etc., of an agricultural object. Agricultural projectile delivery system 581 may receive or derive sensor data 576 (e.g., image data, wind speed data, wind direction data, etc.) as well as position data 578 (e.g., a position of an agricultural object). Agricultural projectile delivery system 581 also may be configured to receive any other types of data.

Agricultural projectile delivery system 581 is shown to include a target acquisition processor 582, a trajectory processor 583, and an emitter propulsion subsystem 585. In various examples, target acquisition processor 582 may be able to identify an agricultural object, such as object 522, that may be correlatable to a subset of indexed agricultural object data 574, which may include previously-sensed data and data predicting an image of the identified agricultural object with a predicted amount of growth. Among other things, a predicted image may facilitate image-based identification of a uniquely identified agricultural object among many others in geographic location, such as an orchard. Further, target acquisition processor 582 may detect whether policy data 572 specifies whether an action is to be taken. If not, one or more sensors may monitor and capture data regarding a non-targeted identified agricultural object. As a non-targeted object, however, it need not be tracked as a target (e.g., identifying an optical sight may be omitted as well as a treatment). In some cases, an identified agricultural object may be associated with an action, such as object 522. Trajectory processor 583 may be configured to select an optical sight for implementing an action, and may be further configured to track an identified agricultural object indicated as requiring treatment as its image data traverses in direction 541. Trajectory processor 583 may also be configured to predict an emission parameter (e.g., emission time) at which an agricultural object aligns with an optical sight. At a detected emission time, trajectory processor 583 may generate a control signal to transmit to emitter propulsion subsystem 585, which, in turn may activate an emitter to propel agricultural projectile 512 to intercept object 522 at a calculated time.

Figure 6:
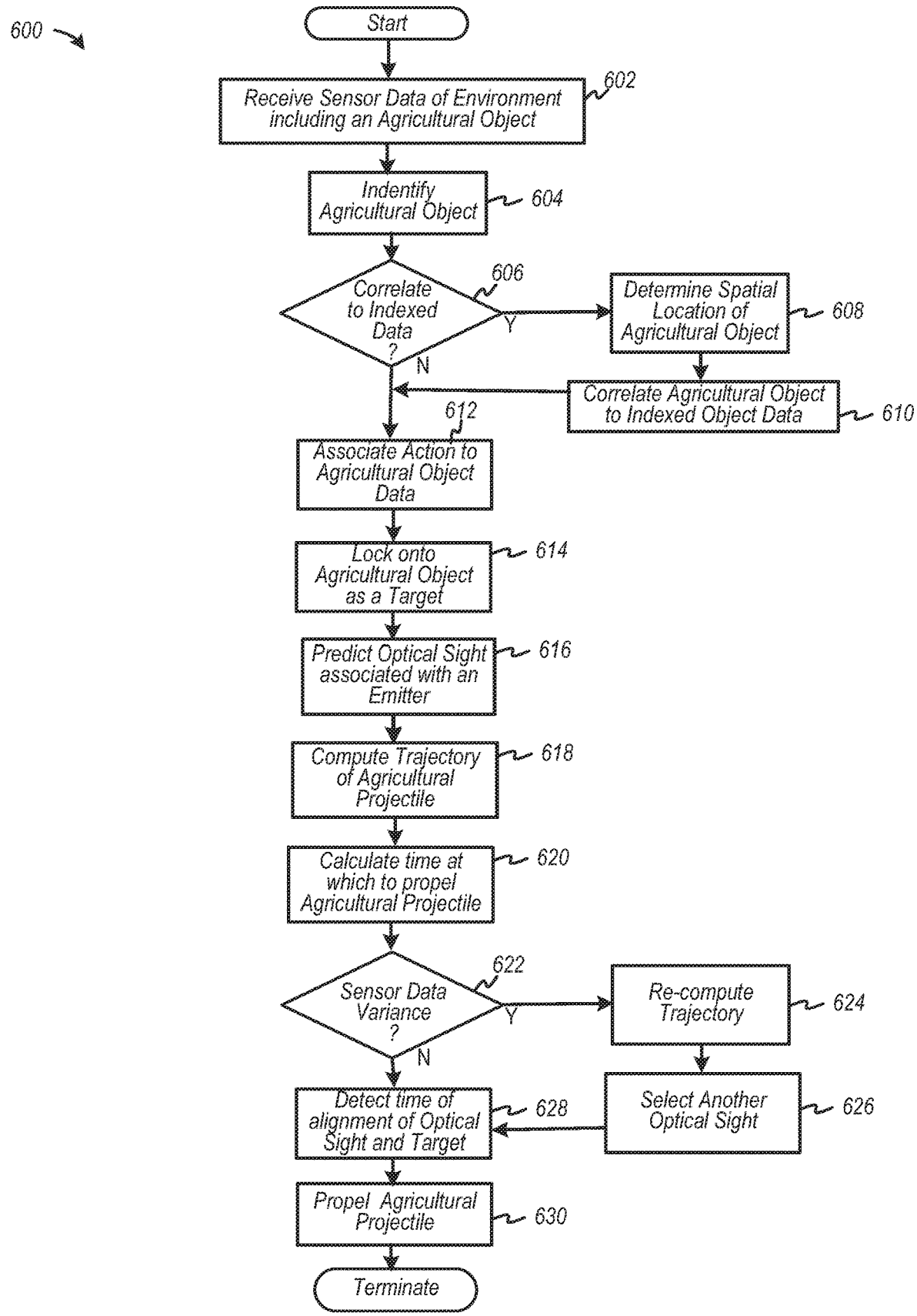
FIG. 6 is an example of a flow diagram to align an emitter to a target autonomously, according to some embodiments.

FIG. 6 is an example of a flow diagram to align an emitter to a target autonomously, according to some embodiments. Flow 600 begins at 602, at which sensor data representing presence of agricultural objects disposed in an agricultural environment may be received. In some examples, an image capture device, such as a camera, may capture an image of one or more agricultural objects in a subset of agricultural objects. Also, image data representing a number of agricultural objects in a field of view of an image capture device may be received at 602. Consider that the one or more agricultural objects are blossoms. The image capture device may receive light (e.g., reflective sunlight) from an agricultural object in a field of view of image capture device. Image data representing the agricultural object may be captured at any rate (e.g., 30 frames a minute, or fewer or more). In one example, reflective light may be received from an agricultural object in one or more time intervals during which reflective light is visible (e.g., within a visible light spectrum, such as when sunlight is available). In other examples, the reflected light received into an image capture device may be infrared light or any other spectrum of light. As such, an agricultural treatment delivery system may operate in the absence of sunlight. In at least one embodiment, one or more emitters may be disposed in between an image capture device and an agricultural object. For example, one or more emitters may be disposed or positioned in a field of view of a camera, whereby an aperture of an emitter (e.g., aperture of a nozzle) may be aligned coaxially with an optical ray corresponding to a pixel at the center of aperture of an emitter in a captured image. In other examples, an aperture of an emitter need not be aligned coaxially with an optical ray.

At 604, an agricultural object may be identified as, for example, a bloom that is associated with indexed agricultural object data, which may include previously captured image data and an identifier that uniquely distinguishes the identified agricultural object from other agricultural objects throughout, for example, an orchard. A subset of agricultural objects may also be captured as image data in a field of view.

At 606, a determination is made as to whether an identified agricultural object is correlatable to indexed data (e.g., previously sensed data regarding the agricultural object that may be processed and indexed into a data arrangement stored in a data repository). In no, flow 600 moves to 612. If yes, flow 600 may move to 608 to determine, optionally, a spatial location of an identified agricultural object, as a function of a position of an agricultural treatment delivery vehicle or an emitter. At 610, a spatial location of the identified agricultural object may be compared to location data in indexed agricultural object data to analyze whether the identified agricultural object is correlated to indexed data (i.e., the identified agricultural object and indexed agricultural object data relate to the same object).

At 612, an action may be associated to data representing the identified agricultural object. For example, policy data may be linked to indexed agricultural object data, which may specify a first policy to germinate king blossoms and a second policy to terminate lateral blossoms, whereby these two policies may be implemented individually or in combination (simultaneously or nearly simultaneously). For example, consider that an identified agricultural object is identified using indexed data or other image processing that predicts a classification for the identified agricultural object, whereby the identified agricultural object is predicted to be a "king blossom." Therefore, an action relating to the first policy (e.g., germination) may be linked to the identified agricultural object to perform that action. Note that a subset of agricultural objects of the same or different classifications (or types) may be detected in a field of view and correlated to one or more corresponding actions to be performed in association with one or more emitters.

At 614, an identified agricultural object may be locked onto and tracked as a target for applying a treatment. In some cases, one or more optical sights may configured to detect alignment with one or more identified agricultural objects.

At 616, each optical sight may be predicted to align with an associated agricultural object at 616, the optical sight being associated with an emitter. In particular, an optical sight may be selected to align with a target relative to other optical sights, the optical sight being associated with an emitter for applying a treatment to a corresponding identified agricultural object. In some cases, an emitter is oriented to emit an emission parallel (e.g., coaxially) with an optical ray extending from an optical sight to a target, the optical sight being associated with one or more pixels of an image capture device. Further, one or more agricultural objects may be tracked relative to one or more optical sights. For example, reflective light from one or more of the agricultural objects may be tracked in a field of view of an image captured by a camera. A field of view of an image capture device may be a parameter (e.g., an angle) through which observable light or electromagnetic radiation may be captured in an image, according to some examples. Also, the reflective light from an agricultural object can be captured in an image and tracked in association with a visible image portion (e.g., a non-occluded image portion).

At 618, a trajectory of an agricultural projectile may be computed (e.g., relative to an emission parameter). In other examples, a trajectory of an agricultural projectile may be computed to adjust an orientation of an emitter, at least in one instance.

At 620, a value of an elapsed time to alignment of an optical sight to an agricultural object may be calculated and tracked. Based on a velocity of an agricultural treatment delivery vehicle, a time to emit an agricultural projectile may be computed and tracked. Hence, tracking an optical sight relative to an agricultural object may be a function of a rate of displacement of one or more emitters or a vehicle (e.g., relative to the soil or the agricultural environment). Further, a portion of the value of the elapsed time may be calculated. The portion of the elapsed time value may describe an amount of time during which the agricultural object is associated with an occluded image portion.

At 622, a determination is made as to whether any of sensor data detects a variance, such as a change in emitter altitude (e.g., a bump or raised elevation, or dip or depression) or any other change in sensor data, such as a variation in vehicle speed. If there is a variance, a trajectory may be recomputed at 624 (e.g., recomputing an emission parameter associated with the trajectory). For example, if a change in emitter altitude changes relative to the ground, an initial optical sight may be misaligned. Thus, another optical sight may be selected at 626. But if there is no variance, flow 600 moves from 622 to 628.

At 628, an agricultural object can be predicted to align with an optical sight to form a predicted emission parameter, which may be monitored to detect alignment of an optical sight and a target. The predicted emission parameter may be tracked in association with agricultural object. For example, a predicted emission parameter may be a predicted emission time, either a duration or elapsed amount of time, or a point in time at which alignment occurs, thereby providing a trajectory via, for example, an optical ray. Further, alignment of an agricultural object with an optical sight may be detected at the predicted emission parameter.

At 630, an emitter is activated to apply an action based on a predicted emission parameter. Thus, emission of an agricultural projectile may be triggered at a predicted emission time. In one example, an emission time may specify a time at which a pixel associated with an optical sight is aligned with an optical ray that extends from the pixel to at least a portion of a targeted agricultural object.

Figure 7A:
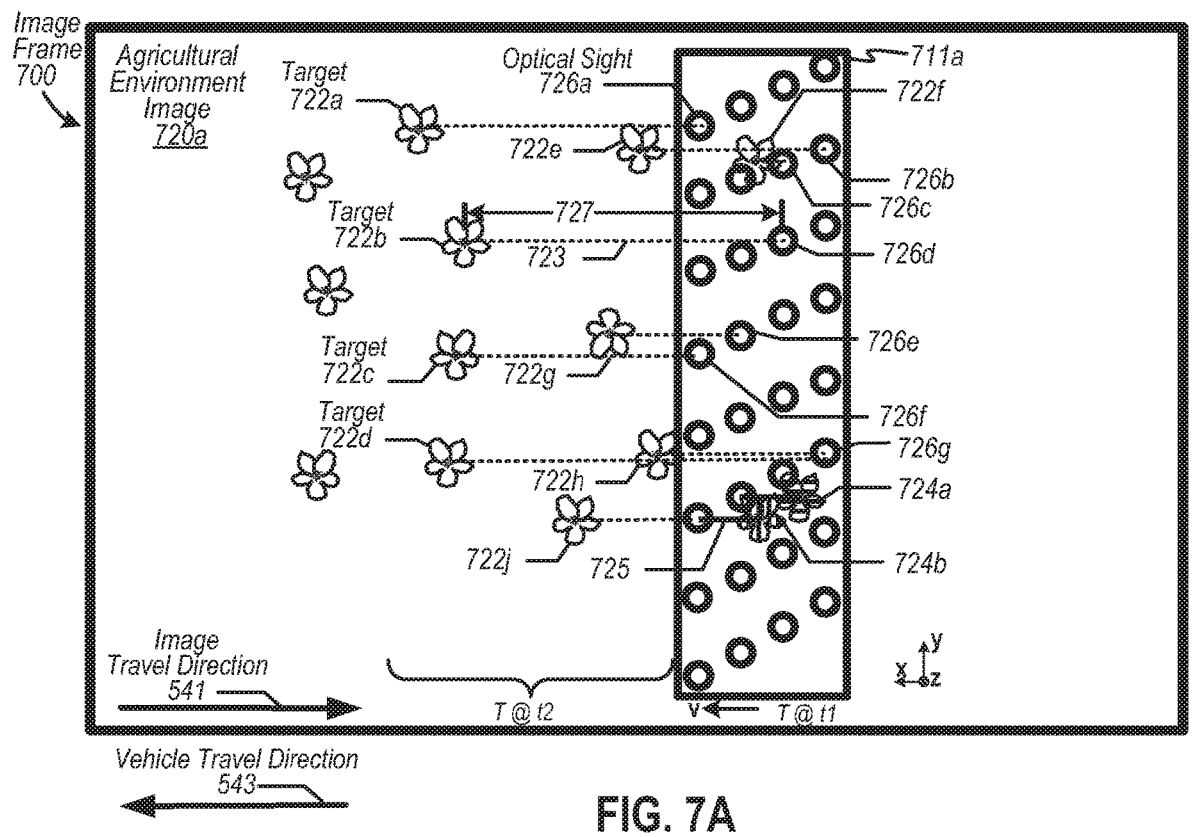
FIGS. 7A and 7B depict examples of data generated to identify, track, and perform an action for one or more agricultural objects in an agricultural environment, according to some examples.
Figure 7B:
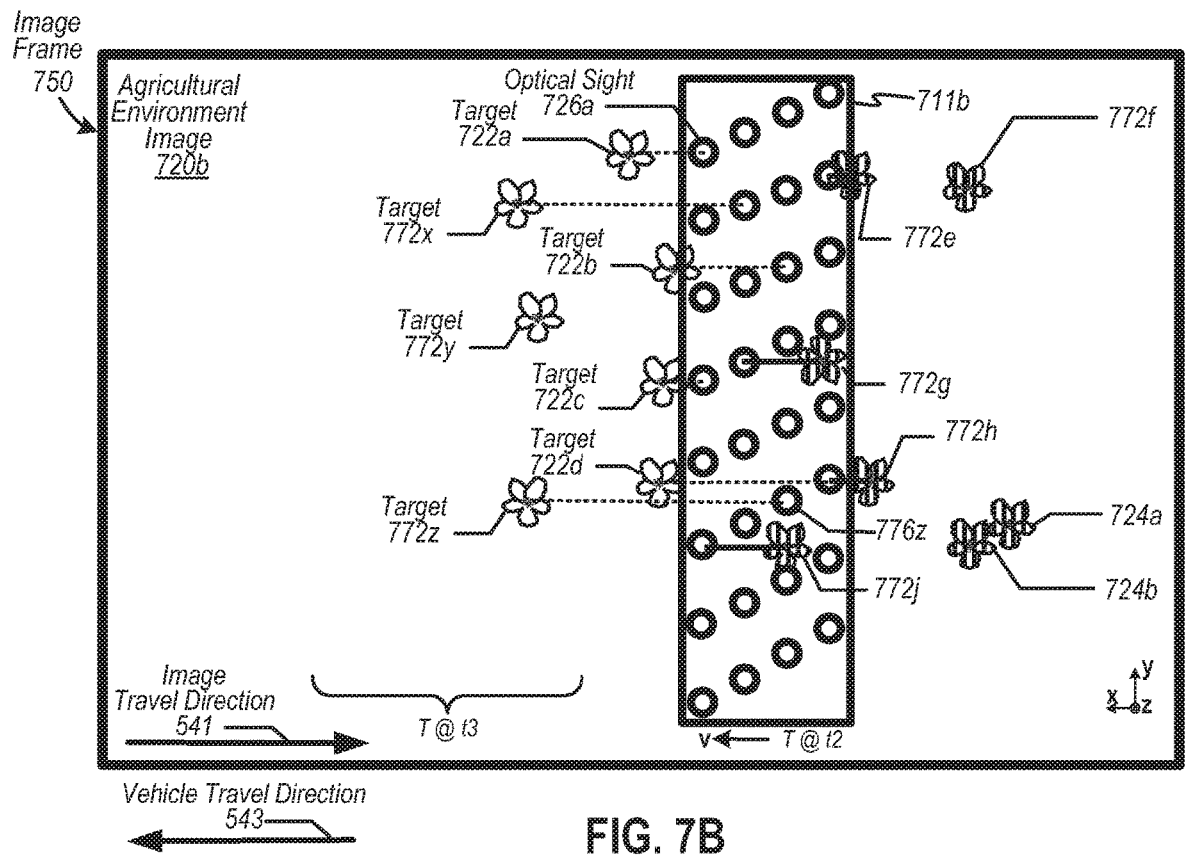

FIGS. 7A and 7B depict examples of data generated to identify, track, and perform an action for one or more agricultural objects in an agricultural environment, according to some examples. FIG. 7A is a diagram depicting an image frame 700 in which an agricultural environmental image 720*a* includes agricultural objects identified as targets 722*a*, 722*b*, 722*c*, 722*d*, 722*e*, 722*f*, 7*ddg*, 722*h*, 722*j*, 724*a*, and 724*b*. In various examples, agricultural environmental image 720*a* may be presented to a user in a graphical user interface (not shown), or may represent data calculations, derivations, functions, and the like based on image data and other data. Agricultural environmental image 720*a* also includes image data 711*a* representing emitters and corresponding optical sights, such as optical sights 726*a*, 726*b*, 726*c*, 726*d*, 726*e*, 726*f*, and 726*g*.

An agricultural projectile delivery system (not shown) may be configured to identify and select optical sight 726*a* (and corresponding emitter) to apply a treatment to target 722*a*. Further, agricultural projectile delivery system may be configured to identify and select optical sights 726*b*, 726*c*, 726*d*, 726*e*, 726*f*, 726*g*, and 726*g* to emit agricultural projectiles to targets 722*e*, 722*f*, 722*b*, 722*g*, 722*c*, 722*h*, and 722*d*, respectively. Note that optical sight 726*g* may be configured to propel an agricultural projectile to both target 722*h* and target 722*d* at, for example, different alignments. Note that dotted lines 723 may represent data configured to specify a distance 727 (e.g., a number of pixels) or a time until a target aligns with an optical sight. Solid lines 725 represent data configured to specify a distance or time subsequent to a treatment, as applied to targets 724*a* and 724*b*. Both targets 724*a* and 724*b* are depicted with crosshatch to signify that one or more treatments have been performed. Any of the above-described actions may be performed by hardware and/or software that provide functionality to an agricultural projectile delivery system. FIG. 7A depicts targets 722*g*, 724*a*, and 724*b* being occluded by image data 711*a* of emitters at a first point in time, t1.

FIG. 7B is a diagram depicting an image frame 750 depicting an image frame 750 in which an agricultural environmental image 720*b* includes agricultural objects identified as targets 722*a*, 722*b*, 722*c*, 722*d*, 722*e*, 722*f*, 7*ddg*, 722*h*, 722*j*, 724*a*, and 724*b*, as well as targets 772*x*, 772*y*, and 772*z*, whereby targets 772*e*, 772*b*, 772*g*, and 772*j* are occluded or partially occluded by image data 711*b* of an array of emitters. Agricultural environmental image 720*b* depicts a state in which targets 724*a*, 724*b*, 772*f*, 772*e*, 772*g*, 772*h*, and 772*j* have received treatment by at least at time, t2. These treated targets are depicted in crosshatch. Targets identified at time, t2, including targets 772*x*, 772*y*, and 772*z*, may be calculated to receive treatment at or within time, t3. As such, targets 772*x*, 772*y*, and 772*z* have been associated with optical sights, such as 776*z*, to detect alignment and trigger propulsion of agricultural projectiles to apply various treatments.

Figure 7C:
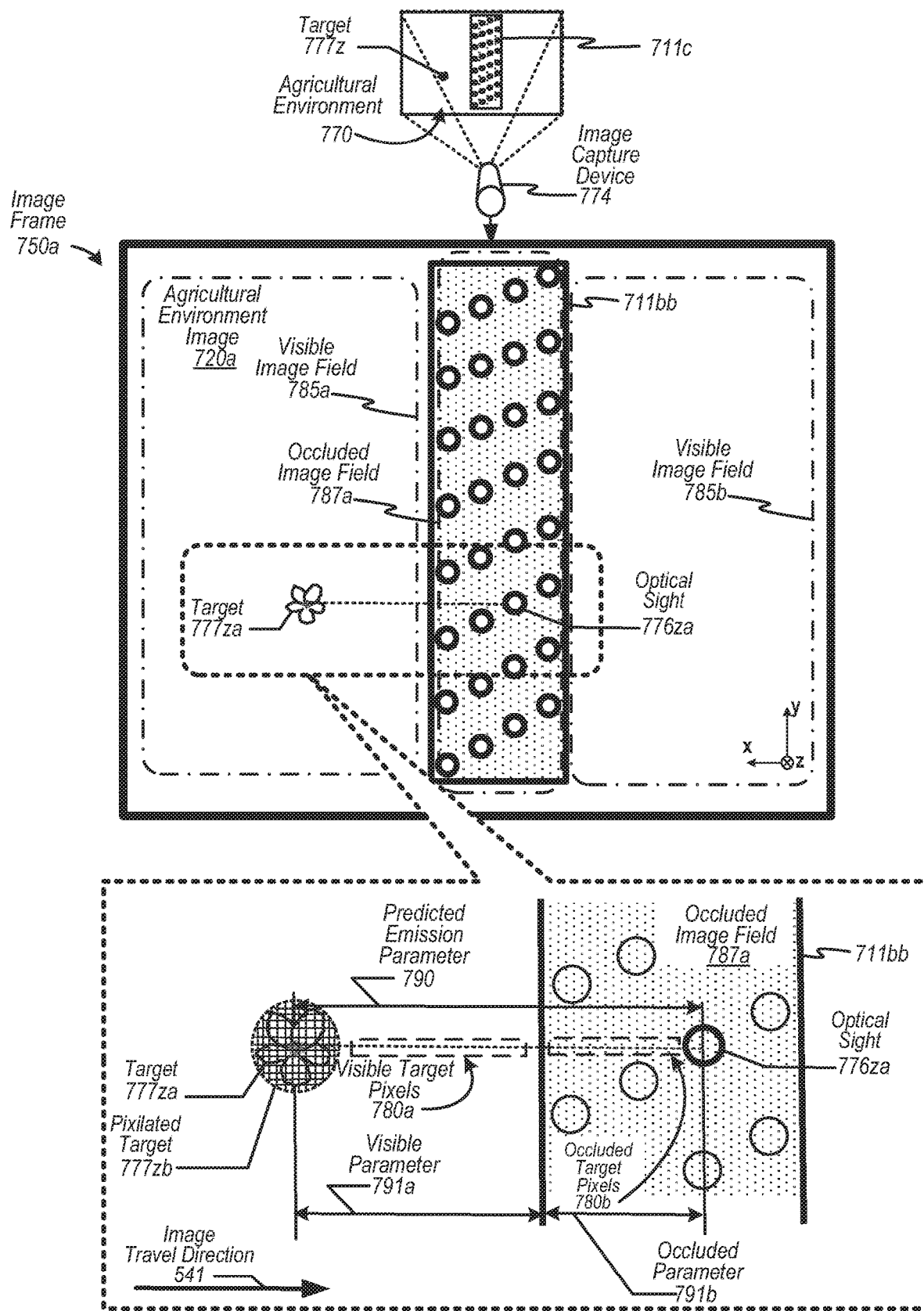
FIG. 7C is a diagram depicting parameters with which to determine activation of an emitter to apply a treatment, according to some examples.

FIG. 7C is a diagram depicting parameters with which to determine activation of an emitter to apply a treatment, according to some examples. FIG. 7C depicts an image capture device 774 capturing image data representing an agricultural environment 770, which includes a target 777*z*, and image data representing an array of emitters 711*c* disposed in a field of view of image capture device 774. Hence, image capture device 774 may be configured to generate an agricultural environment image 720*a* within an image frame 750*a*. Logic of an agricultural projectile delivery system may be configured to identify visible image fields 785*a* and 785*b* in which one or more agricultural objects, such as target 777*za*, are visible (i.e., not occluded). Therefore, digitized or pixelated image data associated with targets, such as target 777*za*, may be observed, identified, and tracked, among other things. Logic of an agricultural projectile delivery system also may be configured to identify occluded image field 787*a* associated with image data 711*bb* of emitter 711*c*. While pixelated data associated with target 777*za* may be tracked in visible image field 785*a*, it may become occluded as motion moves the image of target 777*za* to an optical sight 776*za*.

In at least one example, an agricultural projectile delivery system may be configured to identify target 777*za* and one or more pixels association therewith (e.g., as a pixelated target 777*zb*). The agricultural projectile delivery system may also be configured to derive a predicted emission parameter 790 (e.g., a predicted time) that may be used determine a point in time to activate an emitter to propel a projectile to a target. Further, an agricultural projectile delivery system may also be configured to determine a visible parameter 791*a* during which visible target pixels 780*a* may be analyzed to track, evaluate, and modify predicted emission parameter 790 (e.g., changes in vehicle speed, a gust of wind, or the like). The agricultural projectile delivery system may computationally predict an occluded parameter 791*b* during which occluded target pixels 780*b* may not be visible due to occluded image field 787*a* associated with image data 711*b* of the emitters. As pixels of target 777*za* travel to optical sight 776*za* in an occluded image field 787, a rate at which a pixel of a target 777*za* may align with optical sight 776*za* may be modified based on sensor data (e.g., vehicle speed), which, in turn, may modify data values representing occluded parameter 791*b*, thereby modifying an emission time.

Figure 8:
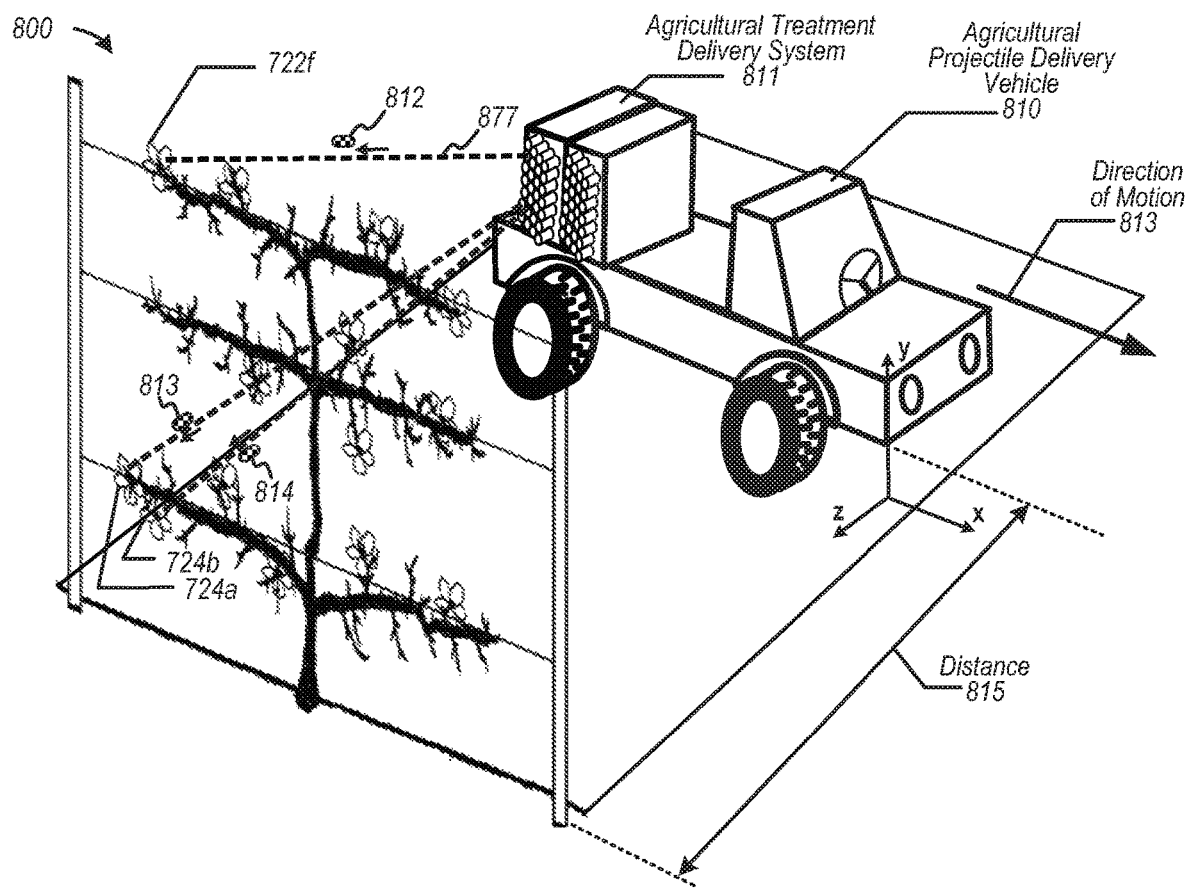
FIG. 8 is a diagram depicting a perspective view of an agricultural projectile delivery vehicle configured to propel agricultural projectiles, according to some examples.

FIG. 8 is a diagram depicting a perspective view of an agricultural projectile delivery vehicle configured to propel agricultural projectiles, according to some examples. Diagram 800 depicts an agricultural projectile delivery vehicle 810 traveling in a direction of motion 813 at a distance 815. Further, diagram 800 depicts an agricultural projectile delivery system 811 detecting blossoms as targets 722*f*, 724*b*, and 724*a* of FIG. 7B and propels agricultural projectiles 812, 814, and 813 to intercept respective targets. In some examples, each of agricultural projectiles 812, 814, and 813 each may be emitted at any angle along a trajectory that lies in a plane that include an optical ray, such as optical ray 877.

Figure 9:
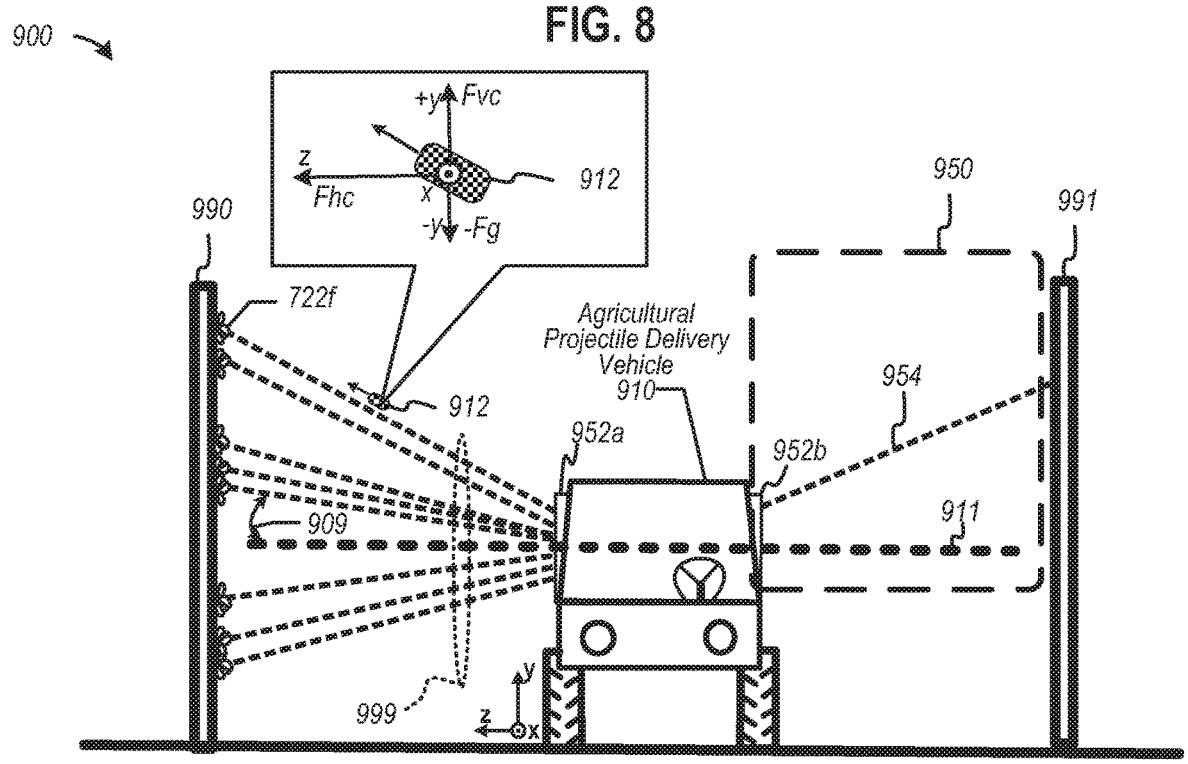
FIG. 9 is a diagram depicting an example of trajectory configurations to intercept targets autonomously using an agricultural projectile delivery vehicle, according to some examples.

FIG. 9 is a diagram depicting an example of trajectory configurations to intercept targets autonomously using an agricultural projectile delivery vehicle, according to some examples. Diagram 900 depicts an agricultural projectile delivery vehicle 910 including an agricultural projectile delivery system 952*a* configured to propel agricultural projectiles, such as agricultural projectile 912, at any angle 909 relative to plane 911. One or more emitters of agricultural projectile delivery system 952*a* may be configured to propel agricultural projectiles via one or more trajectories 999 to intercept any target 722*f* relative to any height above ground. As shown, agricultural projectile delivery system 952*a* may be configured to propel agricultural projectile 912 with a force having a vertical component ("Fvc") and a horizontal component ("Fhc"). As shown, the vertical component of the propulsion force may be in a direction opposite than the force of gravity ("Fg"). Note that horizontal component ("Fhc") may have a magnitude sufficient to propel agricultural projectile 912 over a horizontal distance to target 722*f*. According to some examples, agricultural projectile delivery vehicle 910 may include an agricultural projectile delivery system 952*b* configured to apply treatments via one or more trajectories 954 within a space 950. Therefore, agricultural projectile delivery vehicle 910 may be configured to identify agricultural objects along both sides of agricultural projectile delivery vehicle 910. For example, agricultural projectile delivery vehicle 910 may be configured to identify groups 990 and 991 of agricultural objects (e.g., fruit trees) and may simultaneously apply a treatment or different treatments to either side as agricultural projectile delivery vehicle 910 traverses a path (in the X-direction) between groups 990 and 991 of agricultural objects.

Figure 10:
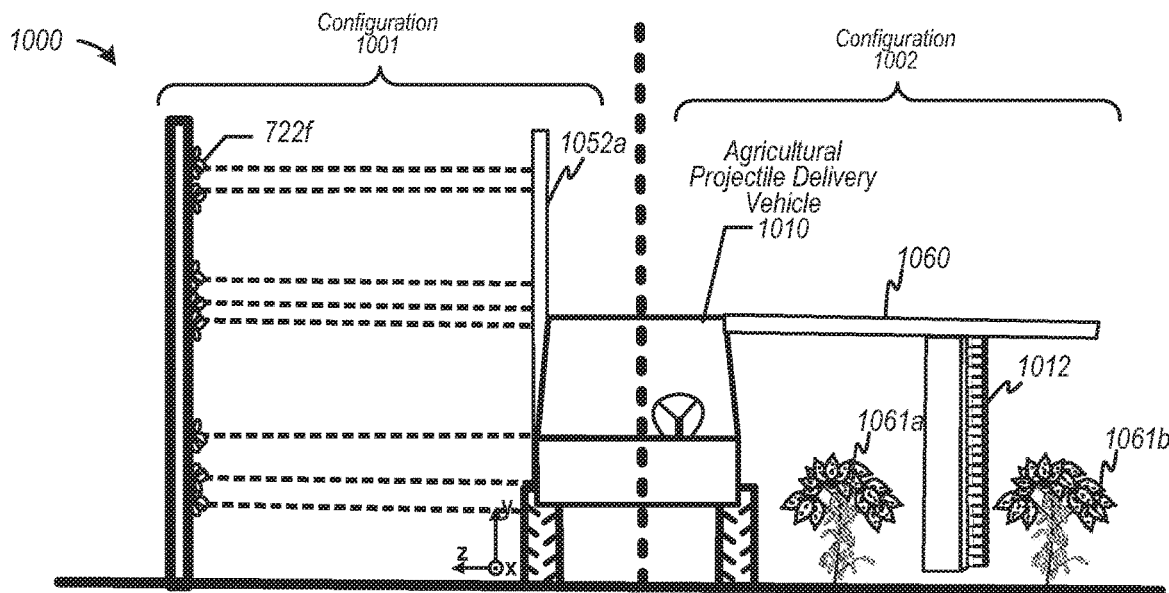
FIG. 10 is a diagram depicting examples of different emitter configurations of agricultural projectile delivery systems, according to some examples.

FIG. 10 is a diagram depicting examples of different emitter configurations of agricultural projectile delivery systems, according to some examples. Diagram 1000 depicts an agricultural projectile delivery vehicle 1010 having at least two exemplary configurations, each of which may be implemented separately (e.g., at different times). Configuration 1001 includes an agricultural projectile delivery system 1052a having any number of emitters configured to emit agricultural projectiles substantially horizontally (e.g., orthogonal or substantially orthogonal to a direction of gravitational force) to target agricultural objects 722f. Configuration 1002 includes a boom 1060 configured to support an agricultural projectile delivery system 1012 configured to identify, monitor, track, and apply a treatment via an agricultural projectile to one or more agricultural objects constituting row crops, such as soybean plant 1061a and soybean plant 1061b, or portions thereof.

Figure 11:
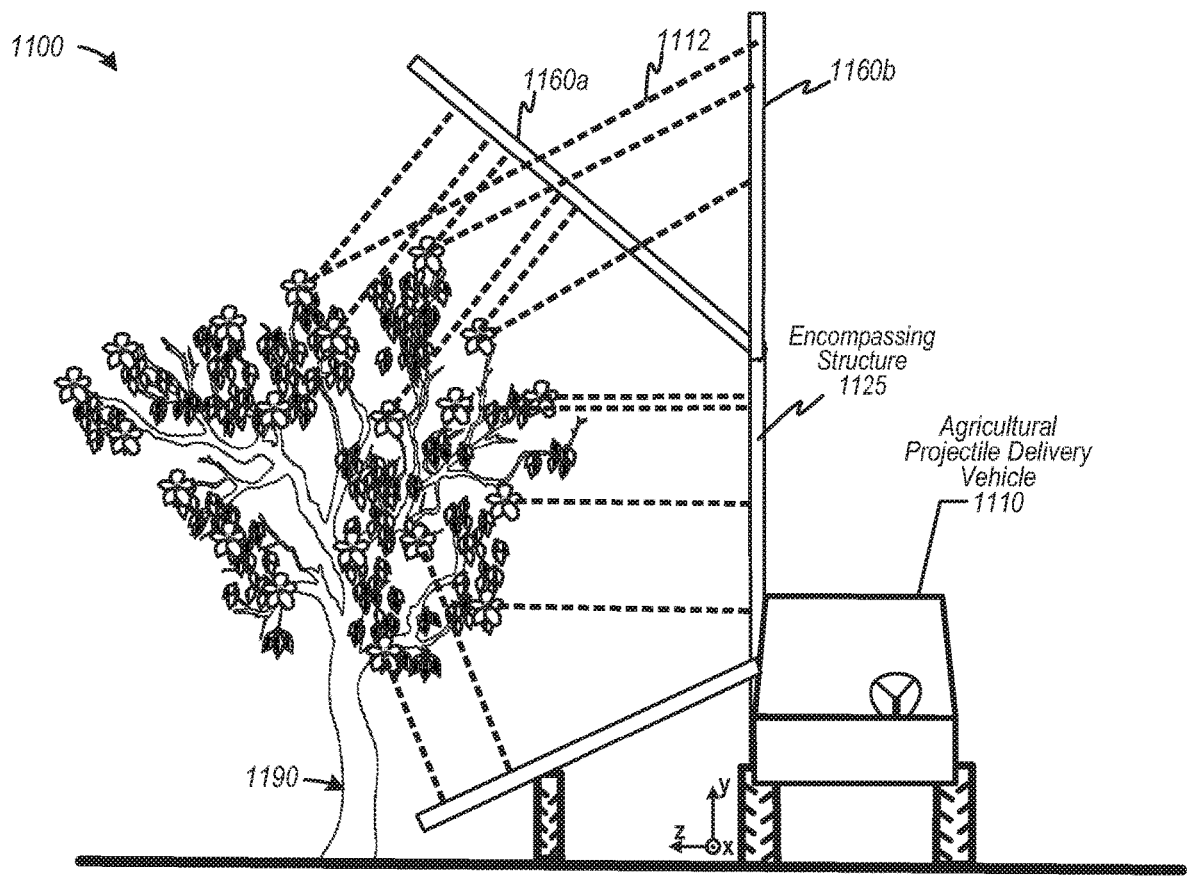
FIG. 11 is a diagram depicting yet another example of an emitter configuration of an agricultural projectile delivery system, according to some examples.

FIG. 11 is a diagram depicting yet another example of an emitter configuration of an agricultural projectile delivery system, according to some examples. Diagram 1100 depicts an agricultural projectile delivery vehicle 1110 having an exemplary configuration in which emitters may be configured to propel an agricultural projectile via any trajectory 1112 from an encompassing structure 1125, which may be configured to apply treatments to any nut or fruit tree having three dimensions of growth. As shown, encompassing structure 1125 may have articulating members that can be positioned in either arrangement 1160a or 1160b. The articulating members may include emitters to apply one or more treatments to one or more agricultural objects associated with a three dimensional vegetative structure, such as an orange tree or walnut tree. The configuration shown in diagram 1100 is not limiting and any configuration of agricultural projectile delivery system may be used to apply treatments to tree 1190.

Figure 12:
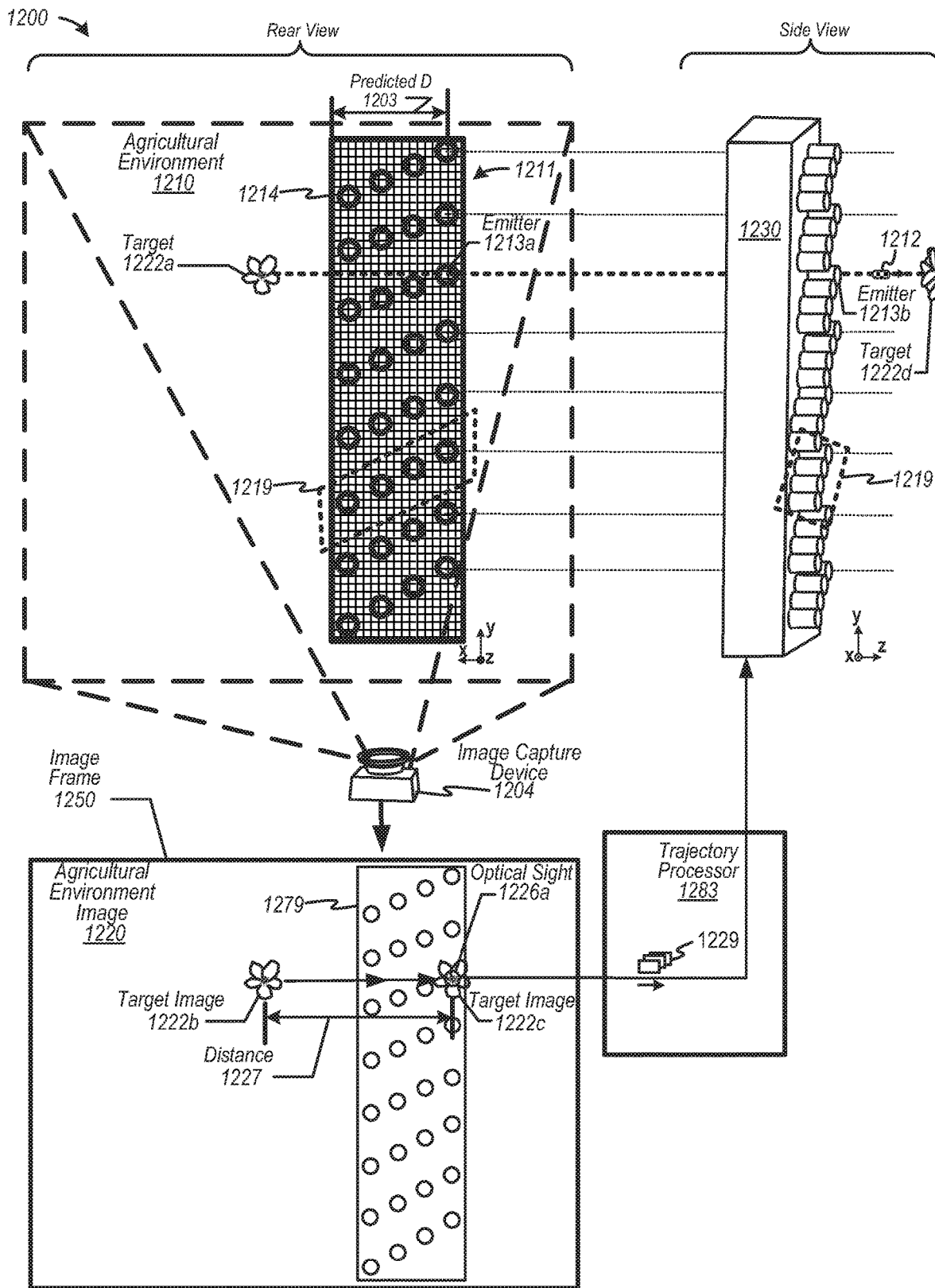
FIGS. 12 and 13 are diagrams depicting examples of a trajectory processor configured to activate emitters, according to some examples.
Figure 13:
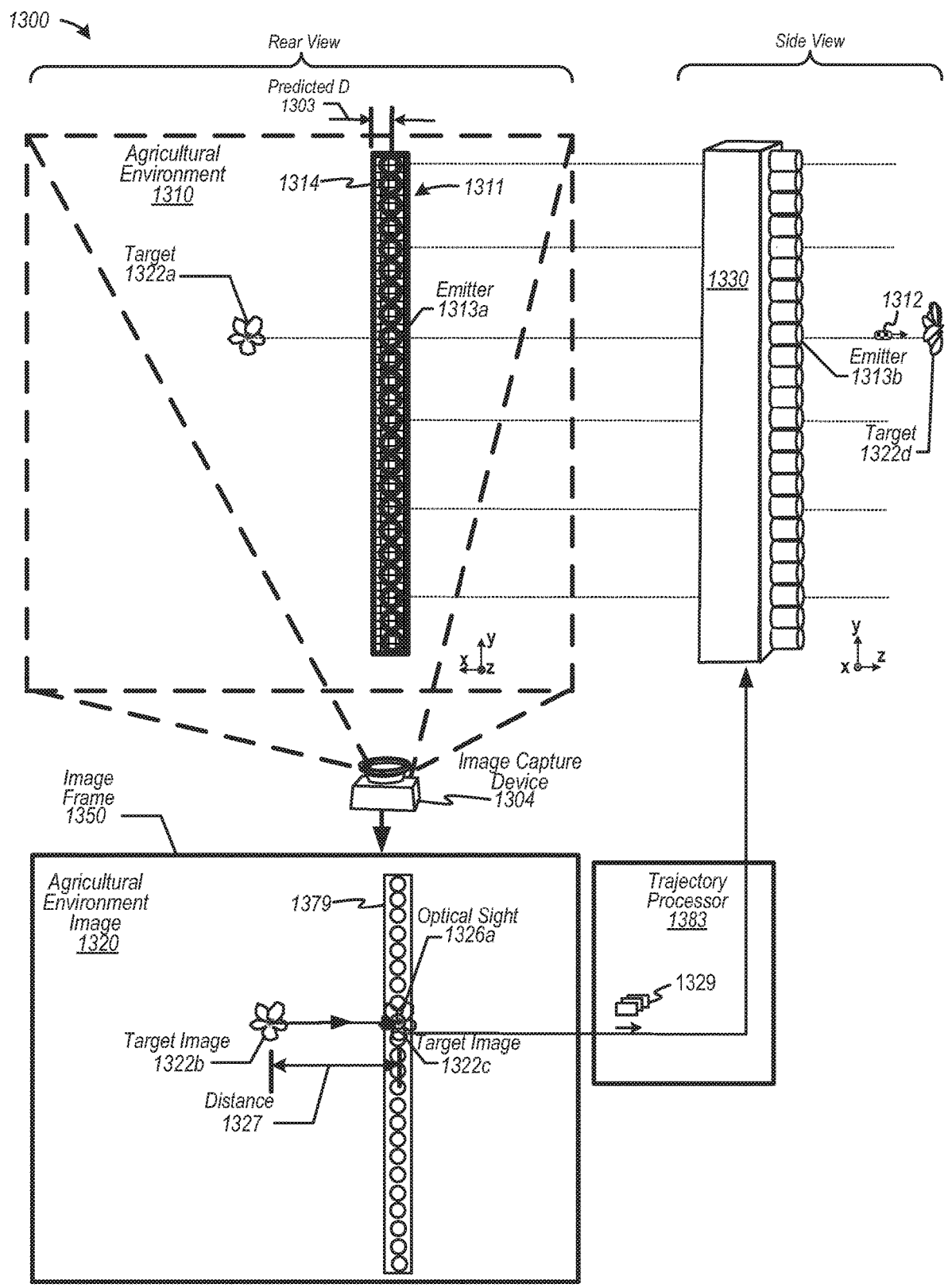

FIGS. 12 and 13 are diagrams depicting examples of a trajectory processor configured to activate emitters, according to some examples. Diagram 1200 of FIG. 12 includes a rear view of an array of emitters 1211 and a side view of an agricultural projectile delivery system 1230. As shown in the rear view, array of emitters 1211 is disposed in a field of view of an image capture device 1204. In particular, array of emitters 1211 may be interposed between a scene being imaged (e.g., agricultural environment 1210, which includes targets 1222a) and image capture device 1204. In some examples, image capture device 1204 may be configured to be "in-line" with optical sights 1214 to determine alignment of an optical sight with a target, such as target 1222a. In diagram 1200, an array of emitters 1211 include groups 1219 of emitters that are each positioned offset in an X-direction and a Y-direction. Note, however, arrangements of emitters into groups 1219 of emitters is a non-limiting example as array of emitters 1211 may each be arranged in any position and in any orientation. Also shown in the rear view, array of emitters 1211 is opaque (e.g., depicted as a shaded region) and occludes images in agricultural environment 1210.

Diagram 1200 also depicts an agricultural environment image 1220, which may be generated by image capture device 1204 and disposed within image frame 1250. Agricultural environment image 1220 includes image data 1279 representing emitters and corresponding optical sights, such as an optical sights 1226a. As array of emitters 1211 traverses in agricultural environment 1210, images of target 1222a, such as target image 1222b in a first position may travel to a second position as target image 1222c (e.g., a position at which target 1222a in agricultural environment 1210 may be occluded).

Diagram 1200 also includes a trajectory processor 1283, which may be configured to track positions of target image 1222b and to determine a distance 1227 (or any other parameter, including time) at which an image of the target (i.e., target image 1222c) aligns with optical sight 1226a. Target processor 1283 may also be configured to calculate and monitor deviations of predicted distance ("D") 1203 during which target 1222 may be occluded by array of emitters 1211. Predicted distance 1203 may correlate to a time from which target 1222a becomes occluded until alignment with an optical sight 1226a. Trajectory processor 1283 may detect a point in time at which target image 1222c aligns (or is predicted to align) with optical sight 1226a, and in response, trajectory processor may generate control data 1229. Control data may transmitted to an emission propulsion system (not shown) in emitter 1230. In addition, control data 1229 may include executable instructions or any data configured to activate emitter 1213b to propel agricultural project 1212 to intercept 1222d.

FIG. 13 depicts a trajectory processor 1383 configured to operate similarly or equivalently as trajectory processor 1283 of FIG. 12. Diagram 1300 of FIG. 13 includes a rear view of an array of emitters 1311 and a side view of an agricultural projectile delivery system 1330. As shown in the rear view, array of emitters 1311 may be disposed in a field of view of an image capture device 1304. Therefore, array of emitters 1311 may be positioned between an agricultural environment 1310, which includes targets 1322a, and image capture device 1304. In diagram 1300, an array of emitters 1311 are arranged in a line (or substantially in a line) in a Y-direction. Note that in some cases, array of emitters 1311 may be arranged in an X-direction. In this example, a predicted distance ("D") 1303 during which a target 1322a may be occluded may be less than, for example, predicted distance 1203 of FIG. 12, thereby enhancing or prolonging visibility of target 1322a as it traverses within an image. According to other examples, each emitter may be arranged in any position and in any orientation. Also shown in the rear view, array of emitters 1311 is depicted with shading to represent that is may be opaque, and may occlude images in agricultural environment 1310.

Diagram 1300 also depicts an agricultural environment image 1320, generated by image capture device 1304 and disposed within image frame 1350. Agricultural environment image 1320 includes image data 1379 representing emitters and corresponding optical sights, such as an optical sight 1326a. As array of emitters 1311 traverses in an agricultural environment 1310, images of target 1322a, such as target image 1322b in a first position may travel to a second position as target image 1322c (e.g., a position at which target 1322a in agricultural environment 1310 may be occluded).

Diagram 1300 also includes a trajectory processor 1383, which may be configured to track positions of target image 1322b and to determine a distance 1327 (or any other parameter, including time) at which an image of the target (i.e., target image 1322c) aligns with optical sight 1326a. Target processor 1383 may also be configured to calculate and monitor deviations of predicted distance ("D") 1303 during which target 1322 may be occluded by array of emitters 1311. Predicted distance 1303 may correlate to a time from which target 1322a becomes occluded until alignment with an optical sight 1326a. Trajectory processor 1383 may detect a point in time at which target image 1322c aligns (or is predicted to align) with optical sight 1326a, and in response, trajectory processor 1383 may generate control data 1329. Control data may be transmitted to an emission propulsion system (not shown) in emitter 1330. In addition, control data 1329 may include executable instructions or any data configured to activate emitter 1313b to propel agricultural project 1312 to intercept 1322d.

FIG. 14 is a diagram depicting an example of components of an agricultural projectile delivery system that may constitute a portion of an emitter propulsion subsystem, according to some examples. Diagram 1400 includes an agricultural projectile delivery system 1430 that includes a number of emitters 1437 (or portions thereof), as well as at least on in-line camera 1401, according to some implementations.

In one example, agricultural projectile delivery system 1430 may include a storage for compressed gas ("compressed gas store") 1431, which may store any type of gas (e.g., air), a gas compressor 1432 to generate one or more propulsion levels (e.g., variable levels of pressure), and a payload source 1433, which may store any treatment or payload (e.g., a liquid-based payload), such as fertilizer, herbicide, insecticide, etc. In another example, agricultural projectile delivery system 1430 may omit compressed gas store 1431 and gas compressor 1432, and may include a pump 1434 to generate one or more propulsion levels with which to propel a unit of payload source 1433. In various implementations, one or more of the components shown in agricultural projectile delivery system 1430 may be included or may be omitted.

Agricultural projectile delivery system 1430 may also include any number of conduits 1435 (e.g., hoses) to couple payload source 1433 to a number of activators 1436, each of which is configured to activate to deliver a unit of payload as, for example, an agricultural projectile, to an identified target. To illustrate operation, consider that control data 1470 is received into agricultural projectile delivery system 1430 to launch one or more units of treatment or payload. Logic in agricultural projectile delivery system 1430 may be configured to analyze control data 1470 to that identify activator 1441 is to be triggered at a point in time, or at a position that aligns a corresponding emitter 1442 to target 1460. When activated, activator 1441 may release an amount of payload (e.g., a programmable amount) with an amount of propulsion (e.g., a programmable amount), thereby causing emitter 1442 to emit a projectile 1412. According to some examples, agricultural projectile delivery system 1430 may be adapted for non-agricultural uses, and may be used to deliver any type of projectile, including units of solids or gases, for any suitable application.

FIG. 15 is a diagram depicting an example of an arrangement of emitters oriented in one or more directions in space, according to some examples. Diagram 1500 includes an arrangement of emitters 1537, one or more of which may be oriented at an 1538 relative to, for example, the ground. Alternatively, one or more subsets of emitters 1537 may be oriented in any angle in the Y-Z plane, any angle in the X-Z plane, or at any angle or vector in an X-Y-Z three-dimensional space. In some examples, one or more optical arrays aligned with emitters 1537 may intersect at one or more locations in space, at which an image capture device may be disposed.

FIG. 16 is a diagram depicting an example of another arrangement of emitters configured to be oriented in one or more directions in space, according to some examples. Diagram 1600 includes an arrangement of emitters 1637, whereby one or more emitters may be configurable to adjust one or more orientations to implement agricultural projectile trajectories in any direction. In this example, a subset of emitters 1637 is depicted to include emitters 1639a, 1639b, 1639c, and 1639d being oriented to, for example, select a trajectory that may optimally deliver a treatment to a target. In some implementations, orientations of each of emitters 1639a, 1639b, 1639c, and 1639d may be configured to deliver at least one agricultural projectile 1612 in the presence of obstructive objects 1640, such as a cluster of blossoms growing over and in front of (e.g., in between) a target agricultural object 1699. As shown, obstructive objects 1640 obstruct trajectories 1690 associated with emitters 1639a, 1639b, and 1639c. Thus, an orientation and/or a position of emitter 1639d facilitates implementing an unobstructed trajectory over which to propel agricultural object 1612 to intercept target objects 1699.

In some examples, emitters 1639a, 1639b, 1639c, and 1639d may each be associated with a camera, such as one of cameras 1641a, 1641b, 1641c, and 1641d. Cameras 1641a, 1641b, 1641c, and 1641d may be implemented to detect alignment (e.g., unobstructed alignment) with a target. Note that while diagram 1600 depicts cameras 1641a, 1641b, 1641c, and 1641d adjacent to corresponding emitters, any of cameras 1641a, 1641b, 1641c, and 1641d may be implemented as "in-line" cameras in which an emitter is disposed in a field of view.

According to various examples, emitters 1639a, 1639b, 1639c, and 1639d may have configurable orientations that may be fixed during application of treatments. In other examples, one or more of emitters 1639a, 1639b, 1639c, and 1639d may have programmable or modifiable orientations or trajectories. As shown, an alignment device 1638 may include logic and one or more motors to orient an emitter to align a trajectory in any direction in three-dimensional space. As such, alignment device 1638 may be configured to modify orientations of emitters in-situ (e.g., during application of treatments).

Figure 17:
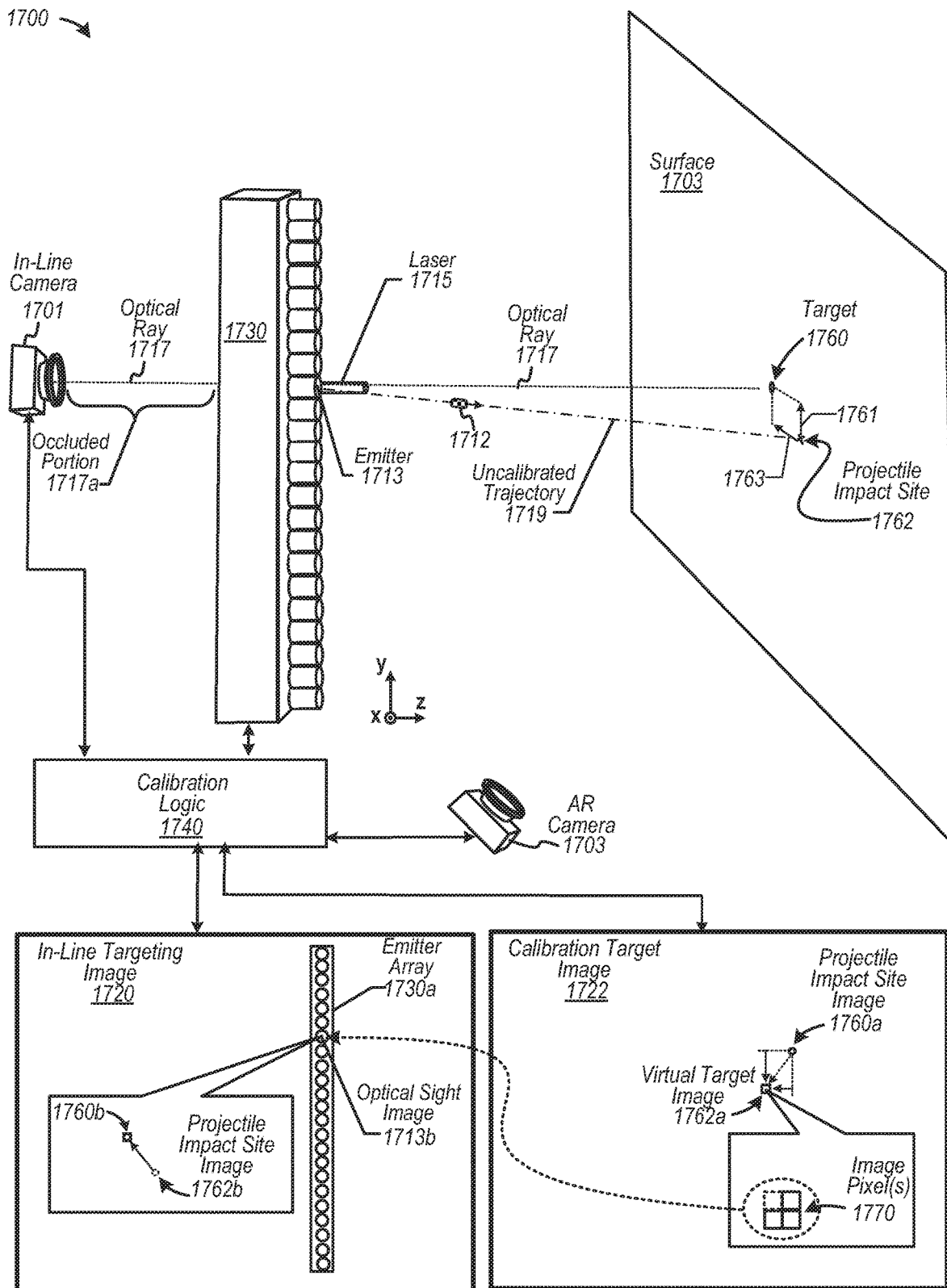
FIG. 17 is a diagram depicting one or more examples of calibrating one or more emitters of an agricultural projectile delivery system, according to some examples.

FIG. 17 is a diagram depicting one or more examples of calibrating one or more emitters of an agricultural projectile delivery system, according to some examples. Diagram 1700 includes an in-line camera 1701 and an agricultural projectile delivery system 1730 including any number of emitters, such as emitter 1713, disposed in the field of view of in-line camera 1701. Diagram 1700 also includes a target 1760 disposed on surface 1703 and calibration logic 1740, which may include hardware and/or software to facilitate calibration of a trajectory of emitter 1713 to guide an emitted agricultural projectile 1712 via a calibrated trajectory to intercept target 1760. In calibration mode, emitter 1713 may be identified or selected for calibration. In some examples, an agricultural projectile trajectory associated with emitter 1713, such as uncalibrated trajectory 1719, may be adjusted to align, for example, coaxially with an optical ray 1717. In at least one alternative example, a timing of activation (e.g., a trigger or activation event at a point in time or within a time interval) may be calibrated to cause agricultural projectile 1712 to optimally intercept target 1760 within a range of accuracy and precision. In other examples, any other operational characteristic of either emitter 1713 or agricultural projectile delivery system 1730 may be calibrated, including, but not limited to, pressure, time-of-flight, rates of dispersal, windage (e.g., to compensate for airflow, whether vehicle-based or wind), etc.

Diagram 1700 also depicts an in-line targeting image 1720 generated by in-line camera 1701. As a number of emitters are disposed in the field of view of in-line camera 1701, a portion of optical ray 1717 may be an occluded portion 1717*a*. In-line targeting image 1720, which is a subset of image data, includes image data representing an emitter array 1730*a* that may occlude visibility to target 1760. Also included is image data representing an optical sight image 1713*b*. Calibration logic 1740 may be configured to access image data to calculate adjustment parameters. In some examples, calibration logic 1740 may be configured to compute an alignment (or associated calibration parameters) of one or more pixels associated with optical sight image 1713*b* to target 1760, and through one or more points in space associated with an aperture of emitter 1712. Hence, each of optical sight image 1713*b*, emitter 1713, and target 1760 may be calibrated to lie (or substantially lie) on an optical ray 1717, thereby forming a calibrated trajectory. In some examples, any emitter may be calibrated to coaxially align with any optical ray that extends from any optical sight to a corresponding target. As such, one or more emitters may be calibrated within a two dimensional plane that may include optical rays extending from optical sight images (and pixels thereof) at different angles.

In a first calibration implementation, calibration logic 1740 may be configured to calculate or predict a projectile impact site 1762 at surface 1703 that may be relative to a reference of alignment. In at least some examples, a focused light source may be implemented to provide a reference alignment mark. In one implementation, a focused light source may project coherent light, such as generated by a laser 1715 (e.g., a laser pointer or other generator of a beam of laser light), as a reference mark onto surface 1703. To calibrate emitter 1713, a laser 1715 may be affixed in relation to uncalibrated trajectory 1719 of emitter 1713 so that emitted laser light terminates or impinges on surface 1703 (i.e., forms a reference mark) that coincides with a projectile impact site 1762 if projectile 1712 was propelled to impact surface 1703. Hence, a point on surface 1703 at which coherent light impinges may be aligned with projectile impact site 1762. In this configuration, a direction of emitted laser light and a direction of emitter 1713 may be varied in synchronicity to adjust a predicted impact site 1762 (i.e., reflected laser light) to coincide with target 1760, which may be aligned with optical array.

In some examples, calibration logic 1740 may be configured to access in-line targeting image data 1720, or any other image data, to receive image data depicting reflected laser light emanating from predicted projectile impact site 1762. Calibration logic 1740 may be configured to calculate one or more calibration parameters to align predicted projectile impact site 1762 with optical ray 1717. For example, calibration logic 1740 may calculate calibration parameters that include an elevation angle and/or an elevation distance 1761 (e.g., in a Y-Z plane) as well as an azimuthal angle and/or an azimuthal distance 1763 (e.g., in an X-Z plane). In at least one implementation, a direction of emission of emitter 1713 may be adjusted to align reflected laser light with optical ray 1717 by, for example, adjusting direction of an aperture of a nozzle. Therefore, predicted impact site 1762 may be adjusted by an elevation angle and an azimuthal angle to coincide with target 1760. Note that adjusting projectile impact site image 1762*b* may cause it to become occluded in image 1720 as it is aligned with target image 1760*b*.

In at least one case, to confirm calibration, a confirmatory agricultural projectile 1712 may be propelled to confirm sufficient calibration upon intercepting target 1760. Calibration logic 1740 may be configured to detect impact of confirmatory agricultural projectile 1712 at target 1760, and if adjustment may be available, then calibration logic 1740 may further compute calibration parameters. Target 1760 may be implemented at a horizontal distance from emitter 1713, the horizontal distance being perpendicular or substantially perpendicular to a direction of gravity.

In a second calibration implementation, a visual fiducial marker (not shown) may be attached to a back of each emitter 1713, and an alignment arm (not shown) may be coupled to each emitter such that an alignment arm may be configured to rotate a nozzle. The alignment arm may be manually or autonomously rotated to cause visual fiducial marker to become visible an image. When visible, calibration logic 1740 may deem emitter 1713 (e.g., a nozzle) aligned with optical ray 1717. This implementation enables servoing to effectuate calibration using image 1720, with optional use of target 1760.

In yet another calibration implementation, one or more cameras, such as AR camera 1703, may be implemented with in-line camera 1701 to calibrate an emitter trajectory, whereby AR camera and in-line camera 1701 may capture imagery in synchronicity. In this example, AR camera 1703 may be configured to facilitate imagery with augmented reality ("AR"). Hence, AR camera 1703 may be configured to generate a virtual target image 1762*a* for target 1760 in calibration target image 1722. As shown, calibration target image 1722 includes a virtual target image 1762*a* that may include one or more image pixels 1770 that coincide with optical sight 1713*b*. As shown, virtual target image 1762*a* is not occluded by an array of emitters. Therefore, projectile impact site image 1760*a*, which may be identified by reflective laser light, may facilitate adjustment to align with virtual target image 1762*a*. When aligned, optical sight 1713*b*, aperture direction of emitter 1713, and target 1760 may be aligned with optical ray 1717. In this implementation, calibration target image 1722 omits occluded imagery associated with image 1720.

Figure 18:
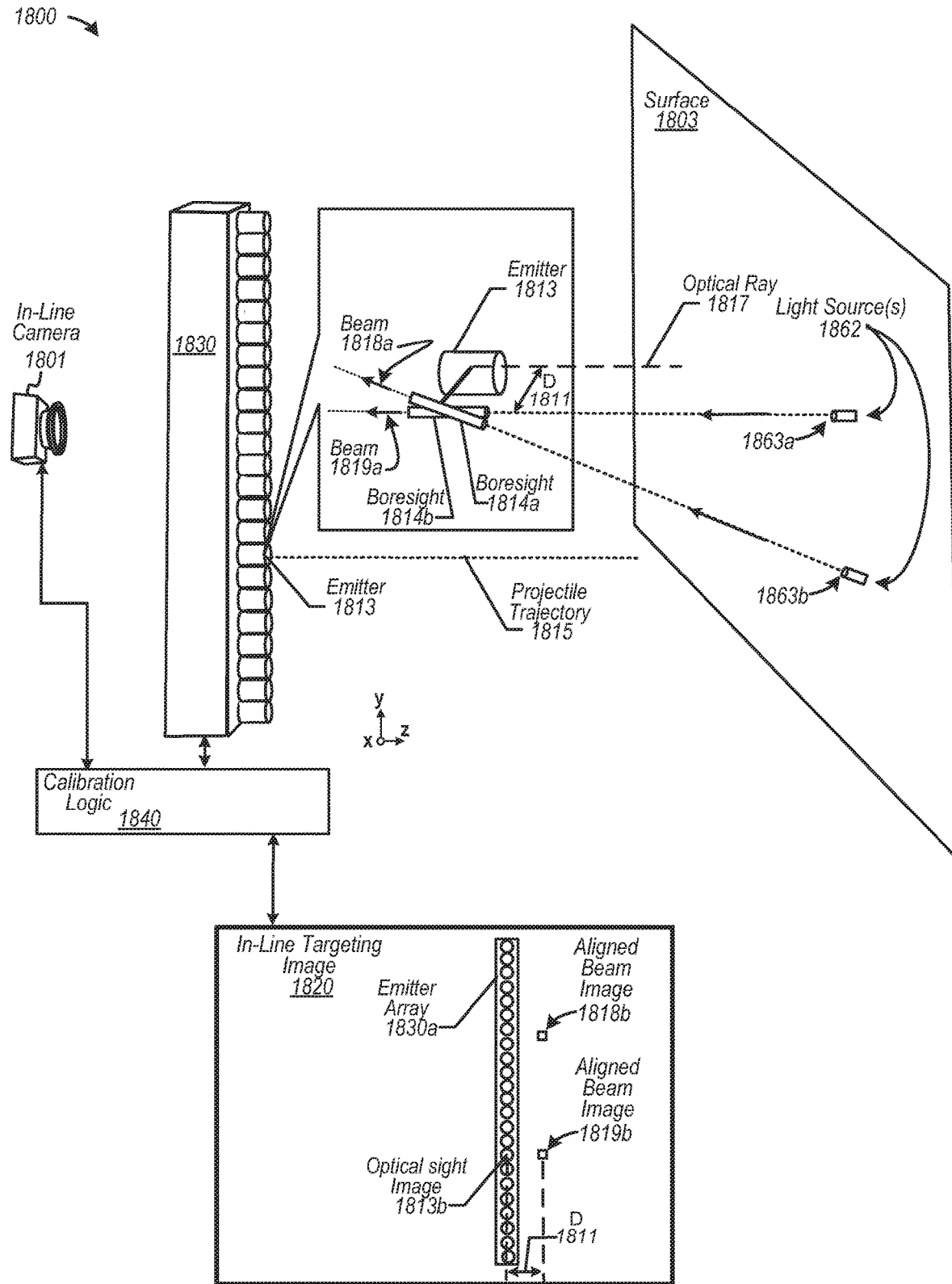
FIG. 18 is a diagram depicting another one or more examples of calibrating one or more emitters of an agricultural projectile delivery system, according to some examples.

FIG. 18 is a diagram depicting another one or more examples of calibrating one or more emitters of an agricultural projectile delivery system, according to some examples. Diagram 1800 includes an in-line camera 1801 and an agricultural projectile delivery system 1830 including any number of emitters, such as emitter 1813, disposed in the field of view of in-line camera 1801. Diagram 1800 also includes one or more light sources 1862 disposed on surface 1803, such as light sources 1862. In some examples, light sources 1862 may be reflective light (e.g., reflective laser light) originated at points 1863*a* and 1863*b* (lasers not shown). Diagram 1800 includes calibration logic 1840 that may include hardware and/or software configured to facilitate calibration of a trajectory 1815 of emitter 1813 to guide an emitted agricultural projectile via a calibrated trajectory to intercept a target (not shown). In calibration mode, emitter 1813 may be identified or selected for calibration. In some examples, an agricultural projectile trajectory 1815 associated with emitter 1813 may be adjusted to align, for example, coaxially with an optical ray 1817.

In this example, emitter 1813 may be coupled (e.g., rigidly) to one or more boresights 1814. As shown, boresight 1814*a* and boresight 1814*b* are affixed at a distance 1811 to emitter 1813, and each boresight includes an interior space through which light may pass as a boresight is aligned with a source of light (or beam of light). In some examples, each interior space of boresight 1814*a* and boresight 1814*b* may be oriented coaxially with a line in three-dimensional space at any angle, regardless whether boresight 1814*a* and boresight 1814*b* are similarly or differently oriented. In this configuration, boresight 1814*a* and boresight 1814*b* are oriented such that when corresponding sources of light passes through each, emitter 1813 is deemed aligned with optical ray 1817. For example, if beams of light 1818*a* and 1819*b*, originating at respective sources of light 1862, are detected to pass through boresight 1814*a* and boresight 1814*b*, respectively, a trajectory for emitter 1813 is aligned with optical ray 1817. Note that distance 1811 may be sufficient to enable beams of light 1818*a* and 1819*b* to pass through boresight 1814*a* and boresight 1814*b*, respectively, and be detectable as aligned beam images 1818*b* and 1819*b*, respectively, in in-line targeting image 1820.

Diagram 1800 also depicts an in-line targeting image 1820 generated by in-line camera 1801. As a number of emitters are disposed in the field of view of in-line camera 1801, a portion of optical ray 1817 may be an occluded portion. In-line targeting image 1820, which is a subset of image data, includes image data representing an emitter array 1830*a* that may occlude visibility to a target. Also included is image data representing an optical sight image 1813*b*. Calibration logic 1840 may be configured to access image data, such as aligned beam images 1818*b* and 1819*b*, to calculate adjustment parameters to align boresight 1814*a* and boresight 1814*b* to beams of light 1818*a* and 1819*b*, thereby causing alignment of emitter 1813 coaxially to optical ray 1817. Calibration logic 1840 may further be configured to detect aligned beam images 1818*b* and 1819*b* during calibration to indicate projectile trajectory 1815 is aligned.

Figure 19:
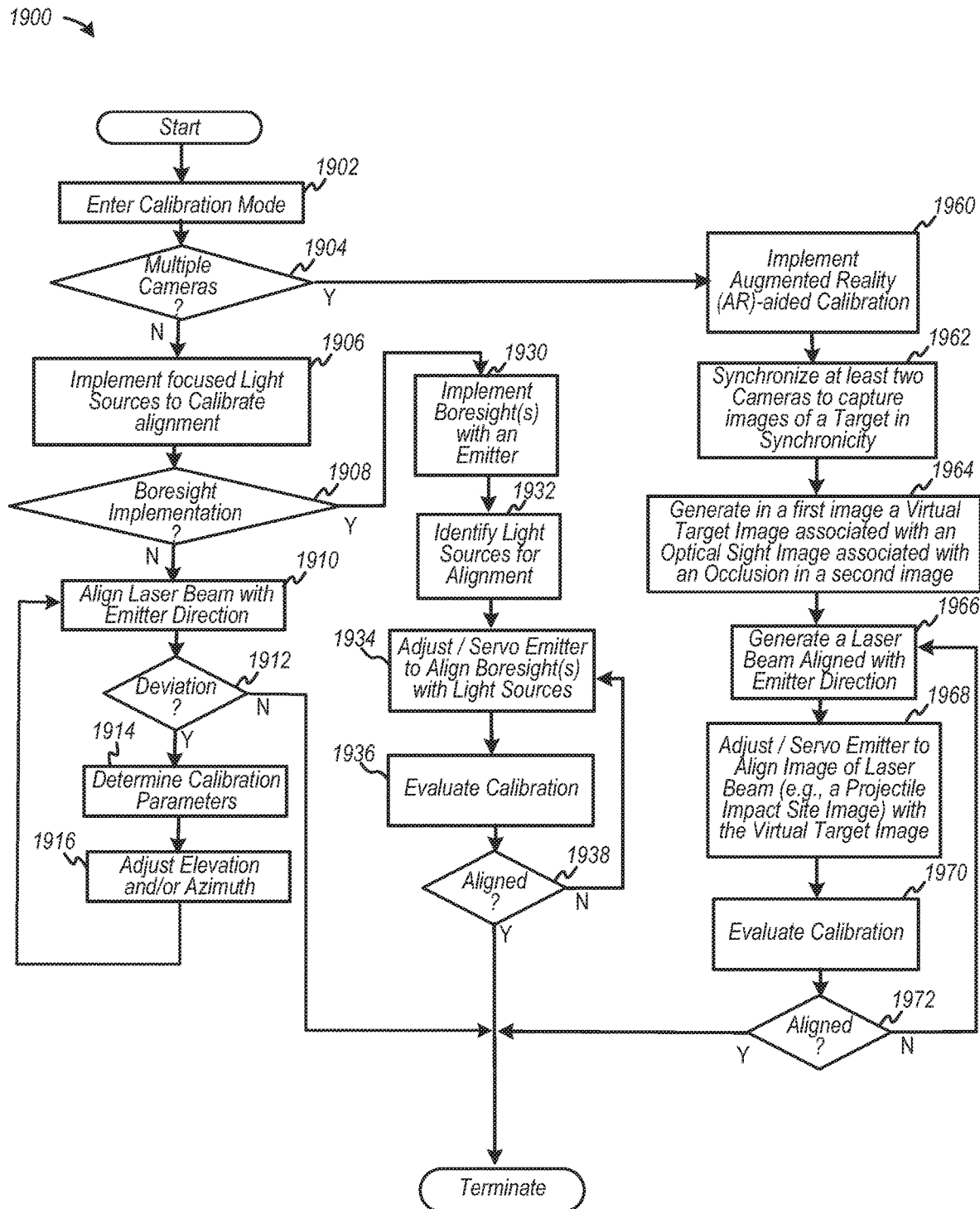
FIG. 19 is an example of a flow diagram to calibrate one or more emitters, according to some embodiments.

FIG. 19 is an example of a flow diagram to calibrate one or more emitters, according to some embodiments. Flow 1900 begins at 1902. At 1902, a calibration mode is entered to calibrate one or more emitters during which a trajectory of an emitter (e.g., a nozzle) may be adjusted to intercept a target, such as an agricultural object. In calibration mode, hardware and/or software may be configured to implement calibration logic to facilitate calibration. In calibration mode, an emitter of an agricultural projectile delivery system may be identified or otherwise selected for calibration. For example, an emitter may be adjusted to calibrate a trajectory of an agricultural projectile to intercept a target. Hence, an uncalibrated trajectory may be adjusted to align, for example, coaxially with an optical ray, at least in some examples.

At 1904, a determination is made as to whether multiple cameras may be used during calibration. For example, at least one additional camera may be used to generate augmented reality-based imagery. If no, flow 1900 continues to 1906, at which focused light sources may be implemented to calibrate alignment. Examples of focused light sources include coherent light sources (e.g., laser light sources), or any other type of light source. At 1908, a determination is made as to whether one or more boresights may be implemented. If not, flow 1900 continues to 1910, at which a laser beam may be aligned with an emitter aperture (e.g., trajectory) direction to align to a reference mark (e.g., laser light) that may be coincident to a predicted projectile impact site (e.g., via the trajectory). A determination is made at 1912 as to whether a reference laser light coincides with a target, which may be aligned with an optical ray. If there is not a deviation, then an emitter trajectory may be deemed calibrated. But if there is a deviation, flow 1900 continues to 1914 at which one or more calibration parameters may be determined (e.g., elevation-related parameters, azimuthal-related parameters, and the like). At 1916, emitter (e.g., nozzle) may be adjusted relative to a number of elevation degrees or azimuthal degrees, and flow 1900 continues to determine if another calibration adjustment results in calibration.

Referring back to 1908, if a determination indicates a boresight is implemented, flow 1900 continues to 1930. At 1930, one or more boresights may be implemented with an emitter. In some cases, one or more boresights may be oriented with one or more lines, and may be rigidly affixed to an emitter. In other cases, one or more boresights need not be rigidly affixed and may be adjustably moveable relative to an emitter. At 1932, one or more light sources may be identified for alignment, the light being reflective light from one or more lasers. At 1934, an emitter may be adjusted manually or autonomously to align one or more boresights with one or more light sources. At 1936, calibration may be evaluated by, for example, detecting light beams passing through each boresight. If each boresight is detected to allow light to pass through its interior, then an emitter is calibrated. Otherwise, flow 1900 continues back to 1934 to perform a next calibration operation.

Referring back to 1904, if a determination indicates multiple camera may be used, flow 1900 continues to 1960. At 1960, an automated reality ("AR")-aided calibration camera may be implemented. At 1962, at least two cameras may be synchronized to capture images of a target or other objects in synchronicity. For example, an in-line camera and an AR camera may be synchronized such that, for example, each pixel in an image generated by the AR camera is similar or equivalent to a corresponding pixel in the in-line camera. At 1964, a virtual target image may be generated in an image generated by an AR camera, the virtual target image including pixels associated with an optical sight in another image generated by an in-line camera. At 1966, a laser beam aligned with a direction of an emitter may be generated. At 1968, an emitter (or nozzle) may be adjusted to align an image of a laser beam with a virtual target image, thereby calibrating an emitter. At 1970, calibration of an emitter may be evaluated, and may be recalibrated if so determined at 1972. If recalibration is needed, flow 1900 returns to 1966. Otherwise, flow 1900 terminates.

Figure 20:
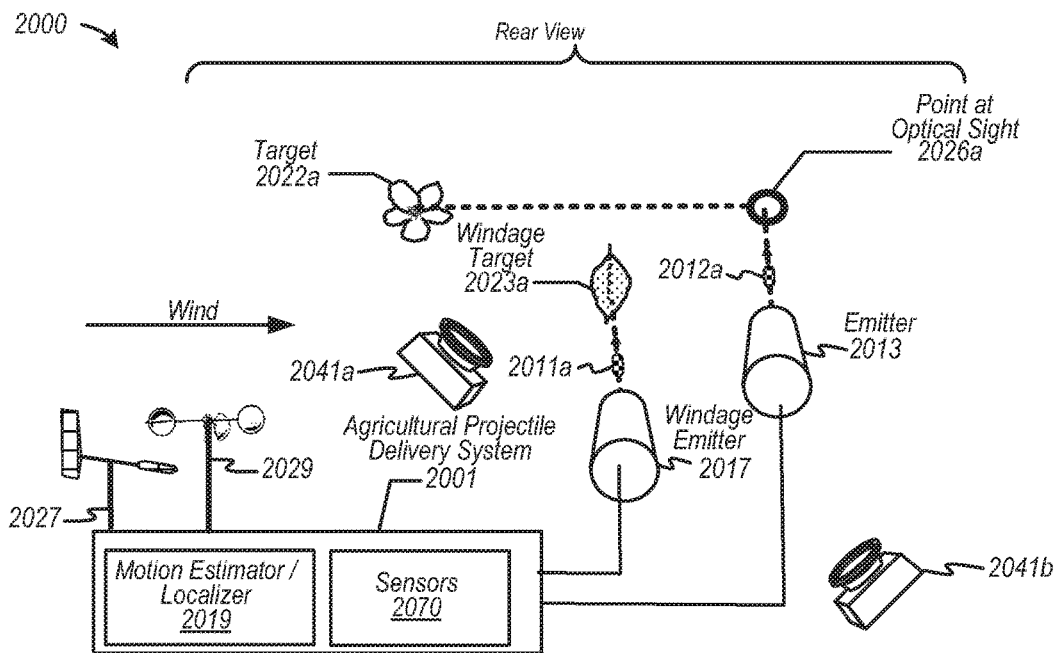
FIGS. 20 and 21 are diagrams depicting an example of calibrating trajectories of agricultural projectiles in-situ, according to some examples.
Figure 21:
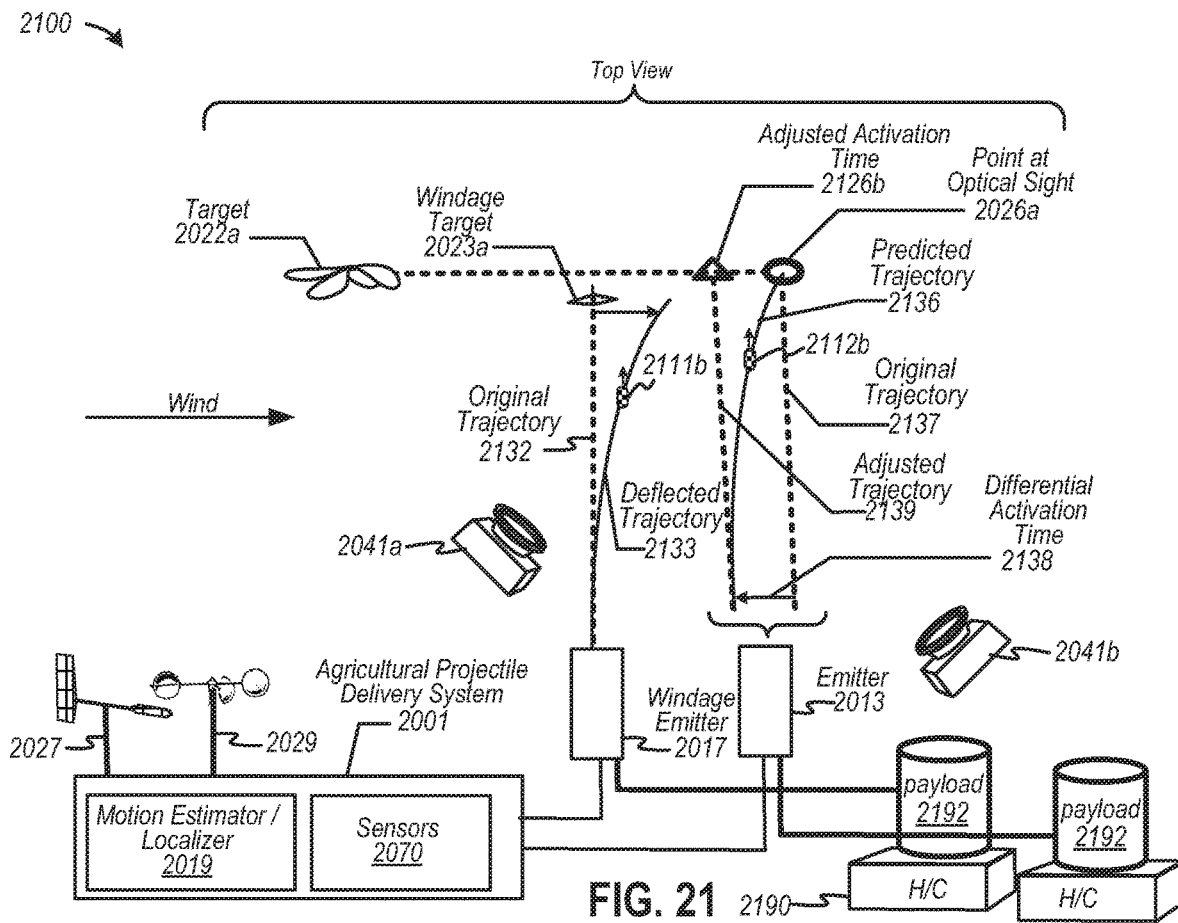

FIGS. 20 and 21 are diagrams depicting an example of calibrating trajectories of agricultural projectiles in-situ, according to some examples. Diagram 2000 of FIG. 20, which is a rear view of exemplary calibration components, includes an agricultural projectile delivery system 2001 including a motion estimator/localizer 2019 and one or more sensors 2070, including airflow direction sensor 2027 and airflow speed sensor 2029. Diagram 2000 also includes a windage emitter 2017 and an emitter 2013, as well as image capture devices 2041*a* and 2041*b*. Windage emitter 2017 may be configured to emit a sacrificial or test emission, such as projectile 2011*a*, to determine, for example, effects of abiotic or environmental factors, including effects of a gust of wind on a trajectory of emitter 2013. Emitter 2013 may be configured to deliver a treatment to an agricultural target 2022*a* at an emission time at which target 2022*a* aligns with a point at optical sight 2026*a*. Note that elements depicted in diagram 2000 of FIG. may include structures and/or functions as similarly-named elements described in connection to one or more other drawings.

In operation, target 2022*a* may be identified as an agricultural object to which a treatment may be applied via emitter 2013. Sensors 2070 may be used to identify a non-actionable target, such as a leaf 2023*a*, to perform a windage evaluation. Hence, logic in agricultural projectile delivery system 2001 may classify leaf 2023*a* as a windage target 2023*a*. In some examples, windage emitter 2017 may be configured to emit an inert material, such as water, as projectile 2011*a* to evaluate wind as a factor. Camera 2041*a* may be used to determine whether water-based projectile 2011a intercepts windage target 2023a. Based on whether projectile 2011a intercepts windage target 2023a, a trajectory for emitter 2013 may be modified in-situ (e.g., during application of one or more treatments) to enhance probabilities that an agricultural projectile 2012a intercepts target 2022a. Camera 2041b may be used to determine whether projectile 2012a intercepts target 2022a. Note that in some cases, windage emitter 2017 may be implemented as another emitter 2013 that applies a treatment.

FIG. 21 is a diagram 2100 that includes a top view of exemplary calibration components, whereby sensors 2027 and 2029 and cameras 2041a and 2041b may be implemented to adjust trajectories of emitter 2013 to counter environmental effects including wind. Note that elements depicted in diagram 2100 of FIG. 21 may include structures and/or functions as similarly-named elements described in connection to FIG. 20 or any other one or more other drawings. In operation, consider an example in which an original trajectory 2132 of a windage projectile 2111b may be generated by logic of agricultural projectile delivery system 2001 to counter wind as sensed by sensors 2027 and 2029. Further, the logic may be configured to track a time to emit windage projectile 2111b. As shown, camera 2014a may capture imagery depicting windage projectile 2111b being deflected onto a deflected trajectory 2133 due to, for example, wind or other external forces. In response, logic of agricultural projectile delivery system 2001 may be configured to adjust original trajectory 2137 of emitter 2013 to calculate an adjusted trajectory 2139 so that an agricultural projectile may be delivered to a target via a predicted trajectory 2136. In some cases, adjusted trajectory 2139 may be associated with an adjusted activation time 2126b at which emitter 2013 may propel agricultural projectile 2112b via a predicted trajectory 2139 so as to intercept target 2022a as if aligned with optical sight 2026a. Note that adjusted activation time 2126b may be adjusted from an initial activation time by an amount identified as differential activation time 2138. In some alternative examples, payloads 2192 emitted by windage emitter 2017 and emitter 2013 may be associated with heating/cooling ("H/C") elements 2190 to apply or extract different amounts of thermal energy. In examples in which cameras 2041a and 2041b are configured to detect infrared light, payloads 2192 may be elevated or cooled to different temperatures for application to agricultural objects at night time (e.g., without sunlight). Temperature differentials of payloads may be distinguishable from each other as well as from infrared light reflected from various agricultural objects. As such, one or more agricultural treatments may be applied to agricultural objects at any time of the day regardless of the presence of sunlight.

Figure 22:
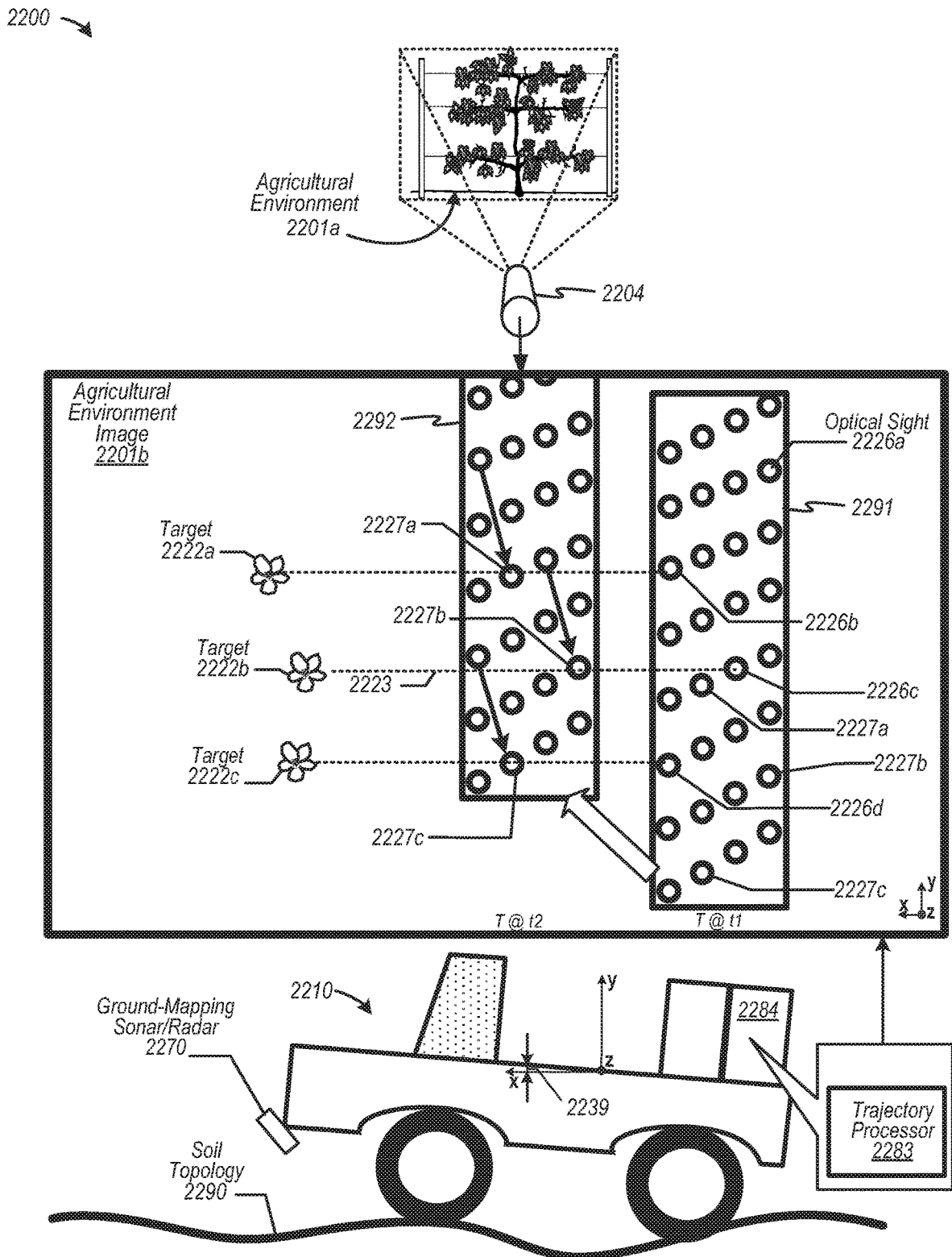
FIG. 22 is a diagram depicting deviations from one or more optical sights to another one or more optical sights, according to some examples.

FIG. 22 is a diagram depicting deviations from one or more optical sights to another one or more optical sights, according to some examples. Diagram 2200 includes an image capture device 2204 configured to generate an agricultural environment image 2201b based on agricultural environment 2201a. Diagram 2200 also includes an agricultural treatment delivery vehicle 2219 with a ground-mapping sonar/radar sensor unit 2270 and a trajectory processor 2283 of an agricultural treatment delivery system 1284. At a time, t1, trajectory processor 2283 may be configured to detect a first subset of optical sights for images of targets 2222a, 2222b, and 2222c, and may be further configured to track movement of pixels representing images of targets 2222a, 2222b, and 2222c via, for example, a projected alignment tracking line, such as line 2223. Here, trajectory processor 2283 at time, t1, may be configured to select optical sight 2226b to align with target 2222a, select optical sight 2226c to align with target 2222b, and select optical sight 2226d to align with target 2222c.

At time, t2, initial positions of an array of emitters 2291 at time, t1, is changed to another position (e.g., relative to positions of targets 2222a to 2222c) and is depicted as an array of emitters 2292 at time, t2. For example, one or more sensors (e.g., accelerometers and the like) may detect a change in elevation 2239 as vehicle 2210 traverses uneven soil topology 2290. Responsive to a change in elevation, a second subset of optical sights may be selected to align with targets 2222a to 2222c. For example, optical sight 2227a may be selected to align with target 2222a, optical sight 2227b may be selected to align with target 2222b, and optical sight 2227c may be selected to align with target 2222c. Therefore, trajectory processor 2283 may be configured to de-select and select any optical sight as a function of whether an optical sight is optimal. Ground-mapping sonar/radar sensor unit 2270 may be configured to scan a surface of ground topology 2290 to identify elevations (e.g., bumps) to predict changes in optical sight selection.

Figure 23:
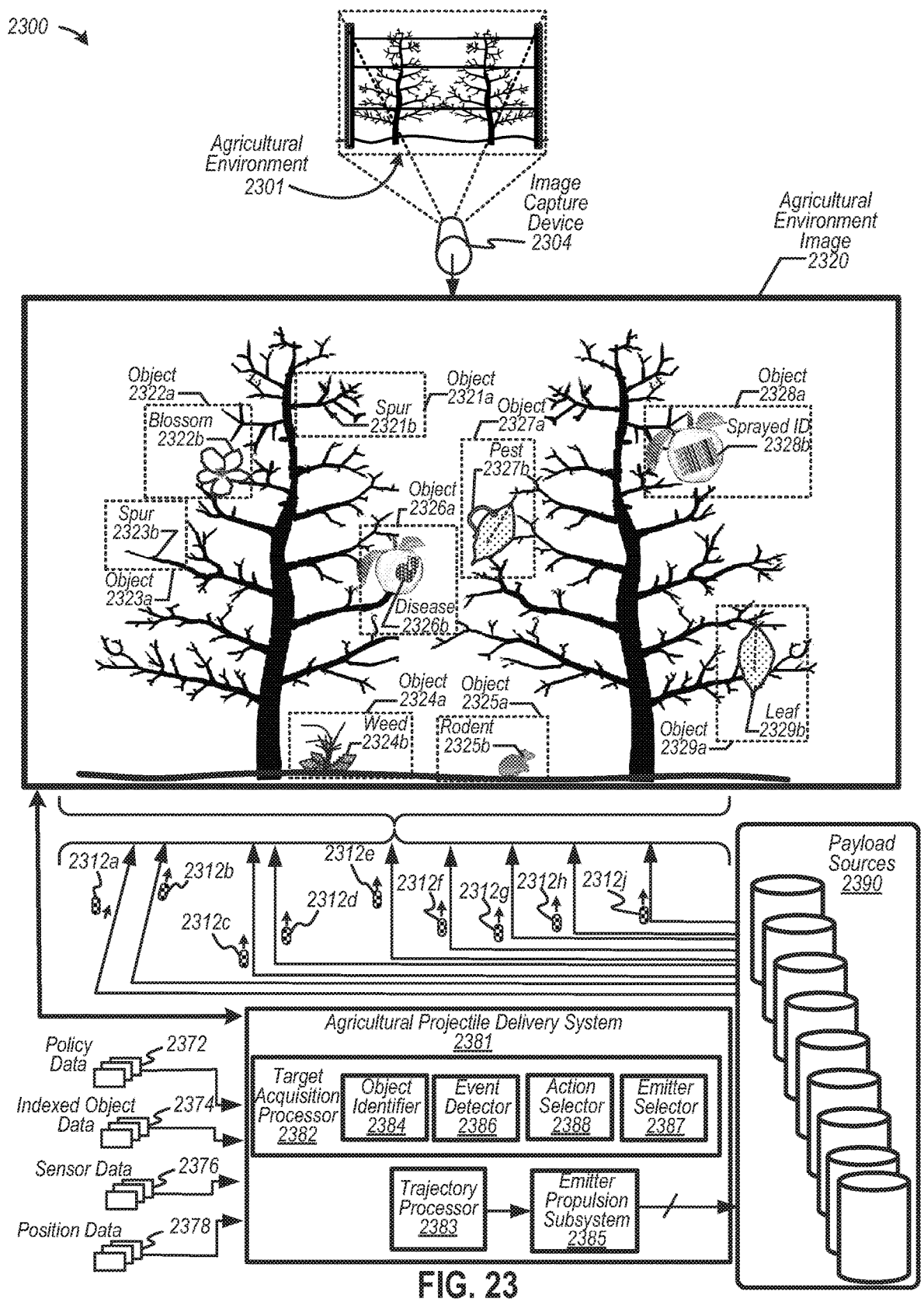
FIG. 23 is a diagram depicting an agricultural projectile delivery system configured to implement one or more payload sources to provide multiple treatments to one or more agricultural objects, according to some examples.

FIG. 23 is a diagram depicting an agricultural projectile delivery system configured to implement one or more payload sources to provide multiple treatments to one or more agricultural objects, according to some examples. Diagram 2300 includes an image capture device 2304 configured to capture an agricultural environment image 2320 of an agricultural environment 2301, which may include any number of plants (e.g., trees), at least in the example shown. Diagram 2300 also includes an agricultural projectile delivery system 2381 configured to identify multiple types of agricultural objects via image 2320 in agricultural environment 2301, select an action associated with at least a subset of different types of agricultural objects, and deliver a specific treatment to a subset of agricultural objects as a function of, for example, a type or classification of agricultural object, as well as other factors, including context (e.g., season, stage of growth, etc.). Agricultural projectile delivery system 2381 may be configured to receive policy data 2372, indexed object data 2374, sensor data 2376, and position data 2378, one or more of which may be implemented as described herein. Further, agricultural projectile delivery system 2381 may be configured to select one or more payload sources 2390 (and amounts thereof) to apply as multiple agricultural projectiles either sequentially or simultaneously. For example, agricultural projectile delivery system 2381 may be configured to select different payload sources 2390 to deliver different agricultural projectiles, such as agricultural projectiles 2312a to 2312j. As shown, agricultural projectile delivery system 2381 may include a target acquisition processor 2382, a trajectory processor 2383, and an emitter propulsion subsystem 2385, one or more of which may have one or more functionalities and/or structures as described herein. Note that elements depicted in diagram 2300 of FIG. 23 may include structures and/or functions as similarly-named elements described in connection to one or more other drawings.

In at least one example, target acquisition processor 2382 may include an object identifier 2384, an event detector 2386, an action selector 2388 and an emitter selector 2387. In some implementations, functions and structures of emitter selector 2387 may be disposed in trajectory processor 2383. Object identifier 2384 may be configured to identify and/or classify agricultural objects detected in agricultural environment image 2320 based on, for example, index object data 2374 and sensor data 2376, among other data. To illustrate operation of object identifier 2384, consider that object identifier 2384 may be configured to detect one or more objects 2322a to 2329a, each of which may be classifiable. For example, object identifier 2384 may detect and classify object 2322a as a blossom 2322b. Object identifier 2384 may detect and classify object 2321a as a spur 2321b, and may detect and classify object 2323a as a spur 2323b. Object identifier 2384 may detect and classify object 2324a as a weed 2324b, and may detect and classify object 2325a as a rodent 2325b. Object identifier 2384 may detect and classify object 2326a as a disease 2326b, such as a fungus. Object identifier 2384 may detect and classify object 2327a as a pest 2327b, such as a wooly aphid. Object identifier 2384 may detect and classify object 2328a as a fruit 2328b to be applied with an identifying liquid that operates similar to a biological "bar code" to identity provenance. And, object identifier 2384 may detect and classify object 2329a as a leaf 2329b.

One or more of event detector 2386 and action selector 2388 may be configured to operate responsive to policy data 2372. Event detector 2386 may be configured to identify an event associated with one or more objects 2322a to 2329a. For example, event detector 2386 may be configured to detect an event for blossom 2322b, whereby associated event data may indicate blossom 2322b is a "king blossom." Responsive to an event identifying a king blossom, action selector 2388 may be configured to determine an action (e.g., based on policy data 2372), such as applying a treatment that pollinates blossom 2322b. As another example, consider that event detector 2386 may be configured to detect an event for weed 2324b, whereby associated event data may indicate that weed 2324b has sufficient foliage prior to germination to be optimally treated with an herbicide. Responsive to generation of data specifying that an event identifies a growth stage of a weed, action selector 2388 may be configured to determine an action (e.g., based on policy data 2372), such as applying a treatment that applies an herbicide to weed 2324b. Event detector 2386 and action selector 2388 may be configured to operate similarly for any identified agricultural object.

Emitter selector 2387 is configured to identify one or more optical sights for each subset of a class of agricultural objects (e.g., one or more optical sights may be associated with agricultural objects identified as pests 2327b). In various examples, one or more groups of optical sights may be used to treat multiple types or classes of agricultural objects. Trajectory processor 2383 may be configured to identify each subset of optical sights configured for a type or class of agricultural object and may track identified/classified agricultural objects as they move to corresponding optical sights. Upon detecting alignment of a type or class of agricultural object as a target with an optical sight, emitter propulsion subsystem 2385 may be configured to select one of payload sources 2390 to apply a specific treatment for a type or class of target that aligns with an associated optical sight.

In various examples, agricultural projectile delivery system 2381 may deliver customized treatments as agricultural projectiles to one or more types or classes of agricultural objects 2322a to 2329a, any treatment may be performed individually and sequentially, or in combination of subsets thereof. To apply a treatment to blossom 2322b, one or more agricultural projectiles 2312a originating from one of payload sources 2390 may be applied to blossom 2322b. To apply a treatment to spur 2321b, one or more agricultural projectiles 2312b originating from one of payload sources 2390 may be applied to spur 2321b to encourage growth (e.g., one or more agricultural projectiles 2312b may include a growth hormone). To apply a treatment to spur 2323b, one or more agricultural projectiles 2312c originating from one of payload sources 2390 may be applied to spur 2323b to regulate growth (e.g., one or more agricultural projectiles 2312c may include a growth regulator to implement, for example, chemical pruning). To apply a treatment to weed 2324b, one or more agricultural projectiles 2312d originating from one of payload sources 2390 may be applied to weed 2324b to terminate growth (e.g., one or more agricultural projectiles 2312d may include an herbicide).

To apply a treatment to rodent 2325b, one or more agricultural projectiles 2312e originating from one of payload sources 2390 may be applied to rodent 2325b to reduce rodent population (e.g., one or more agricultural projectiles 2312e may include a rodenticide to disperse rodents, including voles, etc.). To apply a treatment to disease 2326b, one or more agricultural projectiles 2312f originating from one of payload sources 2390 may be applied to disease 2326b to reduce a disease (e.g., one or more agricultural projectiles 2312g may include a fungicide to reduce, for example, apple scab fungi). To apply a treatment to pest 2327b, one or more agricultural projectiles 2312g originating from one of payload sources 2390 may be applied to pest 2327b to reduce an infestation of an insect (e.g., one or more agricultural projectiles 2312g may include an insecticide to reduce, for example, wooly aphid populations). To apply a treatment to leaf 2329b, one or more agricultural projectiles 2312h originating from one of payload sources 2390 may be applied to leaf 2329b to apply a foliage fertilizer or reduce leaf-related diseases (e.g., one or more agricultural projectiles 2312h may include a fungicide to reduce, for example, peach leaf curl for peach trees). To apply a treatment to fruit 2328b, one or more agricultural projectiles 2312j originating from one of payload sources 2390 may be applied to fruit 2328b to apply a biological or molecular-based tag (e.g., one or more agricultural projectiles 2312j may include a synthetic DNA to apply to a crop to identify provenance at various degrees of resolution, such as from a portion of an orchard to a tree to an agricultural object.).

According to some examples, payload sources 2390 each may be contained a vessel that may be configured as a "cartridge," which may be adapted for efficient connection and re-filling over multiple uses in contest of employing autonomous agricultural treatment delivery vehicles as, for example, a "robotic-agricultural-vehicles-as-a-service." In some examples, payload sources 2390 may include any type or amount of chemistries, any of which may be mixed together in-situ (e.g., during application of treatments), whereby logic in agricultural projectile delivery system 2381 may be configured to determine ratios, proportions, and components of mixtures, whereby any one of agricultural projectiles 2312a to 2312j may be composed of a mixture of chemistries (e.g., derived from two or more payload sources 2390). Mixture of the chemistries may occur as an agricultural treatment delivery vehicle traverses paths when applying treatments. As such, mixing of chemistries in real-time (or near real-time) provides for "just-in-time" chemistries for application to one or more agricultural objects. In some cases, "recipes" for mixing chemistries may be received and update in real time as a vehicle is traversing paths of an orchard. According to some examples, payload sources 2390, as cartridges, may be configured to apply an agricultural projectile as an experimental treatment. As such, application of an experimental agricultural projectile may include applying an experimental treatment to agricultural objects to implement a test including A/B testing or any other testing technique to determine an efficacy of a treatment.

Figure 24:
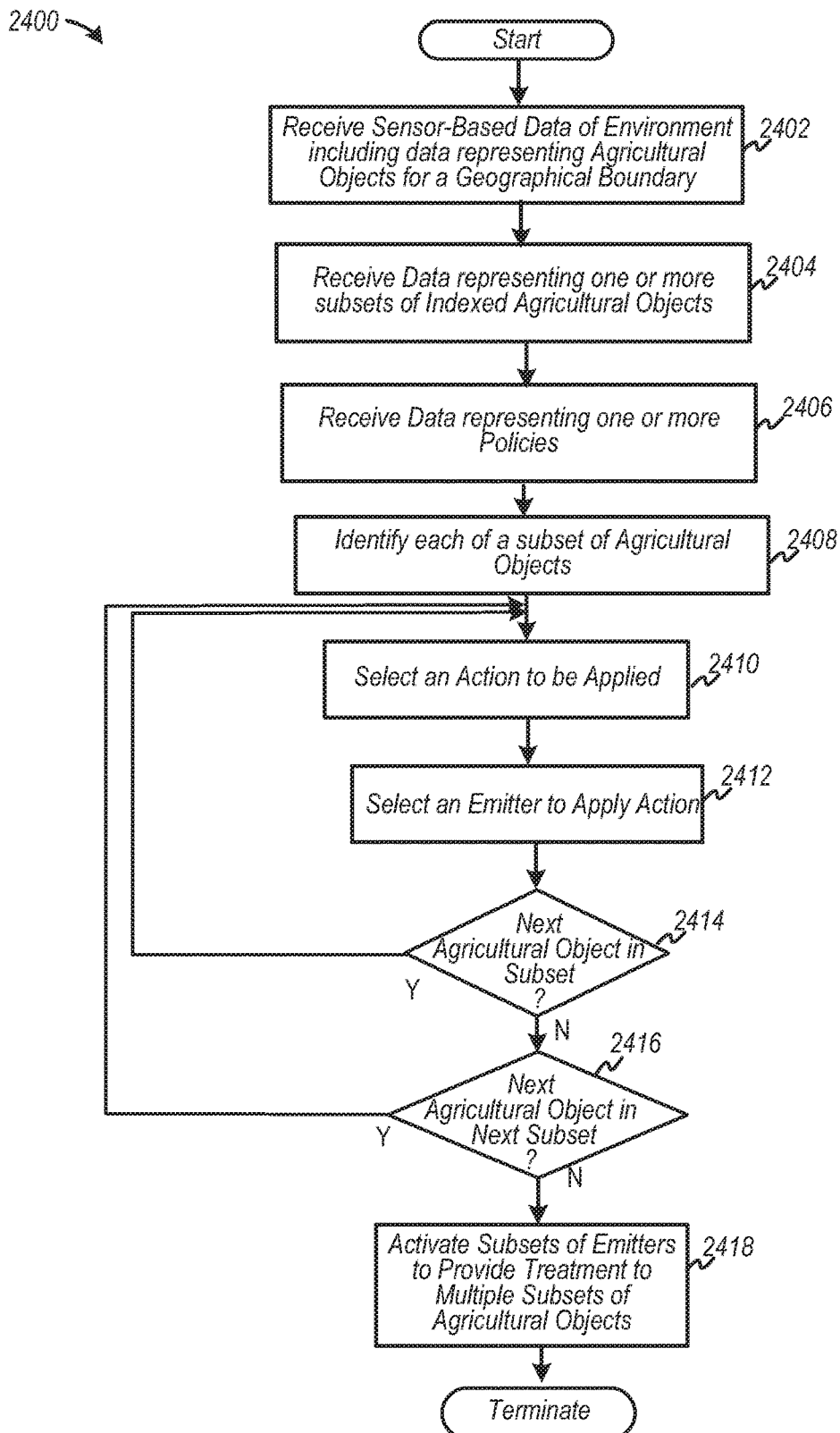
FIG. 24 is an example of a flow diagram to implement one or more subsets of emitters to deliver multiple treatments to multiple subsets of agricultural objects, according to some embodiments.

FIG. 24 is an example of a flow diagram to implement one or more subsets of emitters to deliver multiple treatments to multiple subsets of agricultural objects, according to some embodiments. Flow 2400 begins at 2402. At 2402, sensor-based data describing an environment may be received, the sensor-based data representing agricultural objects for a geographic boundary. For example, as an agricultural projectile delivery vehicle traverses one or more paths to deliver multiple treatments to multiple subsets of agricultural objects, sensor data (e.g., image data) may also be captured for later analysis or to facilitate delivery one or more treatments to one or more agricultural objects.

At 2404, data representing one or more subsets of indexed agricultural objects may be received. For example, each subset of indexed agricultural objects may relate to a different type or class of agricultural object. One subset of indexed agricultural objects may relate to a class or type of fruit disease, whereas another subset of indexed agricultural objects may relate to a class or type of pest. Another subset of indexed objects may relate to a class or type of stage-of-growth of, for example, a fruit bud.

At 2406, data representing one or more policies may be received. At least one policy may be received in association with a subset of indexed agricultural objects, whereby at least one policy may specify one or more actions or treatments to be performed for a class or type of agricultural objects.

At 2408, each agricultural object in a subset of agricultural objects may be identified. For example, indexed agricultural object data may include identifier data that uniquely relates to a unique agricultural object, such as a one cluster of apple buds, whereby the cluster of apple buds may be distinguishable for any other cluster on the tree, or throughout an orchard, or other geographic boundary. Or, a determination to apply a treatment to an agricultural object may be determined in-situ absent policy information for a particular agricultural object. For example, an agricultural object may be changed state, which had been undetected or unpredicted. Agricultural projectile delivery vehicle may detect the changed state in real time and apply a treatment absent a policy for that object.

At 2410, an action to be applied may be selected, based on policy data, the action being linked to the agricultural object. At 2412, an emitter may be selected to apply the action. For example, an emitter may be configured to deliver one or more units of treatment (e.g., one or more agricultural projectiles) to an agricultural object. At 2414, a determination is made whether there is another agricultural object in a subset or class of agricultural objects. If so, flow 2400 moves back to 2410. Otherwise, flow 2400 moves to 2416 at which a determination is made as to whether there is another subset of agricultural objects for which a treatment may be applied. If so, flow 2400 moves back to 2410, otherwise flow 2400 moves to 2418. At 2418, various subsets of emitters may be activated to provide treatment to multiple sets of agricultural objects, for example, as an agricultural treatment delivery vehicle traverses over one or more paths adjacent to the multiple subsets of agricultural objects.

Figure 25:
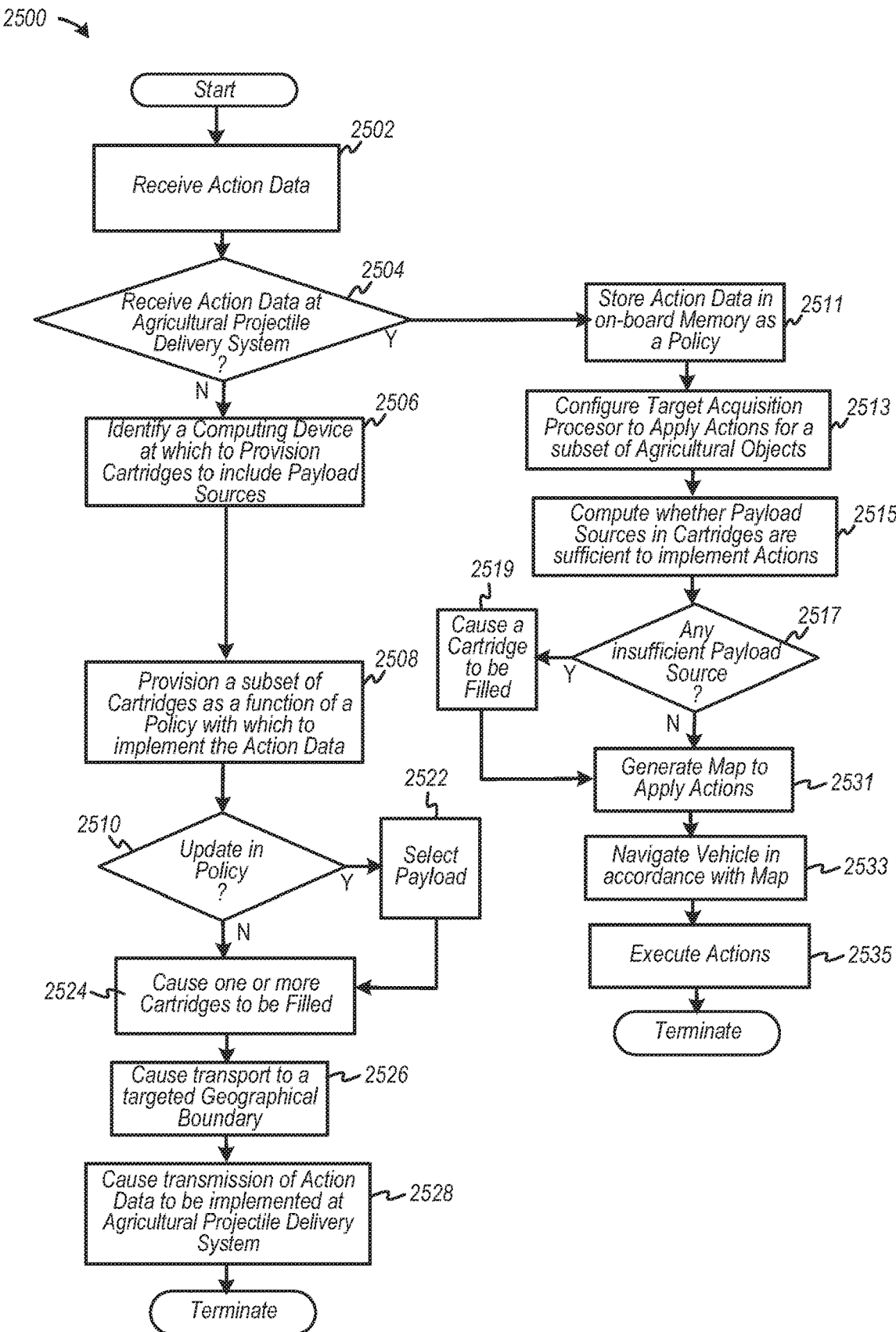
FIG. 25 is an example of a flow diagram to implement one or more cartridges as payload sources to deliver multiple treatments to multiple subsets of agricultural objects, according to some embodiments.

FIG. 25 is an example of a flow diagram to implement one or more cartridges as payload sources to deliver multiple treatments to multiple subsets of agricultural objects, according to some embodiments. According to various examples, an agricultural treatment delivery system may granularly, with micro-precision, monitor agricultural objects over time (e.g., through stages-of-growth), whereby an agricultural object may be a basic unit or feature of a tree (e.g., a leaf, a blossom, a bud, a limb, etc.) that may be treated with micro-precision rather than, for example, spraying a plant as a whole. Therefore, implementation of one or more agricultural treatment delivery vehicles, which may operate autonomously to navigate and apply agricultural treatments, may conserve amounts of chemistries (e.g., amounts of fertilizers, herbicides, insecticides, fungicides, growth hormones, etc.). Further, as agricultural treatment delivery systems may be implemented in a fleet of autonomous agricultural treatment delivery vehicles, an entity that provides "robotic-agricultural-vehicles-as-a-service" may be able to access and use a variety of chemistries from a variety of manufacturers, including relatively expensive chemistries under research and development that are often out of the reach of small and impoverished farmers. As such, an entity can distribute costs over a broad user base, thereby enabling smaller farmers and impoverished farmers to access chemistries they might otherwise may not have access via use of an agricultural treatment delivery vehicle as described herein.

Normatively, agricultural chemicals are available for purchase predominantly in units of 275 gallons (e.g., in a tote container), 5 gallon buckets, or 2.5 gallon jugs, among others. Cost savings by buying in bulk may be less cost effective if amounts remain used. According to various examples, autonomous agricultural treatment delivery vehicles described herein may implement "cartridges" as payload sources that facilitate ease of replacement or refilling (e.g., in-situ). For example, an autonomous agricultural treatment delivery vehicles may autonomously detect insufficient amounts of a chemistry (e.g., based on policy data that requires an action to consume that chemistry), and then may autonomously refill its payload at refilling stations located on a farm or remotely. Or, cartridges may be shipped to a destination to replace empty or near-empty cartridges.

In view of the foregoing, flow 2500 begins at 2502. At 2502, action data may be received, for example, to perform one or more policies. For example, action data may be received from a precision agricultural management platform configured to employ computational resources to analyze previously-recorded sensor data from autonomous agricultural treatment delivery vehicles for purposes of generating policies with which to treat numerous agricultural objects in a geographic boundary, such as in an orchard. At 2504, a determination is made as to whether action data is received into an autonomous agricultural treatment delivery vehicle or an agricultural projectile delivery system (e.g., with manual navigation) for performing one or more policies associated with an orchard or a farm. If yes, flow 2500 moves to 2511. At 2511, action data may be stored in on-board memory as policy data, which may be configured to specify specifics treatments that are to be applied to specific agricultural objects, at particular times and/or amounts, or in accordance with any other parameter.

At 2513, a target acquisition processor may be configured to apply one or more actions for a subset agricultural objects. For example, the target acquisition processor may be configured to identify and enumerate each agricultural object that is identified as receiving particular action, and thus may determine an amount of payload that is to be distributed over a number of agricultural projectiles to treat a number of agricultural objects. At 2515, computations are performed to determine whether payload sources (e.g., in cartridges) are sufficient to implement actions over a group of identified agricultural objects. At 2517, a determination is made as to whether payload source amount is insufficient. If not, at least one cartridge may need to be charged (e.g., filled to any level) or replaced at 2519. For example, an autonomous agricultural treatment delivery vehicle may drive autonomously to a refilling station local to, for example, an orchard or farm. As such, a cartridge may be charged with one of a germination payload (e.g., pollen) or a cluster-thinning payload (e.g., ATS/Lime Sulfur, or the like). Or, one or more cartridges may be shipped to that location. Regardless, flow 2500 moves to 2531 to optionally generate one or more maps to navigate at least one or more emitters to apply one or more actions associated with the group of identified agricultural objects. At 2533, an autonomous agricultural treatment delivery vehicle may be navigated in accordance with the map. At 2535, one or more emitters may be configured to execute the actions to, for example, deliver treatments to one or more targeted agricultural objects.

Referring back to 2504, if action data is not received into an autonomous agricultural treatment delivery vehicle or an agricultural projectile delivery system, then flow 2500 continues to 2506. At 2506, a computing device is identified that may be configured to provision one or more cartridges to include one or more payload sources. For example, the computer device may be implemented at a geographic location at which cartridges may be provisioned at distances relatively close to a geographic boundary, such as a farm or an orchard. At 2508, a subset of cartridges may be provisioned as a function of one or more policies with which to implement the action data. At 2510, a determination is made as to whether a policy ought to be updated. For example, recently received sensor data may indicate, for example, a sufficient number of crops have entered a later stage of growth, which may cause flow 2500 to move to 2522 to select payloads types customized to accommodate modifications in policies (e.g., changes in payload types to be applied to agricultural objects). At 2524, one or more cartridges may be filled, for example, remotely from a geographic boundary (e.g., an orchard) and shipped to a destination via a package-delivering service or via an entity providing an autonomous agricultural treatment delivery vehicle as a service. At 2526, one or more cartridges may be transported to the geographical boundary for which policy data applies. At 2528, action data (i.e., policy data) may be transmitted to an agricultural projectile delivery system for implementation along with cartridges shipped to a location at which the agricultural projectile delivery system is located.

Figure 26:
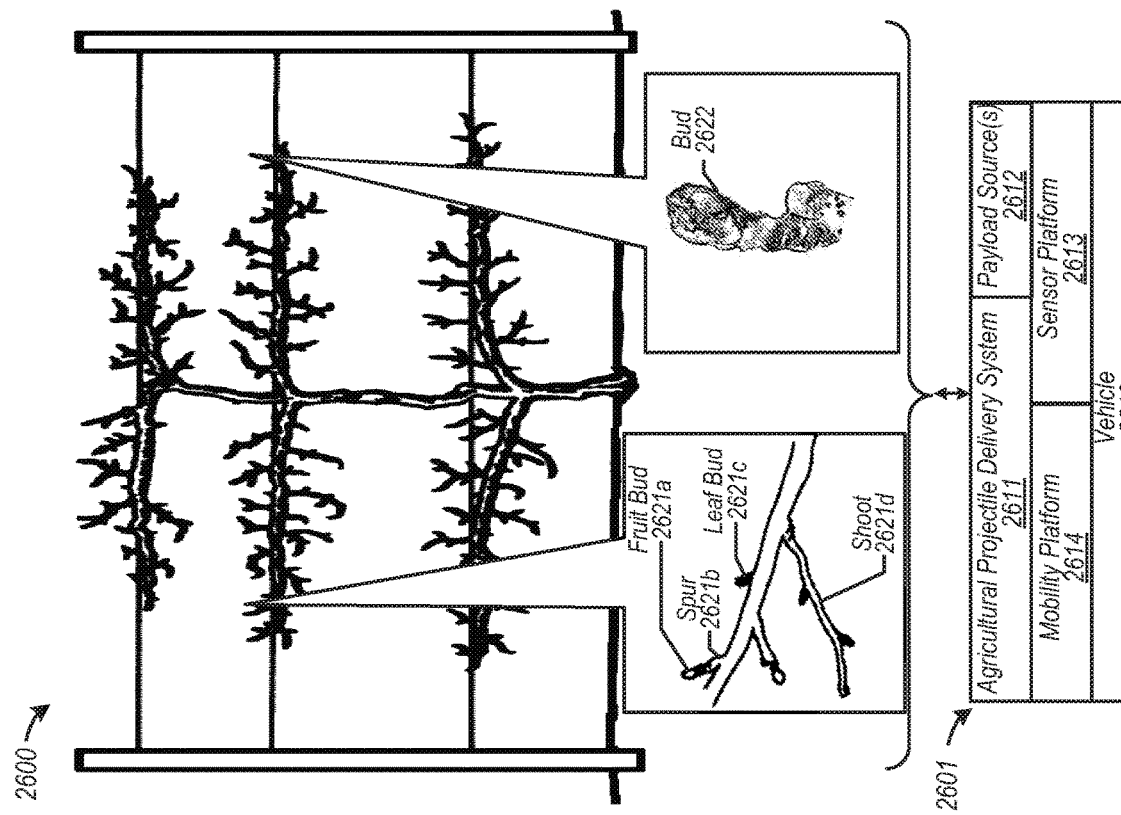

FIGS. 26 to 31 are diagrams depicting components of an agricultural treatment delivery vehicle configured to sense, monitor, analyze, and treat one or more agricultural objects of a fruit tree through one or more stages of growth, according to some examples. FIG. 26 includes one or more components of an agricultural treatment delivery vehicle 2601, including various vehicle components 2610 (e.g., drivetrain, steering mechanisms, etc.), a mobility platform 2614, a sensor platform 2613, one or more payload sources 2612, and an agricultural projectile delivery system 2611. Agricultural treatment delivery vehicle 2601 may be configured to identify one or more stages of growth for an agricultural object, and may be further configured to determine policies describing one or more actions or treatments to apply to various agricultural objects all year round, including a life cycle of a fruit crop from bud to harvest. Note that elements depicted in diagrams 2600 of FIG. 26 through diagram 3100 of FIG. 31 may include structures and/or functions as similarly-named elements described in connection to one or more other drawings or as otherwise described herein. Note, too, while FIGS. 26 to 31 may refer to stages of growth for an apple crop, any one or more of the functions described herein may be applicable to other fruit trees, nut trees, or any other vegetation or plant, including vegetable crops (e.g., row crops, ground crops, etc.) and ornamental plants.

In some examples, one or more policies may include various actions to provide various treatments to agricultural objects depicted in diagrams 2600 to 3100. For example, one or more policies may include data configured to manage apple crops with an aim to "save the king" (i.e., save a king bloom). One or more policies may be implemented over one or more stages of growth of an apple-related agricultural object. Agricultural projectile delivery system 2611 may be configured to apply one or more treatments to an agricultural object, such as a bud or blossom, with micro-precision by, for example, delivering a treatment as an agricultural projectile. Thus, agricultural projectile delivery system 2611 may treat portions of an apple tree on at least a per-cluster basis as well as a per-blossom basis, according to various examples. One or more policies may be configured to perform an action to isolate a king blossom on each cluster, and to perform another action to track one or more clusters (e.g., at an open cluster stage of growth) to detect, via sensor platform 2613, whether a king blossom (as an agricultural object) has "popped." Also, a policy may also track whether any lateral blossoms (as agricultural objects) have remained closed. Another policy may include performing an action to germinate a king blossom and to terminate neighboring lateral blossoms of a common cluster. Thus, lateral blossom may be autonomously terminated rather than being mechanically (e.g., manually by hand) terminated. In various examples, one or more policies configured to "save the king" may facilitate enhanced crop yields. For example, performing actions and treatments with micro-precision facilitates optimizing attributes of an apple, such as color, size, etc. Thus, agricultural projectile delivery system 2611 may assist in managing apple crops with micro-precision to enhance yields of apples that are sized optimally, for example, for packing. In some examples, about 88 apples per box may be obtained (e.g., rather than 100 apples per box). Also, terminating lateral blossom in accordance with functions and/or structures described herein facilitates increased amount of nutrients a fruit tree may supply to remaining blossoms to help produce larger, healthier fruit. A few policies may be implement to "thin a cluster," thereby terminating each bud or blossom associated with a particular cluster. Hence, the various functions and/or structures described herein may enhance fruit production while reducing costs of labor.

Diagram 2600 depicts a portion of a limb, for example, in late winter or early spring (e.g., in the northern hemisphere) during a "dormant" stage of growth. As shown, the limb may include fruit buds 2621*a*, leaf buds 2621*c*, one or more spurs 2621*b*, and one or more shoots 2621*d*. Also shown is a fruit bud 2622 in a dormant state. One or more policies may cause agricultural projectile delivery system 2611 to inspect one or more portions of a limb to determine whether a treatment may be applied. For example, a foliar growth hormone may be applied as one or more agricultural projectiles to a spur to encourage growth. An example of a foliar growth hormone includes gibberellic acid, or gibberellin, or the like. By contrast, one or more policies may cause agricultural projectile delivery system 2611 to inspect a portion of a limb to determine whether "chemical pruning" may be implemented by applying a growth regulator (e.g., paclobutrazol or the like) as one or more agricultural projectiles.

Diagram 2700 depicts one or more buds 2722 (as agricultural objects) transitioning to a next stage of growth, such as a "half-inch" green 2724 (as an agricultural object). One or more policies may be configured to direct agricultural projectile delivery system 2611 to inspect and track development of buds 2722 and "half-inch" greens 2724, and, if available, apply a treatment.

Figure 27:
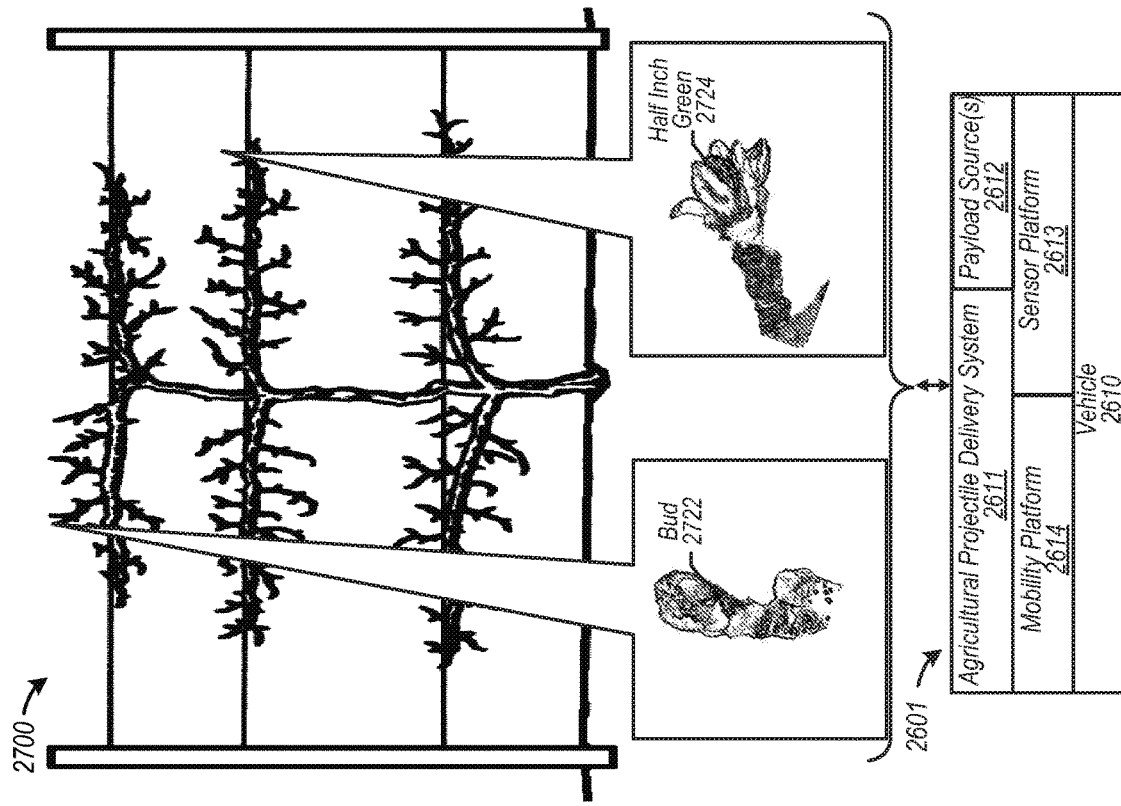

Diagram 2800 depicts one or more "half-inch" greens for FIG. 27 transitioning to next stages of growth, such as a "tight cluster" 2826 (as an agricultural object), or a "full/pink cluster 2827 (as an agricultural object). Full/pink cluster 2827 may also be referred to as an open cluster. One or more policies may be configured to cause agricultural projectile delivery system 2611 to inspect and track development of agricultural objects 2826 and 2827, and, if available, apply a treatment. For example, a determination may be made that tight cluster 2826 may be growing slower than as expected. As such, a policy may cause agricultural projectile delivery system 2611 to apply a growth hormone, with micro-precision, to tight cluster 2826 to promote growth.

Diagram 2900 depicts one or more agricultural objects 2826 and 2827 of FIG. 28 transitioning to a next stage of growth. For example, a full/pink cluster 2927 may transition into a "king blossom" stage in which a king blossom 2928 (e.g., a first blossom) opens. In various examples, agricultural projectile delivery system 2611 may be configured to apply a treatment with micro-precision to center 2928*b* within a perimeter 2928*a* of king blossom 2928. For example, a policy may cause agricultural projectile delivery system 2611 to apply a treatment to center 2928*b* by, for example, emitting an agricultural projectile to intercept center 2928*b* to germinate the blossom. In some cases, two or more king blossoms may be germinated and saved.

Diagram 3000 depicts one or more agricultural objects 2928 of FIG. 29 transitioning to a next stage of growth. For example, a king blossom 2928 may transition into a "lateral" stage in which lateral blossoms 3029 open about king blossom 3028. In various examples, agricultural projectile delivery system 2611 may be configured to apply a treatment with micro-precision to lateral blossoms 3029 (e.g., to the centers or portions thereof). For example, a policy may cause agricultural projectile delivery system 2611 to apply a treatment (e.g., a caustic chemical) to lateral blossoms 3029 to terminate growth of the lateral blossoms, thereby "saving the king." Alternatively, some policies may cause agricultural projectile delivery system 2611 to apply a caustic treatment to both lateral blossoms 3029 and a king blossom 3028, thereby thinning an entire cluster.

Figures 30, 31:
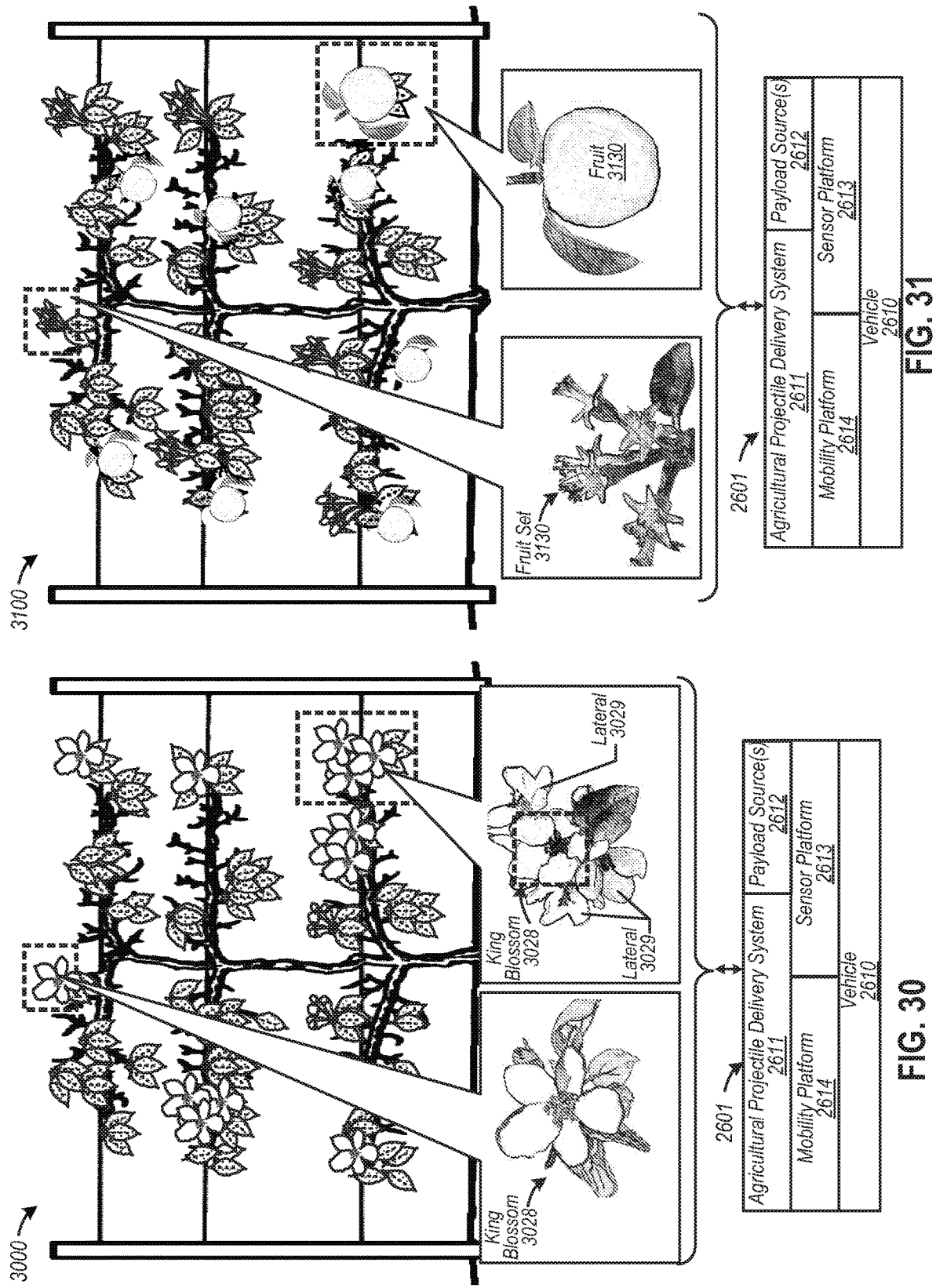

Diagram 3100 depicts one or more agricultural objects 3028 and 3029 of FIG. 30 transitioning to next stages of growth. For example, lateral blossoms 3029 and king blossom 3028 may transition into a "fruit set" or "pedal fall" stage (as an agricultural object) in which petal have fallen. Also, king blossom 3028 of FIG. 30 may transition to a "fruit" stage of growth in which a fruit 3130 develops and ripens. Agricultural projectile delivery system 2611 may emit an agricultural projectile to apply a synthetic DNA to fruit 3130 to identify its origins later in the food production process. Note that other policies, such as applying herbicides, insecticides, fungicides, and the like, may be implemented at one or more of the stages of growth described in FIGS. 26 to 31.

Figure 32:
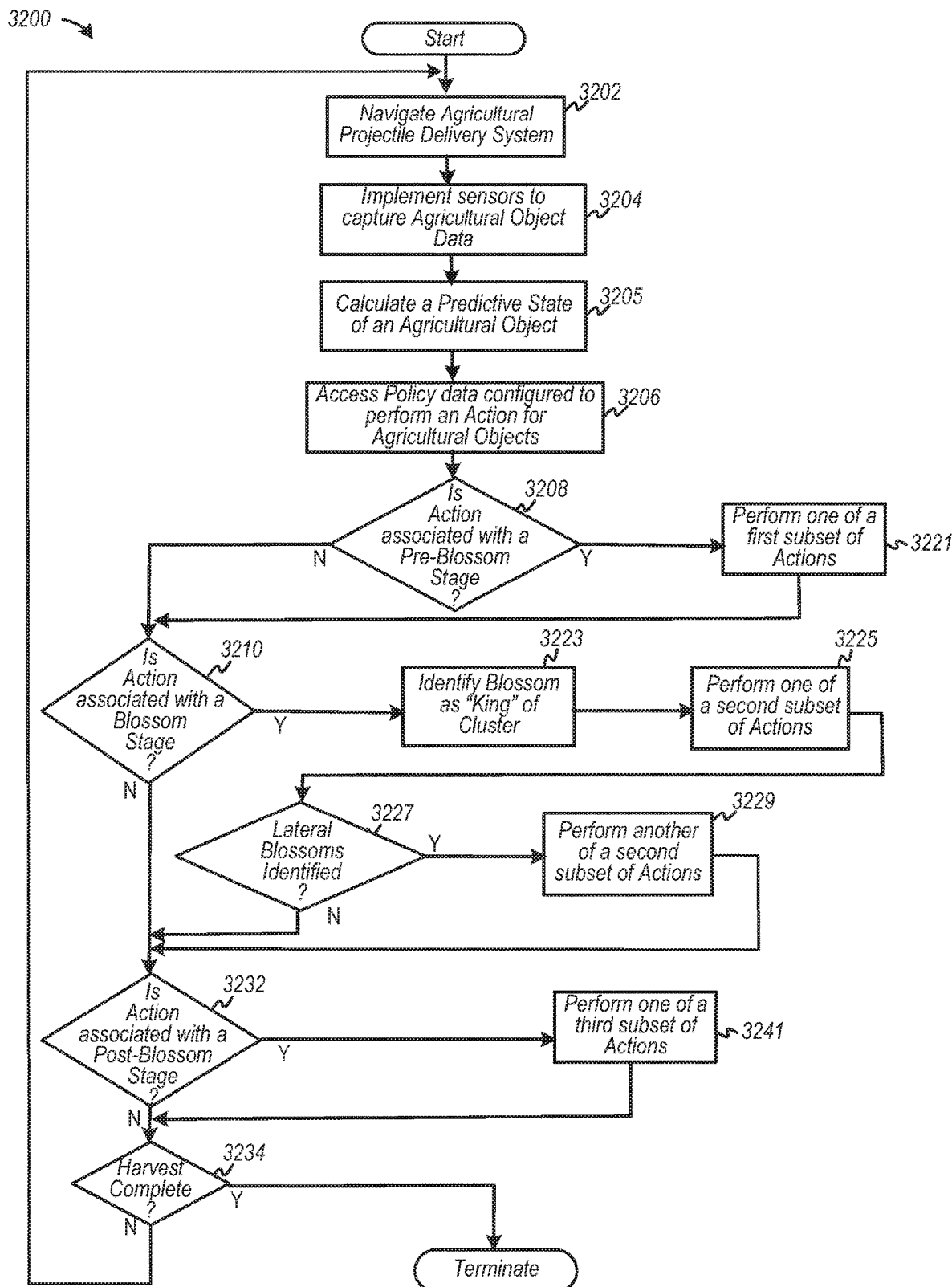
FIG. 32 is a diagram depicting an example of a flow to manage stages of growth of a crop, according to some examples.

FIG. 32 is a diagram depicting an example of a flow to manage stages of growth of a crop, according to some examples. Flow 3200 starts at 3202. At 3202, an agricultural projectile delivery system may navigate autonomously to inspect, monitor, and treat one or more agricultural objects. At 3204, sensors may be implemented to capture data representing agricultural objects. At 3205, a predictive state of an agricultural object may be predicted, such as at a precision agricultural management platform, according to some examples. At 3206, policy data configured to perform one or more actions for one or more agricultural objects may be accessed. At 3208, a determination is made as to whether an action is associated with a pre-blossom stage. If so, flow 3200 moves to 3221 to apply a first subset of actions, such as applying growth hormone to a spur to promote limb growth. Otherwise, flow 3200 moves to 3210, at which a determination is made as to whether an associated action relates to a blossom stage. If not, flow 3200 moves to 3232. But if so, flow 3200 moves to 3223 to identify a blossom as "king" of a cluster. At 3225, a second subset of actions may be performed, including germinating a blossom. Flow 3200 then moves to 3227, at which a determination is made as to whether lateral blossoms are identified. If so, flow 3200 moves to 3229 to perform another action in the second subset of action, such as killing the lateral blossoms. Flow 3200 then moves to 3232, at which a determination is made as to whether an action applies to a post-blossom stage. If so, flow 3200 moves to 3241 to perform a third subset of actions, such as applying a fungicide to a fruit exhibiting "apple scab." Flow 3200 then moves 3234, at which a determination is made as to whether a harvest is complete. If not, flow 3200 moves to 3202, otherwise flow 3200 terminates. One or more of the above regarding flow 3200 may be implemented using an agricultural projectile delivery system, which may include one or more processors and one or more applications or executable instructions stored in memory.

Figure 33:
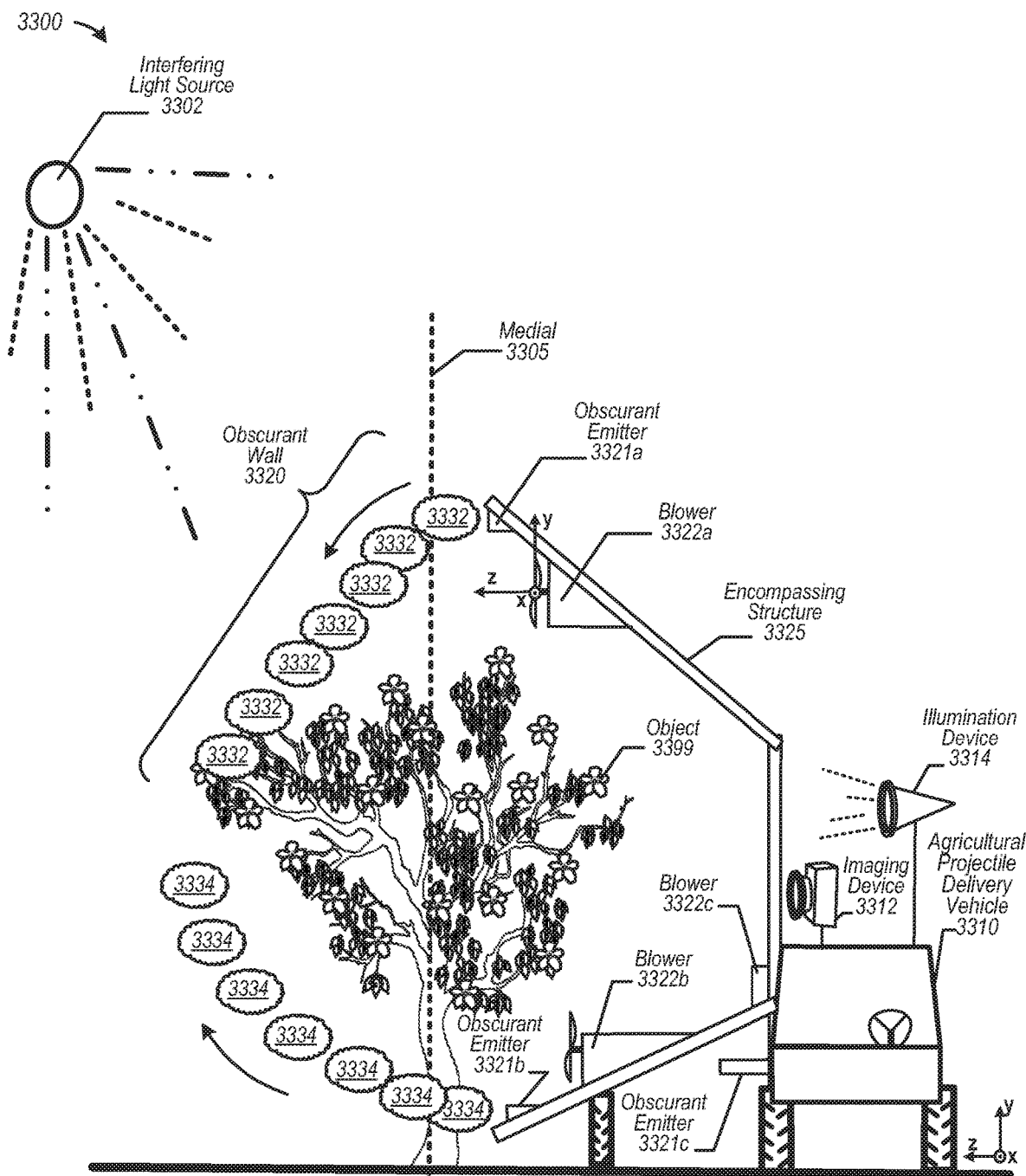
FIG. 33 is a diagram depicting an agricultural projectile delivery vehicle implementing an obscurant emitter, according to some examples.

FIG. 33 is a diagram depicting an agricultural projectile delivery vehicle implementing an obscurant emitter, according to some examples. Diagram 3300 includes an agricultural projectile delivery vehicle 3310 including an imaging device 3312 (e.g., a camera) and an optional illumination device 3314, which may be omitted. Further, agricultural projectile delivery vehicle 3310 also may include an obscurant emitter 3321*c* that is configured to generate an obscurant wall 3320 interposed between, for example, a source of backlight, such as sun 3302, and an agricultural object 3399. As agricultural projectile delivery vehicle 3310 traverses a path adjacent a crop, such as a fruited tree, data generated by imaging sensors may be degraded when trying to capture an image of object 3399 that is disposed in between a bright source of backlight, such as sun 3302, and camera 3312. Generation of obscurant wall 3320 may facilitate an increase of a dynamic range for image capture device 3312 (e.g., enhancing a ratio between a largest value and a smallest value of luminous intensity). Obscurant wall 3320 forms a dynamic (e.g., temporary) enclosure as a light barrier to reduce an amount of light from backlight source 3302 relative to the agricultural object 3399. In some examples, obscurant emitter 3321*c* may be implemented as a mist generator configured to generate portions 3332 and/or 3334 of mist or water vapor using, for example, an ultrasonic generator or transducers. Ultrasonic transducers may be configured to convert liquid water into a mist of the one or more clouds of water droplets, which may be viewed as "eco-friendly."

In operation, a light intensity sensor (not shown) may be configured to detect a value of luminous intensity originating, for example, from backlight source 3302. If a value of luminous intensity exceeds a threshold value, obscurant emitter 3321*c* may be configured to generate obscurant wall 3320 in, for example, a region between a medial line 3305 and backlight source 3302. The obscurant may be directed that region using, for example, one or more blowers 3322*c* or directional fans. Portions of mist or fog provides a dynamic enclosure that may not have drawbacks of physical enclosures, such a shrouds, that are typically adapted for a specific row crop. Such a dynamic enclosure may adapt to differently-sized trees or crops. Further, by reducing backlight, obscurant wall may obviate a need to synchronize a camera sensor (e.g., a camera shutter synchronized with a flash) or perform additional image processing involving, for example, using multiple exposures or tone mapping algorithms. In some examples, one or more obscurant emitters 3321a and 3321b and one or more blowers 3322a and 3322b may be disposed on an encompassing structure 3325, which may be omitted.

Figure 34:
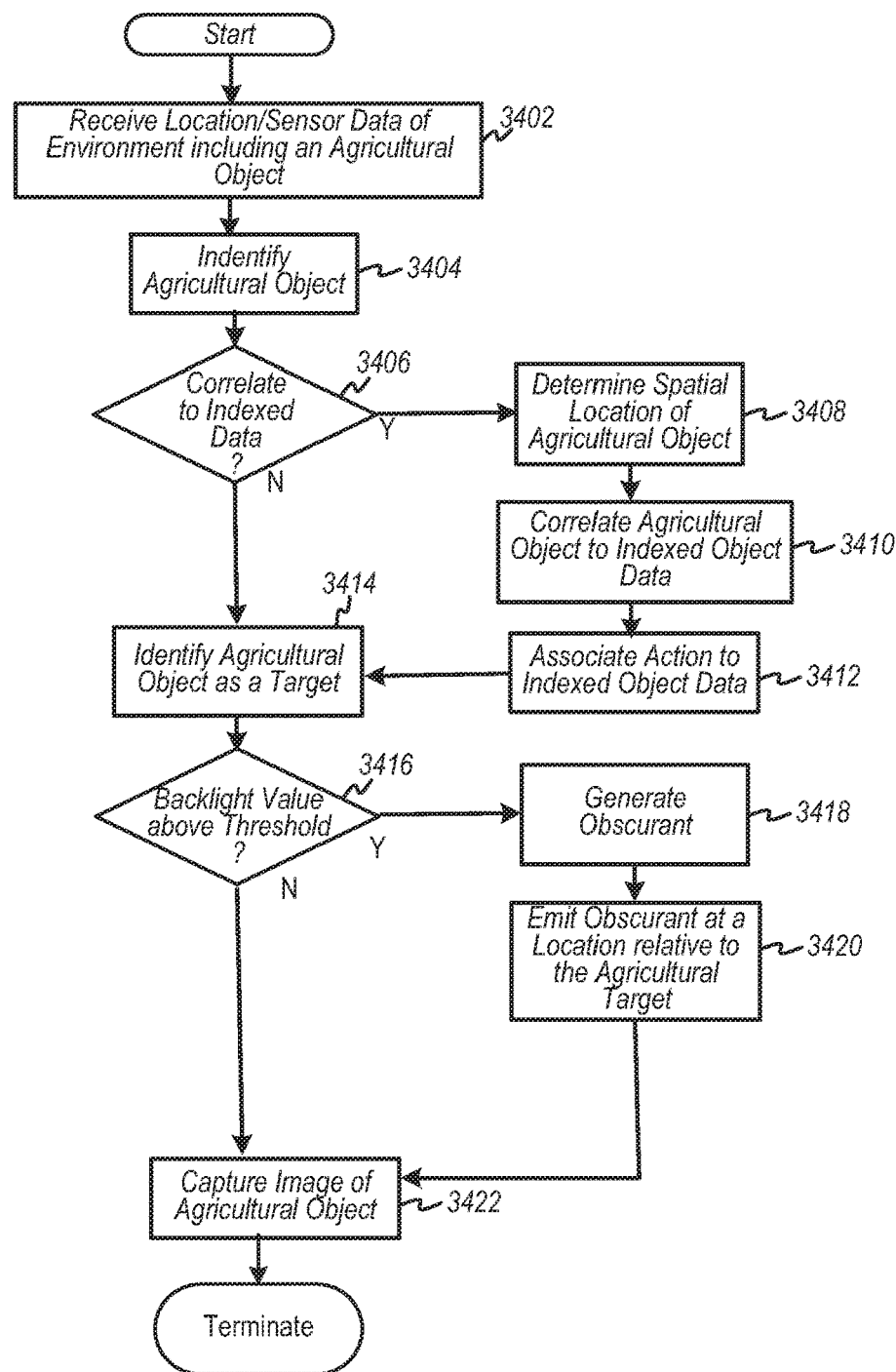
FIG. 34 is a diagram depicting an example of a flow to facilitate imaging a crop in an environment with backlight, according to some examples.

FIG. 34 is a diagram depicting an example of a flow to facilitate imaging a crop in an environment with backlight, according to some examples. In some examples, flow 3400 enhances a dynamic range of captured images of agricultural objects with environments with backlight, such as sunlight or moonlight (e.g., a full moon). At 3402, location and/or sensor data of an environment including an agricultural object may be received. At 3404, an agricultural object may be identified based on the location and/or sensor data received at 3402. At 3406, a determination is made as to whether an identified agricultural object may be correlated to index data. If so, flow 3400 moves to 3408, at which a spatial location of an agricultural object may be determined. At 3410, an identified agricultural object may be correlated to index object data, thereby confirming that sensor data (e.g., image data) being received at a sensor is identifying an agricultural object that is the same in the indexed data. At 3412, an action may be associated with the indexed object data. That is, a policy to perform an action (e.g., a treatment) may be associated with indexed object data. At 3414, an agricultural object may be identified as a target to, for example, perform an action. At 3416, determination is made as to whether a value of backlight as above a threshold value. For example, if an intensity of light is above a threshold value, and that light originates behind the identified target, then flow 3400 moves to 3418 to generate an obscurant, such as generating water vapor using ultrasonic generator. At 3420, an obscurant may be emitted at a location relative to the targeted agricultural object, the obscurant being disposed between a source of backlight and a target agricultural object. At 3422, an image of the agricultural object may be captured.

Figure 35:
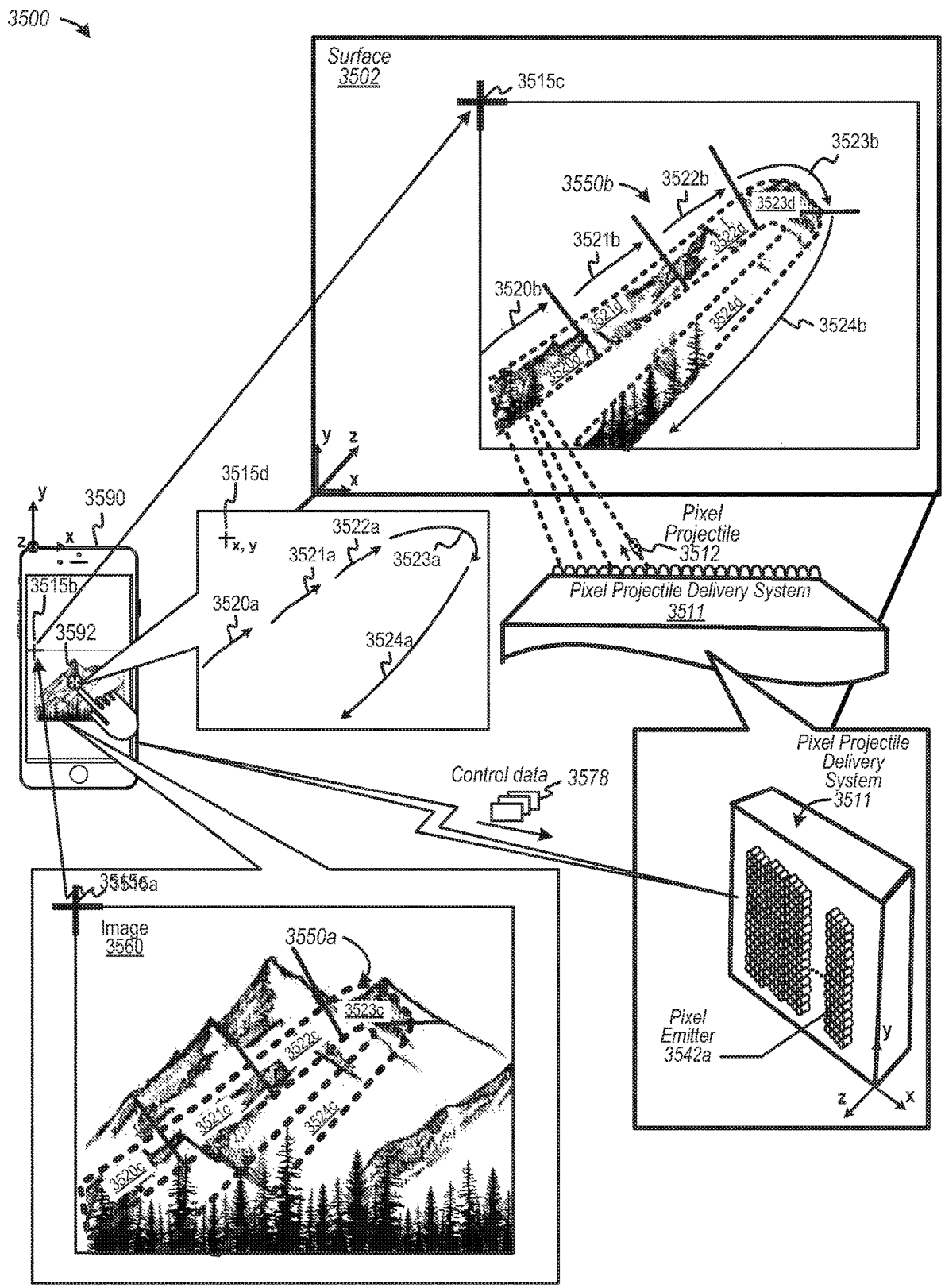
FIG. 35 is a diagram depicting a pixel projectile delivery system configured to replicate an image on a surface using pixel projectiles, according to some embodiments.

FIG. 35 is a diagram depicting a pixel projectile delivery system configured to replicate an image on a surface using pixel projectiles, according to some embodiments. Diagram 3500 includes a pixel projectile delivery system 3511, which may include any number of pixel emitters 3542a, and a mobile computing device 3590, which may include a processor configured to execute an application that may provide inputs (e.g., control data) to pixel projectile delivery system 3511. In various examples, pixel projectile delivery system 3511 may be configured to emit subsets of pixel projectiles 3512 to "paint" or replicate portions of an image, such as image 3560, upon a surface 3502. In some examples, an application executing on mobile computing device 3590 may identify an image 3560 to be replicated on surface 3502, and may further be configured to determine a reference with which to align inputs associated with mobile computing device 3590 and corresponding outputs associated with a replicated image on surface 3502. As shown, a reference 3515a of image 3560 is aligned with reference 3515b of the image in the user interface of mobile computing device 3590, which, in turn, may establish a reference 3515c associated with surface 3502. Therefore, inputs into the user interface of mobile computing device 3590 may be correlated to reference 3515b, and, similarly, outputs emitted out of emitters 3542a (and impacted points on surface 3502) may be correlated to reference 3515c.

To illustrate operation of pixel projectile delivery system 3511, consider that pixel projectile delivery system 3511 may be configured to receive data 3578 representing image 3560. At least one portion 3515a of image 3560 may be a reference 3515a to align with a surface reference 3515c associated with surface 3502. Pixel projectile delivery system 3511 may be configured to establish electronic communication with mobile computing device 3590, which may be configured to transmit control data 3578 as a function of one or more spatial translations as inputs, whereby one or more spatial translations simulate replication on surface 3502. Examples of one or more spatial translations are depicted as spatial transitions 3520a, 3521a, 3522a, 3523a, and 3524a. In some cases, each of spatial transitions 3520a, 3521a, 3522a, 3523a, and 3524a may be referred to as a unit of spatial translation (e.g., a unit be determined by, for example, a momentary pause or delay in applying an input).

Pixel projectile delivery system 3511 may be configured to receive data representing a unit of spatial translation, such as one of units of spatial translation 3520a, 3521a, 3522a, 3523a, and 3524a, whereby the unit of spatial translation may specify a translation relative to a reference associated with mobile computing device 3590. In one example, spatial translations may be determined based on translations of, for example, a simulated targeting sight 3592 that may produce each of spatial transitions 3520a, 3521a, 3522a, 3523a, and 3524a relative to reference 3515b, the translations of simulated targeting sight 3592 being caused by input into a touch-sensitive graphics user interface. In another example, spatial translations may be determined based on translations of, for example, motion in two-dimensional space that may produce each of spatial transitions 3520a, 3521a, 3522a, 3523a, and 3524a relative to reference 3515d. Thus, moving mobile computing device 3590 (e.g., within an X-Y plane) may produce spatial translations 3520a, 3521a, 3522a, 3523a, and 3524a relative to reference 3515d, whereby one or more motion sensors or accelerometers in mobile computing device 3590 generates inputs representing the spatial translations sent via control data 3578.

Further, pixel projectile delivery system 3511 may be configured to determine one or more portions 3520c, 3521c, 3522c, 3523c, 3524c of image 3560 respectively associated with each unit of spatial translation 3520b, 3521b, 3522b, 3523b, and 3524b relative to reference 3515c. Note that pixel projectile delivery system 3511 may be configured to respectively map spatial transitions 3520a, 3521a, 3522a, 3523a, and 3524a relative to reference 3515d to spatial translation 3520b, 3521b, 3522b, 3523b, and 3524b relative to reference 3515c.

Pixel projectile delivery system 3511 may be configured to identify one or more subsets of pixels (e.g., one or more portions 3520c, 3521c, 3522c, 3523c, 3524c of image 3560) to be formed on surface 3502 responsive to detecting a unit of spatial translation. And, pixel projectile delivery system 3511 may be configured to cause emission of one or more subsets of pixel projectiles 3512 directed to impact one or more portions of surface to form one or more subset of pixels 3520d, 3521d, 3522d, 3523d, and 3524d relative to surface reference 3515c to form a replica 3550b of a portion 3550a of image 3560.

Figure 36:
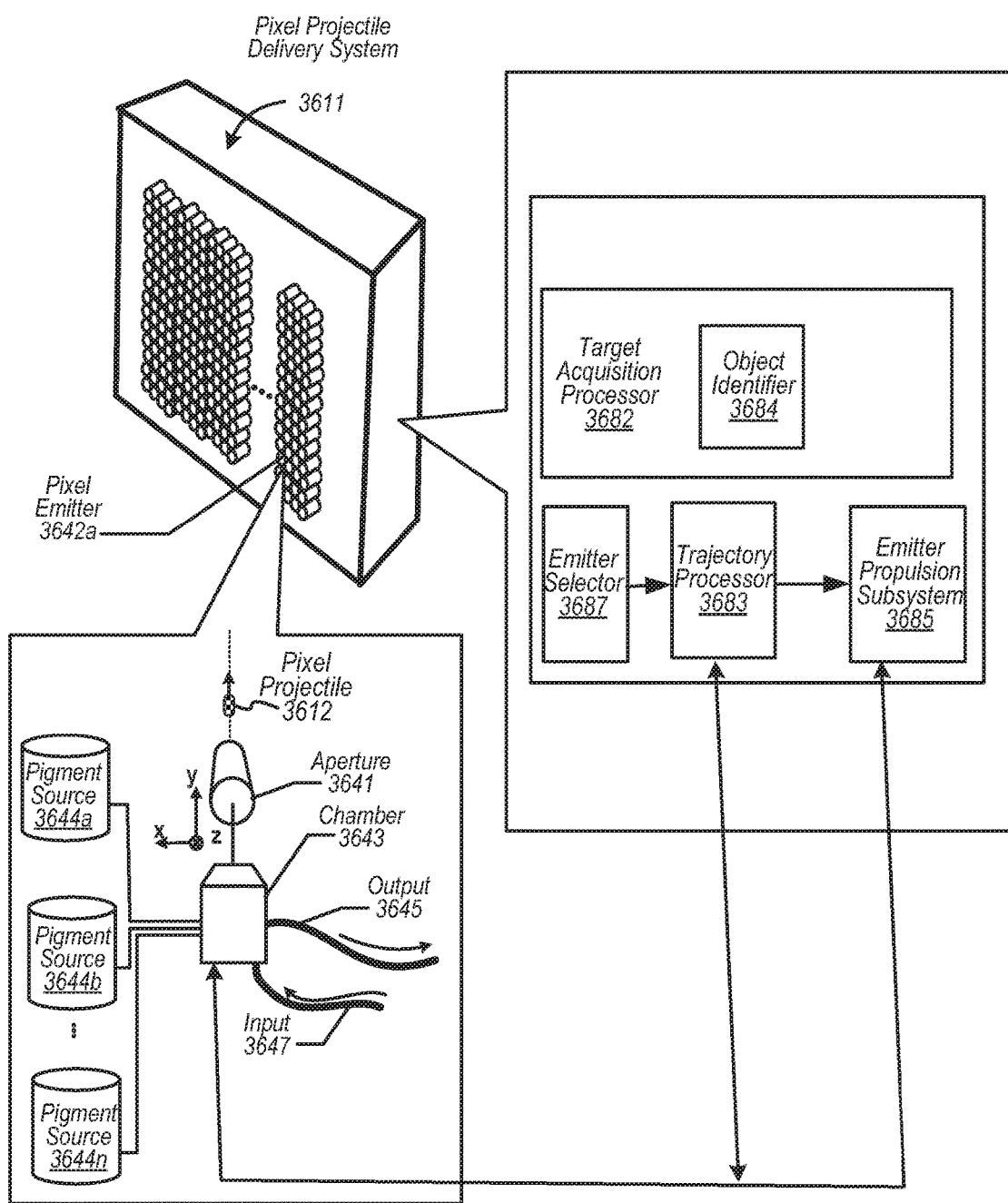
FIG. 36 is a diagram depicting an example of a pixel projectile delivery system, according to some examples.

FIG. 36 is a diagram depicting an example of a pixel projectile delivery system, according to some examples. Pixel projectile delivery system 3611 may include a target acquisition processor 3682, which may include an object identifier 3684. Pixel projectile delivery system 3611 may also include an emitter selector 3687, a trajectory processor 3683, and an emitter propulsion subsystem 3685. Note that elements depicted in diagram 3600 may include structures and/or functions as similarly-named elements described in connection to one or more other drawings or as otherwise described herein, regardless of whether an implementation non-agricultural.

Target acquisition processor 3682 may be configured to receive data representing pixel inputs to be replicated on a surface. Object identifier 3684 may be configured to detect an image object, such as a reference with which to replicate an image. Emitter selector 3687 may be configured to select a subset of emitters responsive to inputs selecting a subset of pixels to be replicated. Trajectory processor 3683 may be configured to coordinate and manage emission of pixel projectiles, and may further be configured to generate activation signals to cause emission propulsion subsystem 3685 to propel pixel projectiles to impact a surface relative to a reference.

In some cases, a pixel emitter 3642a may include, or may be associated with, one or more pigment sources, such as pigment source 3644a, pigment source 3644b, and pigment source 3644n, where pigment sources may include RED, GREEN, and BLUE pigments, or may include CYAN, MAGENTA, and YELLOW, or any other pigment combination. Trajectory 3683 may be configured to control amounts of pigments into chamber 3643 for proper color mixing. When activated, emitter propulsion subsystem 3685 may trigger chamber 3643 to propel pixel projectile 3612 from aperture 3641. In some cases, an input 3647 is configured to push out (e.g., blow out) any remaining pigment out through output 3645 so that chamber 3643 may be used to emit other pixel projectiles of different colors. Note that the above is one example and other implements may be used to replicate an image using a pixel projectile delivery system, according to various examples.

Figure 37:
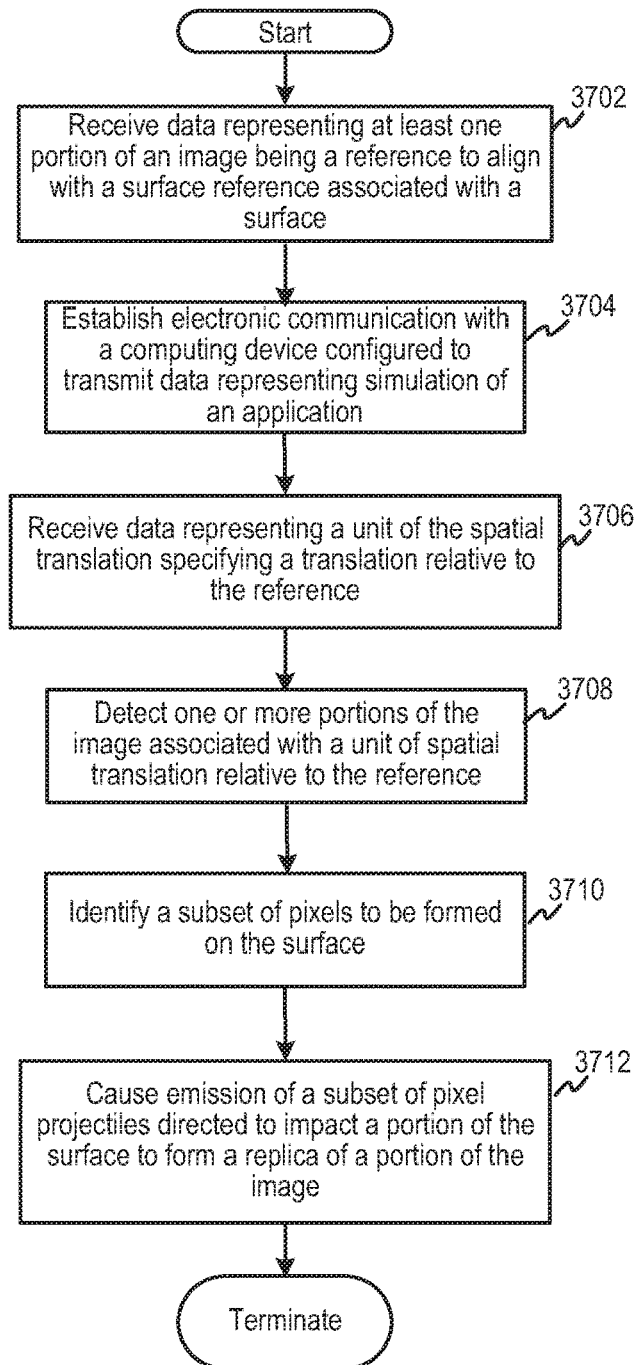
FIG. 37 is a diagram depicting an example of a flow to implement a pixel projectile delivery system, according to some examples.

FIG. 37 is a diagram depicting an example of a flow to implement a pixel projectile delivery system, according to some examples. At 3702, data representing at least one portion of an image may be received. The portion of the image may be configured to provide a reference with which to align with a surface reference, which may be associated with a surface. Alignment of a reference of an image and a reference on a surface may facilitate synchronicity between input portions of an image to be replicated or "painted" and outputs of a pixel projectile delivery system to "paint" or emit pixel projectiles to impact a surface relative to a surface reference.

At 3704, electronic communication with a computing device configured to transmit data representing simulation of an application may be established. For example, a mobile computing device (e.g., smart phone) may generate inputs describing which portions of an image are to be replicated on a surface, the communication being established between a mobile computing device and a pixel projectile delivery system.

Figure 38:
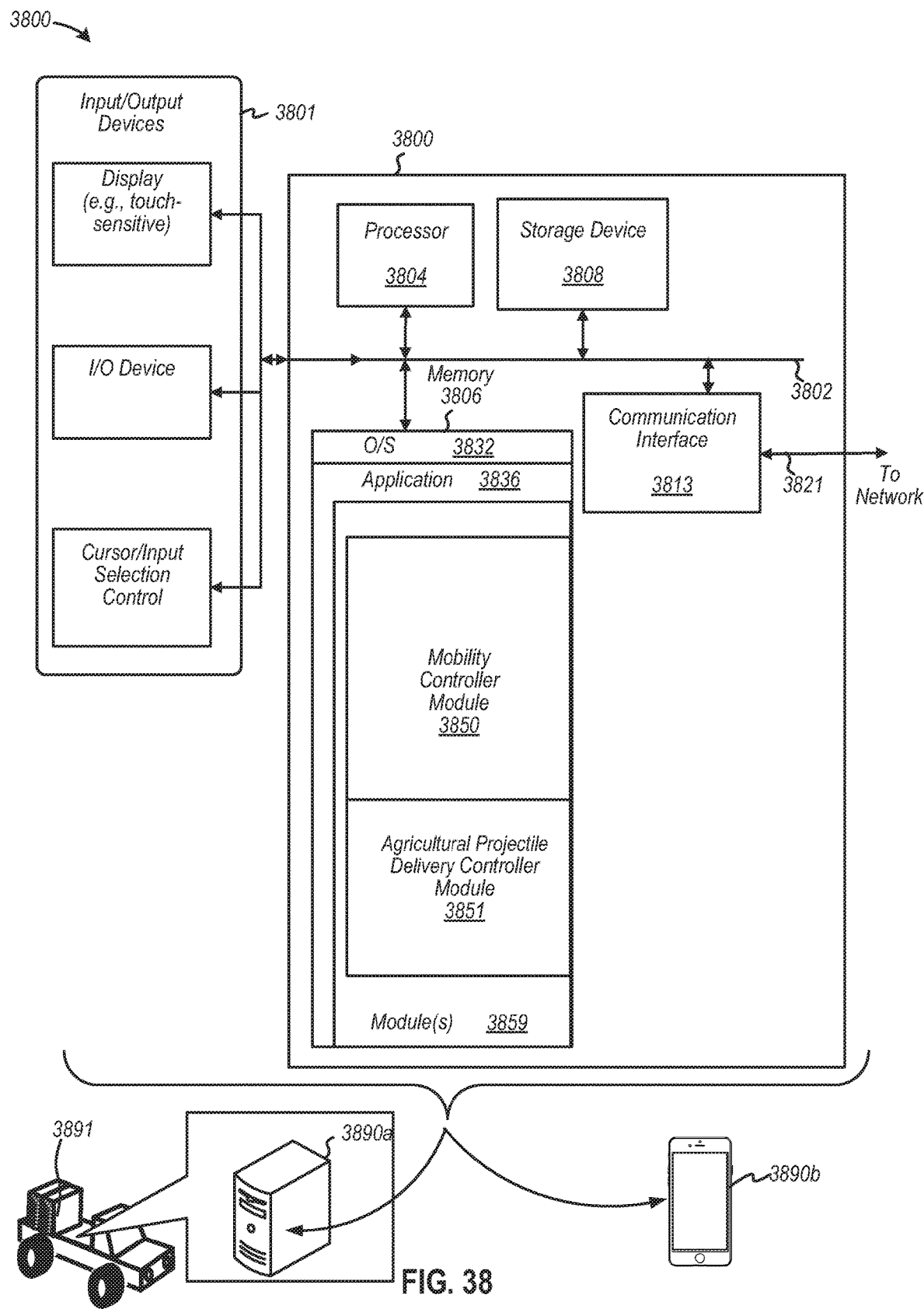
FIG. 38 illustrates examples of various computing platforms configured to provide various functionalities to components of an autonomous agricultural treatment delivery vehicle and fleet service, according to various embodiments.

At 3706, data representing a unit of spatial translation specifying a translation relative to a reference may be received, for example, into a pixel projectile delivery system. At 3708, one or more portions of an image associated with a unit of spatial translation relative to a reference may be detected. The unit of spatial translation may be considered an input to cause replication at a surface. At 3710, a subset of pixels to be formed or replicated on a surface may be identified. At 3712, emission of a subset of pixel projectiles may be caused, responsive to an input. The subset of pixel projectiles may be directed to impact a portion of a surface to form a replica of a portion of the image FIG. 38 illustrates examples of various computing platforms configured to provide various functionalities to components of an autonomous agricultural treatment delivery vehicle and fleet service, according to various embodiments. In some examples, computing platform 3800 may be used to implement computer programs, applications, methods, processes, algorithms, or other software to perform the above-described techniques.

In some cases, computing platform 3800 can be disposed in any device, such as a computing device 3890a, which may be disposed in an autonomous agricultural treatment delivery vehicle 3891, and/or mobile computing device 3890b.

Computing platform 3800 includes a bus 3802 or other communication mechanism for communicating information, which interconnects subsystems and devices, such as processor 3804, system memory 3806 (e.g., RAM, etc.), storage device 3808 (e.g., ROM, etc.), an in-memory cache (which may be implemented in RAM 3806 or other portions of computing platform 3800), a communication interface 3813 (e.g., an Ethernet or wireless controller, a Bluetooth controller, NFC logic, etc.) to facilitate communications via a port on communication link 3821 to communicate, for example, with a computing device, including mobile computing and/or communication devices with processors. Processor 3804 can be implemented with one or more graphics processing units ("GPUs"), with one or more central processing units ("CPUs"), such as those manufactured by Intel® Corporation, or one or more virtual processors, as well as any combination of CPUs and virtual processors. Computing platform 3800 exchanges data representing inputs and outputs via input-and-output devices 3801, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 3800 performs specific operations by processor 3804 executing one or more sequences of one or more instructions stored in system memory 3806, and computing platform 3800 can be implemented in a client-server arrangement, peer-to-peer arrangement, or as any mobile computing device, including smart phones and the like. Such instructions or data may be read into system memory 3806 from another computer readable medium, such as storage device 3808. In some examples, hard-wired circuitry may be used in place of or in combination with software instructions for implementation. Instructions may be embedded in software or firmware. The term "computer readable medium" refers to any tangible medium that participates in providing instructions to processor 3804 for execution. Such a medium may take many forms, including but not limited to, non-volatile media and volatile media. Non-volatile media includes, for example, optical or magnetic disks and the like. Volatile media includes dynamic memory, such as system memory 3806.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 3802 for transmitting a computer data signal.

In some examples, execution of the sequences of instructions may be performed by computing platform 3800. According to some examples, computing platform 3800 can be coupled by communication link 3821 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 3800 may transmit and receive messages, data, and instructions, including program code (e.g., application code) through communication link 3821 and communication interface 3813. Received program code may be executed by processor 3804 as it is received, and/or stored in memory 3806 or other non-volatile storage for later execution.

In the example shown, system memory 3806 can include various modules that include executable instructions to implement functionalities described herein. System memory 3806 may include an operating system ("O/S") 3832, as well as an application 3836 and/or logic module(s) 3859. In the example shown in FIG. 38, system memory 3806 includes a mobility controller module 3850 and/or its components as well as an agricultural projectile delivery controller module 3851, any of which, or one or more portions of which, can be configured to facilitate an autonomous agricultural treatment delivery vehicle and fleet of services by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 3850 and 3851 of FIG. 38, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 3850 and 3851, or one or more of their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method of operating within a geographic boundary comprising:
   accessing data representing one or more subsets of agricultural objects of an agricultural projectile delivery system;
   accessing data representing one or more policies, at least one policy associated with a type of action for an agricultural object;
   identifying, via one or more sensors, one or more agricultural objects of a first classified subset;

determining a position of one or more emitters within the geographic boundary, selecting a first emitter of the one or more emitters to perform the type of action for the agricultural object as one of the first classified subset including emitting an agricultural projectile as the first emitter traverses one or more paths within the geographic boundary; and configuring the agricultural projectile delivery system to activate the first emitter to propel the agricultural projectile to intercept the agricultural object.

2. The method of claim 1, further comprising:

identifying via the one or more sensors one or more other agricultural objects of a second classified subset, wherein the one or more agricultural objects of the first classified subset are different than one or more other agricultural objects of the second classified subset.

3. The method of claim 2, further comprising:

selecting another emitter with which to perform another type of action for another agricultural object as one of the second classified subset, wherein the type of action is different than the another type of action.

4. The method of claim 1, further comprising:

associating the first classified subset with a path that includes the position.

5. The method of claim 1, further comprising:

predicting spatial locations of the one or more agricultural objects of the first classified subset relative to the position of the one or more emitters.

6. The method of claim 1, further comprising:

accessing map data to facilitate autonomous mobility of the agricultural projectile delivery system to traverse the one or more paths.

7. The method of claim 1, further comprising:

accessing map data to determine a local position of the agricultural projectile delivery system relative to the identified one or more agricultural objects.

8. The method of claim 7, wherein the map data includes a map data repository having a plurality of indexed static objects, dynamic objects, agricultural objects, or a combination thereof representing the geographic boundary, the map data acquired previously by the agricultural projectile delivery system.

9. The method of claim 8, wherein each of the indexed static objects, dynamic objects, and agricultural objects include one or more captured images or portions of images depicting the indexed static objects, dynamic objects, agricultural objects, or a combination thereof, a timestamp associated with a time of image capture of the one or more captured images, a geo location associated with the indexed static objects, dynamic objects, agricultural objects, or a combination thereof, or a combination thereof.

10. The method of claim 9, wherein at least one of the identified one or more agricultural objects is time-series linked to at least one of the indexed agricultural objects.

11. The method of claim 10, further comprising:

generating a time series model of at least one of the identified one or more agricultural objects of the first classified subset based at least in part on the time-series link.

12. The method of claim 7, wherein the map data is a local map generated in real time via the one or more sensors and one or more processing units configured to detect and identify a location of a static object, dynamic object, or a combination thereof relative to a component of the agricultural projectile delivery system including the one or more emitters.

13. The method of claim 12, wherein the position is determined at least in part by the local map data.

14. The method of claim 1, wherein identifying the one or more agricultural objects of the first classified subset further comprises:

identifying via the one or more sensors one or more other agricultural objects of a second classified subset; and activating at least the first emitter to propel agricultural projectiles to intercept each of the one or more agricultural objects of the first classified subset and each of the one or more other agricultural objects of the second classified subset as the agricultural projectile delivery system traverses the one or more paths.

15. The method of claim 1, wherein identifying the one or more agricultural objects of the first classified subset comprises:

identifying a type of agricultural object; and selecting the type of action based on a policy for the type of agricultural object.

16. The method of claim 15, wherein selecting the type of action based on the policy for the type of agricultural object comprises:

selecting the policy as a function of context.

17. The method of claim 16, wherein the context includes a stage of growth of the identified one or more agricultural objects.

18. The method of claim 1, wherein identifying the one or more agricultural objects of the first classified subset comprises:

identifying a type of agricultural object as being classified as a blossom.

19. The method of claim 18, wherein selecting the first emitter to perform the type of action comprises:

performing one or more of a first type of action to pollinate a king blossom and a second type of action to terminate a lateral blossom as one or more agricultural projectiles.

20. The method of claim 1, wherein identifying the one or more agricultural objects of the first classified subset comprises:

identifying a type of agricultural object as being classified as a weed.

21. The method of claim 1, wherein identifying the one or more agricultural objects of the first classified subset comprises:

identifying a type of agricultural object as being classified as a portion of soil, a portion of a leaf of a plant, or a portion of a root portion of a plant.

22. The method of claim 21, wherein selecting the first emitter to perform the type of action comprises:

performing one or more of a first type of action to apply a portion of fertilizer.

* * * * *